US012414177B2

(12) United States Patent
Qiao et al.

(10) Patent No.: US 12,414,177 B2
(45) Date of Patent: Sep. 9, 2025

(54) MULTIPLE ACCESS

(71) Applicant: Comcast Cable Communications, LLC, Philadelphia, PA (US)

(72) Inventors: Weihua Qiao, Herndon, VA (US); Taehun Kim, Fairfax, VA (US); Esmael Hejazi Dinan, McLean, VA (US); Jinsook Ryu, Oakton, VA (US); Peyman Talebi Fard, Vienna, VA (US); Kyungmin Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 490 days.

(21) Appl. No.: 17/826,885

(22) Filed: May 27, 2022

(65) Prior Publication Data

US 2022/0386401 A1  Dec. 1, 2022

Related U.S. Application Data

(60) Provisional application No. 63/195,481, filed on Jun. 1, 2021, provisional application No. 63/194,680, filed on May 28, 2021.

(51) Int. Cl.
H04W 76/15 (2018.01)
H04W 28/02 (2009.01)
H04W 48/16 (2009.01)

(52) U.S. Cl.
CPC ....... *H04W 76/15* (2018.02); *H04W 28/0215* (2013.01); *H04W 48/16* (2013.01)

(58) Field of Classification Search
CPC ..... H04W 76/00; H04W 76/10; H04W 76/15; H04W 76/16; H04W 76/18; H04W 76/19;
(Continued)

(56) References Cited

U.S. PATENT DOCUMENTS 7,904,087 B2   3/2011   Zhang et al.
9,667,478 B2   5/2017   Wang et al.
(Continued)

FOREIGN PATENT DOCUMENTS

CN   111885698 A   11/2020
EP   2945321 A1   11/2015
(Continued)

OTHER PUBLICATIONS

Oct. 24, 2022—EP Search Report—EP App. No. 22175870.9.
(Continued)

*Primary Examiner* — Ji-Hae Yea
(74) *Attorney, Agent, or Firm* — Banner & Witcoff, Ltd.

(57) ABSTRACT

A communication procedure may be used for multiple access. A wireless device may be capable of simultaneously accessing a plurality of networks that are associated with a visited network. The visited network may or may not allow the wireless device to simultaneously access the plurality of networks, for example, based on a status of the visited network. Prior to a wireless device requesting access to a plurality of networks, a visited network may indicate whether the visited network supports, for the wireless device, simultaneous access to a plurality of networks.

20 Claims, 30 Drawing Sheets

(58) Field of Classification Search
CPC ..... H04W 76/30; H04W 76/34; H04W 76/36; H04W 76/50; H04W 28/00; H04W 28/02; H04W 28/0215; H04W 28/0226; H04W 48/00; H04W 48/16; H04W 48/17; H04W 48/18
See application file for complete search history.

(56) References Cited

U.S. PATENT DOCUMENTS

| | | | |
|---|---|---|---|
| 10,588,074 | B2 | 3/2020 | Duan et al. |
| 10,779,231 | B2 | 9/2020 | Chen |
| 10,791,508 | B2 | 9/2020 | Park et al. |
| 10,834,571 | B1 * | 11/2020 | Yau ............... H04W 12/06 |
| 10,887,886 | B2 | 1/2021 | Lee et al. |
| 10,966,128 | B2 | 3/2021 | Zee et al. |
| 2018/0199273 | A1 * | 7/2018 | Chun ............. H04W 76/27 |
| 2018/0352050 | A1 * | 12/2018 | Li .................. H04L 67/5682 |
| 2018/0368061 | A1 * | 12/2018 | Yu .................. H04W 8/12 |
| 2019/0053148 | A1 * | 2/2019 | Lee ................ H04W 48/18 |
| 2019/0159115 | A1 | 5/2019 | Russell et al. |
| 2020/0137675 | A1 | 4/2020 | Park et al. |
| 2020/0236528 | A1 * | 7/2020 | Lee ................ H04W 8/082 |
| 2020/0260525 | A1 * | 8/2020 | Gan ............... H04W 76/11 |
| 2020/0267781 | A1 * | 8/2020 | Lee ................ H04W 76/36 |

FOREIGN PATENT DOCUMENTS

| | | | | |
|---|---|---|---|---|
| WO | WO-2014175967 | A1 * | 10/2014 | ............... H04J 11/00 |
| WO | 2017157118 | A1 | 9/2017 | |
| WO | WO-2018141393 | A1 * | 8/2018 | ......... H04L 41/5019 |
| WO | 2018228294 | A1 | 12/2018 | |

OTHER PUBLICATIONS

LG Electronics: "New requirements for EASNS", 3GPP Draft; S1-211423, 3rd Generation Partnership Project (3GPP), Mobile competence centre; May 20, 2021.
Intel: "clarification of Use case 5.5 on access to slices when roaming" 3GPP Draft; S1-204129, 3rd generation partnership (3GPP), mobile competence centre; Nov. 3, 2020.
Apple: "Clarification for simultaneous access to multiple slices on different PLMNs", 3GPP Draft; s1-211421, Mobile competence Center, May 21, 2021.
3rd Generation Partnership Project; Technical Specification Group Services and System Aspects; Study on Enhanced Acess to and Support of Network Slice (Release 18); Apr. 2, 2021.
3GPP TR 22.835 V18.0.0 (Mar. 2021), 3rd Generation Partnership Project; Technical Specification Group Services and System Aspects; Study on Enhanced Access to and Support of Network Slice (Release 18).
3GPP TR 22.835 V18.2.0 (Dec. 2021), 3rd Generation Partnership Project; Technical Specification Group Services and System Aspects; Study on Enhanced Access to and Support of Network Slice (Release 18).
3GPP TS 23.122 V17.2.0 (Mar. 2021), 3rd Generation Partnership Project; Technical Specification Group Core Network and Terminals; Non-Access-Stratum (NAS) functions related to Mobile Station (MS) in idle mode (Release 17).
3GPP TS 23.251 V16.0.0 (Jul. 2020), 3rd Generation Partnership Project; Technical Specification Group Services and System Aspects; Network Sharing; Architecture and functional description (Release 16).
3GPP TS 23.502 V17.0.0 (Mar. 2021), 3rd Generation Partnership Project; Technical Specification Group Services and System Aspects; Procedures for the 5G System (5GS); Stage 2 (Release 17).
3GPP TS 23.503 V17.0.0 (Mar. 2021), 3rd Generation Partnership Project; Technical Specification Group Services and System Aspects; Policy and charging control framework for the 5G System (5GS); Stage 2 (Release 17).
3GPP TS 31.102 V17.1.0 (Mar. 2021), 3rd Generation Partnership Project; Technical Specification Group Core Network and Terminals; Characteristics of the Universal Subscriber Identity Module (USIM) application (Release 17).
3GPP TS 38.331 V16.4.1 (Mar. 2021) 3rd Generation Partnership Project; Technical Specification Group Radio Access Network; NR; Radio Resorce Control (RRC) protocol specification (Release 16).
C1-174851 3GPP TSG-CT WG1 Meeting #107, Reno (USA), Nov. 27-Dec. 1, 2017, Source: Qualcomm Incorporated, Title: Update of control plane solution for steering of roaming in 5GS.
Official Document NG. 116—Generic Network Slice Template, Version 5.0; Jun. 1, 2021; Copyright © 2021 GSM Association.
RP-202895 3GPP TSG RAN Meeting #90e, Electronic Meeting, Dec. 7-11, 2020, Source: vivo, China Telecom, China Unicom, Title: Revised WID: Core part: Support for Multi-SIM devices for LTE/NR.
S1-210422 3GPP TSG-SA WG1 Meeting #93e, Electronic Meeting, Feb. 22-Mar. 4, 2021, Source: Apple, Title: Clarification of 'access' for simultaneous access to multiple slices on different VPLMNs.
S2-173140 SA WG2 Meeting #121, May 15-19, 2017, Hangzhou, China, Source: China Telecommunications, Huawei, Title: UE policy for roaming network selection in 5GC.
S2-2102530 3GPP TSG-SA WG2 Meeting #144E e-meeting, Elbonia, Apr. 12-16, 2021, Source: Huawei, HiSilicon, Title: Inter-network indication of compatible network slices using UE category.
SP-190309 3GPP TSG-SA Meeting #84, Newport Beach, CA, USA, Jun. 5-7, 2019, Source: SA1 (from S1-191635), Title: Proposed WID on Support for Multi-USIM Devices (MUSIM).
SP-200571 3GPP TSG SA Meeting # 88e, Electronic Meeting, Jun. 30-Jul. 3, 2020, Source: SA WG1, Title: New WID on Study on Enhanced Access to and Support of Network Slice (from S1-202284).
3GPP TS 38.401 V15.6.0 (Jul. 2019), Technical Specification, 3rd Generation Partnership Project; Technical Specification Group Radio Access Network; NG-RAN; Architecture description (Release 15).
May 7, 2025—European Office Action—EP App. No. 22175870.9.

* cited by examiner

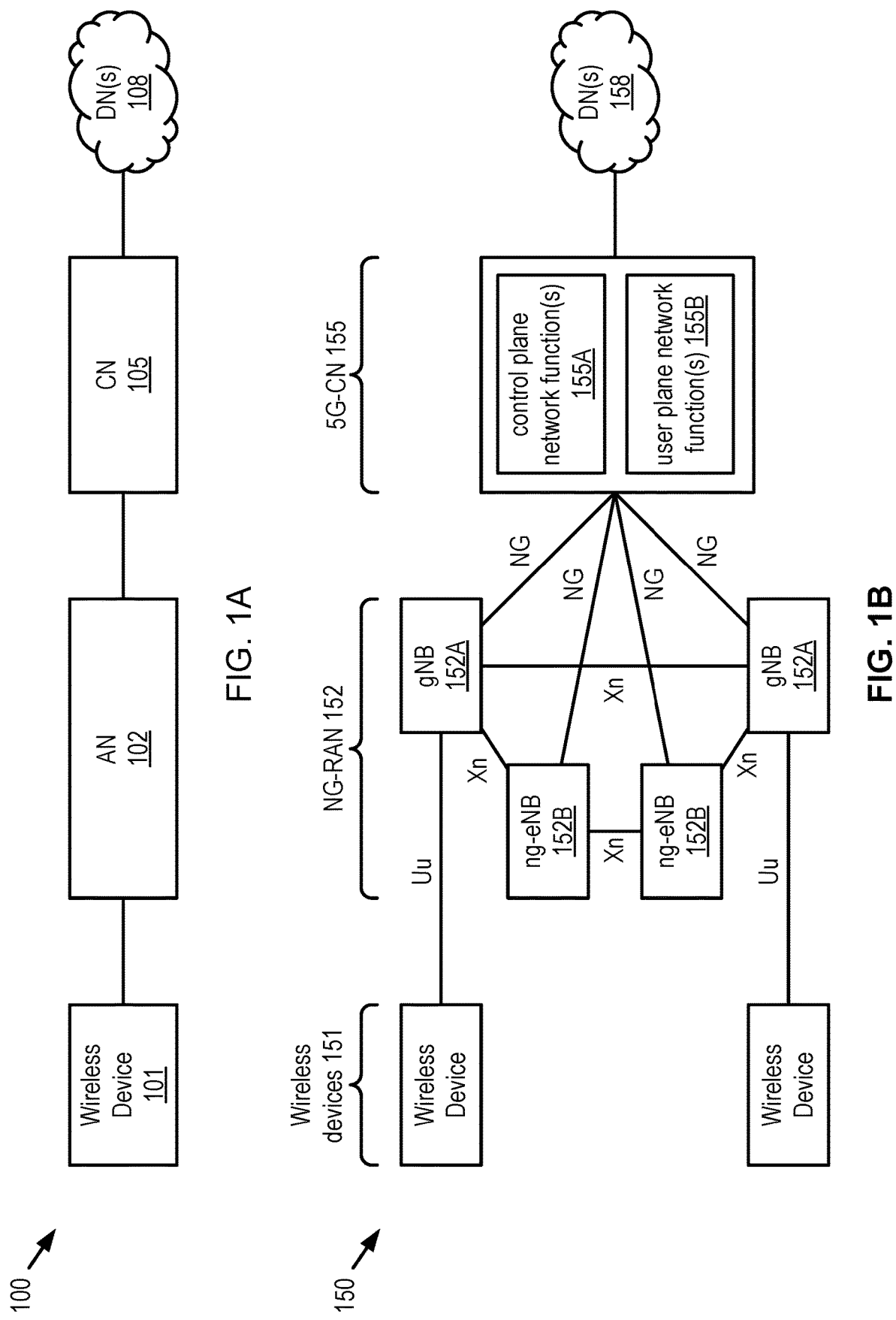

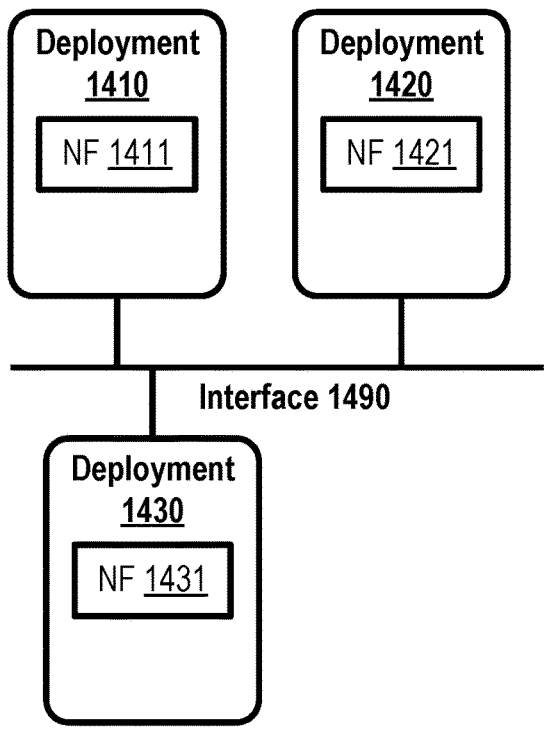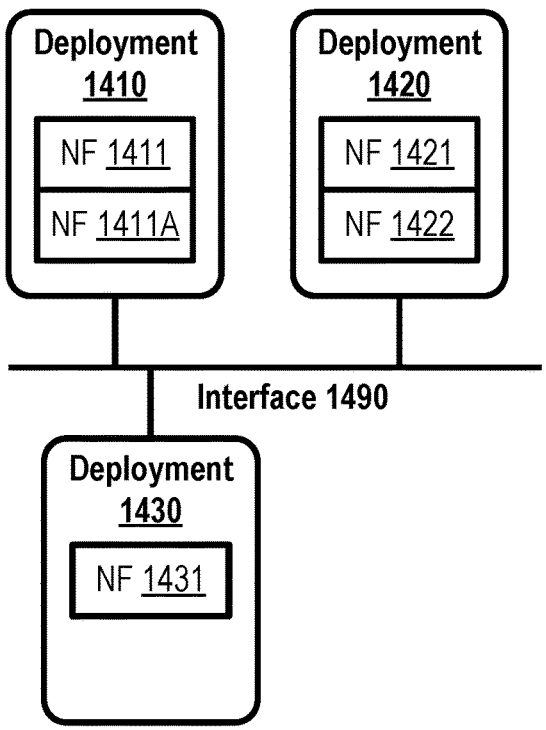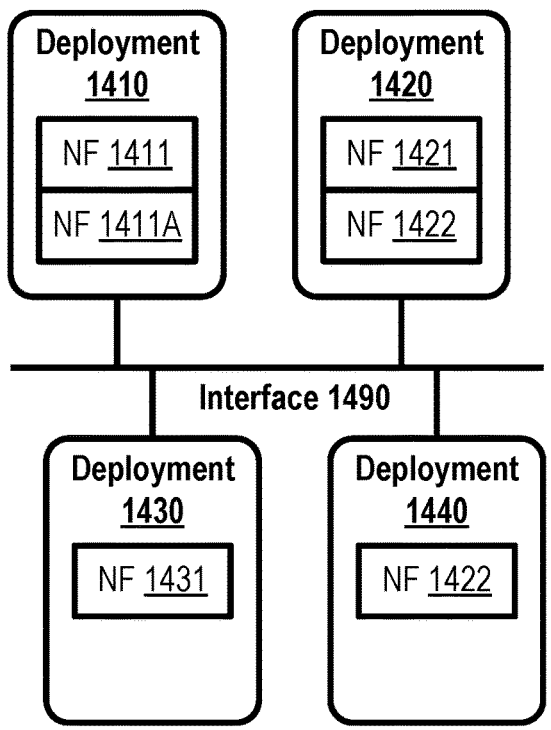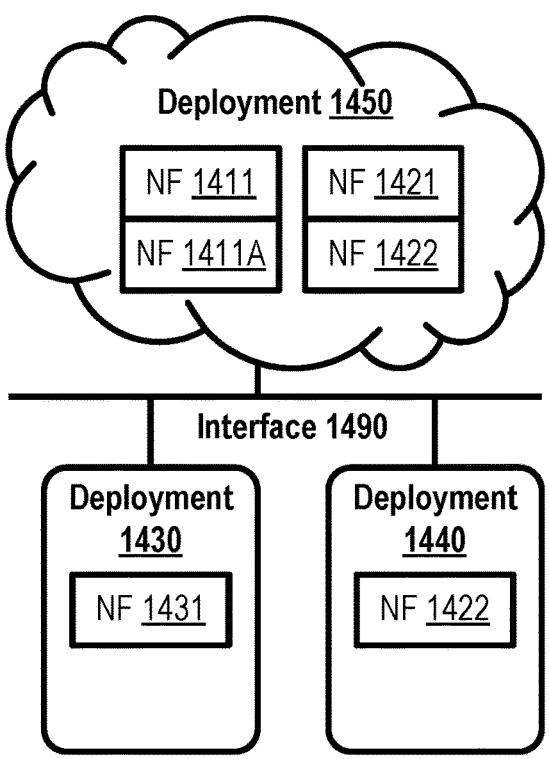
FIG. 14A
FIG. 14B
FIG. 14C
FIG. 14D

SIB1 message

```
-- ASN1START
-- TAG-SIB1-START

SIB1 ::=        SEQUENCE {
  cellSelectionInfo          SEQUENCE {
    q-RxLevMin                 Q-RxLevMin,
    q-RxLevMinOffset           INTEGER (1..8)                OPTIONAL,
    q-RxLevMinSUL              Q-RxLevMin                    OPTIONAL,
    q-QualMin                  Q-QualMin                     OPTIONAL,
    q-QualMinOffset            INTEGER (1..8)                OPTIONAL
  } OPTIONAL,
  cellAccessRelatedInfo      CellAccessRelatedInfo,
  connEstFailureControl      ConnEstFailureControl           OPTIONAL,
  si-SchedulingInfo          SI-SchedulingInfo               OPTIONAL,
  servingCellConfigCommon       ServingCellConfigCommonSIB   OPTIONAL,
  ims-EmergencySupport          ENUMERATED {true}            OPTIONAL,
  eCallOverIMS-Support          ENUMERATED {true}            OPTIONAL,
  ue-TimersAndConstants         UE-TimersAndConstants        OPTIONAL,
  uac-BarringInfo            SEQUENCE {
    uac-BarringForCommon          UAC-BarringPerCatList       OPTIONAL,
    uac-BarringPerPLMN-List       UAC-BarringPerPLMN-List     OPTIONAL,
    uac-BarringInfoSetList        UAC-BarringInfoSetList,
    uac-AccessCategory1-SelectionAssistanceInfo CHOICE {
      plmnCommon                  UAC-AccessCategory1-SelectionAssistanceInfo,
      individualPLMNList          SEQUENCE (SIZE (2..maxPLMN)) OF
                                     UAC-AccessCategory1-SelectionAssistanceInfo
    }                                                         OPTIONAL
  }                                                           OPTIONAL,
  useFullResumeID            ENUMERATED {true}                OPTIONAL,
  lateNonCriticalExtension   OCTET STRING                     OPTIONAL,
  nonCriticalExtension       SIB1-v1610-IEs                   OPTIONAL
  MultiplePLMNCapability     ENUMERATED {true}                OPTIONAL,
}

-- TAG-SIB1-STOP
-- ASN1STOP
```

FIG. 21 receive, by a wireless device (e.g., from a base station), a first message comprising: a parameter indicating whether the base station supports simultaneous access to a plurality of different network slices via a plurality of VPLMNs 2210

determine, by the wireless device and based on the parameter indicating support for simultaneous access, to select the plurality of VPLMNs 2220

access, by the wireless device and based on the determining, at least one network slice of the plurality of different network slices via the selected plurality of VPLMNs 2230

FIG. 22A

MULTIPLE ACCESS

CROSS-REFERENCE TO RELATED APPLICATIONS

This application claims the benefit of U.S. Provisional Application No. 63/194,680, filed on May 28, 2021; and U.S. Provisional Application No. 63/195,481, filed on Jun. 1, 2021. The above referenced applications are hereby incorporated by reference in their entireties.

BACKGROUND

A wireless device may be located in a coverage of a visited network. A roaming agreement may exist between a service provider of a home public land mobile network (HPLMN) and service providers of visited public land mobile networks (VPLMNs). The wireless device may communicate with the visited network to access a service provided by a VPLMN.

SUMMARY

The following summary presents a simplified summary of certain features. The summary is not an extensive overview and is not intended to identify key or critical elements.

Wireless communications may comprise transmission/reception between a wireless device and a base station. A wireless device may be capable of simultaneously accessing a plurality of networks that are associated with a visited network. The visited network may or may not allow a wireless device to simultaneously access a plurality of networks, for example, based on a status and/or capability of the visited network. The visited network may not allow a wireless device to simultaneously access a plurality of networks, for example, even if the wireless device is authorized by a home network and is otherwise capable of simultaneously accessing the plurality of networks. The visited network may indicate, to the wireless device, whether the visited network supports, for the wireless device, simultaneous access to a plurality of networks, for example, prior to the wireless device requesting access to a plurality of networks via the visited network. The wireless device may determine, based on the indication, whether to communicate with the visited network (e.g., to request access to a plurality of networks). Efficient multiple access procedures described herein may provide advantages such as reduced retransmissions, reduced connection releases, reduced power consumption, improved data throughput, and/or enabled selection of various functions/procedures that may provide improved quality of service.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 14A, FIG. 14B, FIG. 14C, and FIG. 14D show various example arrangements of physical core network deployments.

FIG. 21 shows an example SIB1 message.

FIG. 22A shows an example procedure for a wireless device to determine whether to allow simultaneous access to a plurality of networks (e.g., PLMNs).

DETAILED DESCRIPTION

Figure 2A:
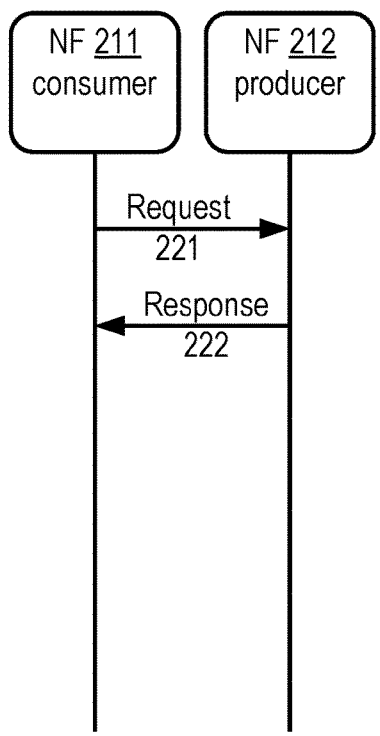
FIG. 2A, FIG. 2B, FIG. 2C, and FIG. 2D show examples frameworks for a service-based architecture within a core network.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to a multiple access procedure for wireless communications.

FIG. 1A shows an example communication network 100. The communication network 100 may comprise, for example, a public land mobile network (PLMN) operated/ managed/run by a network operator. The communication network 100 comprise one or more of a wireless device 101, an access network (AN) 102, a core network (CN) 105, and/or one or more data network(s) (DNs) 108.

The wireless device 101 may communicate with DNs 108, for example, via AN 102 and/or CN 105. As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, an unmanned aerial vehicle, an urban air mobility aircraft, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The AN 102 may connect the wireless device 101 to the CN 105. A communication direction from the AN 102 to the wireless device 101 may be referred to as a downlink and/or a downlink communication direction. The communication direction from the wireless device 101 to the AN 102 may be referred to as an uplink and/or an uplink communication direction. Downlink transmissions may be separated and/or distinguished from uplink transmissions using frequency division duplexing (FDD), time-division duplexing (TDD), any other duplexing and/or multiplexing schemes, and/or some combination of the two duplexing techniques. The AN 102 may connect to and/or communicate with wireless device 101 via radio communications over an air interface. An AN that at least partially operates over the air interface may be referred to as a radio access network (RAN). A RAN may comprise one or more of: a radio unit (RU), distributed unit (DU), and/or a centralized unit (CU). A RAN may operate in a virtualized and/or in a non-virtualized environment. A RAN may perform one or more network functions in hardware. A RAN may perform one or more network functions in software. A RAN may perform one or more network functions in hardware and/or software. The CN 105 may set up/configure one or more end-to-end connections between wireless device 101 and the one or more DNs 108. The CN 105 may authenticate wireless device 101, provide a charging functionality, and/or provide/configure one or more additional functionalities/services for the wireless device 101.

As used throughout, the term "base station" may refer to, comprise, and/or encompass any element of the AN 102 that facilitates communication between wireless device 101 and the AN 102 (and/or any other elements of the communication network 100). A base station may comprise an RU. ANs and base stations may be referred to by other terminologies and/or may have other implementations. The base station may be a terrestrial base station at a fixed location on the earth. The base station may be a mobile base station with a moving coverage area. The base station may be on an aerial vehicle and/or may be located in space. For example, the base station may be on board an aircraft or a satellite. The RAN may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

The base station may be referred to using different terminologies in different communication standards/protocols. For example, WiFi and other standards may use the term access point. The Third-Generation Partnership Project (3GPP) has produced specifications for three generations of mobile networks, each of which uses a different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use different terminologies to refer to the elements/components which implement the methods described in the present disclosure (e.g., wireless devices, base stations, ANs, CNs, components thereof, and/or other elements in a communication network). A base station may be and/or comprise a repeater or relay node used to extend the coverage area of a donor node. A repeater node may amplify and rebroadcast a radio signal received from a donor node. A relay node may perform the same/similar functions as a repeater node. A relay node may decode radio signals received from the donor node (e.g., to remove noise) before amplifying and rebroadcasting the radio signal.

The AN 102 may include one or more base stations. The one or more base stations may have/serve one or more coverage areas. A geographical size and/or an extent of a coverage area may be based on a range at which a receiver of AN 102 can successfully receive transmissions from a transmitter (e.g., the wireless device 101) operating within the coverage area (and/or vice-versa). The coverage areas may be referred to as sectors or cells. In some contexts, the term cell may refer to a carrier frequency used in a particular coverage area. Base stations with large coverage areas may be referred to as macrocell base stations. Base stations may cover/serve smaller areas, for example, to provide coverage in areas/locations with weak macrocell coverage, and/or to provide additional coverage in areas with high traffic (e.g., referred to as hotspots). Examples of small cell base stations comprise (e.g., in order of decreasing coverage areas) microcell base stations, picocell base stations, femtocell base stations, and/or home base stations. In combination, the coverage areas of the base stations may provide radio coverage/service to the wireless device 101 over a wide geographic area to support wireless device mobility.

A base station may comprise one or more sets of antennas for communicating with the wireless device 101 over an air interface. Each set of antennas may be separately controlled by the base station. Each set of antennas may have a corresponding coverage area. For example, a base station may comprise three sets of antennas to respectively control three coverage areas (e.g., on three different sides) of the base station. A base station may comprise any quantity of antennas, which may correspond to any quantity of coverage areas. The entirety of the base station (and its corresponding antennas) may be deployed at a single location or at a plurality of locations. A controller (e.g., at a central location) may control/operate one or more sets of antennas at one or more distributed locations. The controller may be, for example, a baseband processing unit that comprises a centralized and/or cloud-based RAN architecture. The baseband processing unit may be either centralized in a pool of baseband processing units or may be virtualized. A set of antennas at a distributed location may be referred to as a remote radio head (RRH).

FIG. 1B shows another example communication network 150. The communication network 150 may comprise, for example, a PLMN operated/run by a network operator. The communication network 150 may comprise wireless devices 151, a next generation radio access network (NG-RAN) 152, a 5G core network (5G-CN) 155, and one or more DNs 158. The NG-RAN 152 may comprise one or more base stations (e.g., generation node Bs (gNBs) 152A and/or next generation evolved Node Bs (ng eNBs) 152B). The 5G-CN 155 may comprise one or more network functions (NFs). The one or more NFs may comprise control plane functions 155A and user plane functions 155B. The one or more DNs 158 may comprise public DNs (e.g., the Internet), private DNs, and/or intra-operator DNs. The components/elements shown in FIG. 1B may represent specific implementations and/or terminology of components/elements shown in FIG. 1A.

The base stations of the NG-RAN 152 may be connected to the wireless devices 151 via one or more Uu interfaces. The base stations of the NG-RAN 152 may be connected to each other via one or more first interface(s) (e.g., Xn interface(s)). The base stations of the NG-RAN 152 may be connected to 5G-CN 155 via one or more second interfaces (e.g., NG interface(s)). An interfaces may comprise one or more air interfaces, direct physical connections, indirect connections, and/or combinations thereof. For example, the Uu interface may comprise an air interface. The NG and Xn interfaces may comprise an air interface, direct physical connections, and/or indirect connections over an underlying transport network (e.g., an internet protocol (IP) transport network).

Each of the Uu, Xn, and NG interfaces may be associated with a protocol stack. The protocol stacks may comprise a user plane (UP) protocol stack and a control plane (CP) protocol stack. User plane data may comprise data corresponding to (e.g., associated with and/or pertaining to) users of the wireless devices 151. For example, user plane data may comprise internet content downloaded via a web browser application, sensor data uploaded via a tracking application, and/or email data communicated to and/or from an email server. Control plane data may comprise signaling and/or control message messages. For example, control plane data may facilitate packaging and routing of user plane data such that the user plane data may be communicated with (e.g., sent to and/or received from) the DN(s). The NG interface may be divided into (e.g., may comprise) an NG user plane interface (NG-U) and an NG control plane interface (NG-C). The NG-U interface may provide/perform delivery of user plane data between the base stations and the one or more user plane network functions 155B. The NG-C interface may be used for control signaling between the base stations and the one or more control plane network functions 155A. The NG-C interface may provide, for example, NG interface management, wireless device context management, wireless device mobility management, transport of non-access stratum (NAS) messages, paging, protocol data unit (PDU) session management, and configuration transfer and/or warning message transmission. In at least some scenarios, the NG-C interface may support transmission of user data (e.g., a small data transmission for an IoT device).

One or more of the base stations of the NG-RAN 152 may be split into a central unit (CU) and one or more distributed units (DUs). A CU may be coupled to one or more DUs via an interface (e.g., an F1 interface). The CU may handle one or more upper layers in the protocol stack and the DU may handle one or more lower layers in the protocol stack. For example, the CU may handle a radio resource control (RRC) layer, a physical data convergence protocol (PDCP) layer, and/or a service data application protocol (SDAP) layer, and the DU may handle radio link control (RLC) layer, a medium access control (MAC) layer, and/or a physical (PHY) layer. The one or more DUs may be in geographically diverse locations relative to the CU and/or each other. The CU/DU split architecture may permit increased coverage and/or better coordination.

The gNBs 152A and ng-eNBs 152B may provide different user plane and control plane protocol termination towards the wireless devices 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate wireless devices 151, set up end-to-end connections between wireless devices 151 and the one or more DNs 158, and/or provide charging functionality. The 5G-CN 155 may be based on a service-based architecture. The service-based architecture may enable the NFs comprising the 5G-CN 155 to offer services to each other and to other elements of the communication network 150 via interfaces. The 5G-CN 155 may include any quantity of other NFs and any quantity of instances of each NF.

FIG. 2A, FIG. 2B, FIG. 2C, and FIG. 2D show example frameworks for a service-based architecture within a core network. A service, in a service-based architecture, may be requested/sought by a service consumer and provided by a service producer. An NF may determine, prior to obtaining the requested service, where the requested service may be obtained. The NF may communicate with a network repository function (NRF) to discover a service. For example, an NF that provides one or more services may register with a network repository function (NRF). The NRF may store data relating to the one or more services that the NF is prepared to provide to other NFs in the service-based architecture. A consumer NF may query the NRF to discover/determine a producer NF. For example, the consumer NF may obtain, from the NRF, a list of NF instances that provide a particular service).

As shown in FIG. 2A, an NF 211 (e.g., a consumer NF) may send a request 221 to an NF 212 (e.g., a producer NF). The request 221 may be a request for a particular service. The request 221 may be sent based on a discovery that NF 212 is a producer of that service. The request 221 may comprise data relating to NF 211 and/or the requested service. The NF 212 may receive the request 221, perform one or more actions associated with the requested service (e.g., retrieving data), and provide/send a response 221. The one or more actions performed by the NF 212 may be based on request data included in the request 221, data stored by the NF 212, and/or data retrieved by the NF 212. The response 222 may notify/indicate, to the NF 211, that the one or more actions have been completed. The response 222 may comprise response data relating to the NF 212, the one or more actions, and/or the requested service.

Figure 2B:
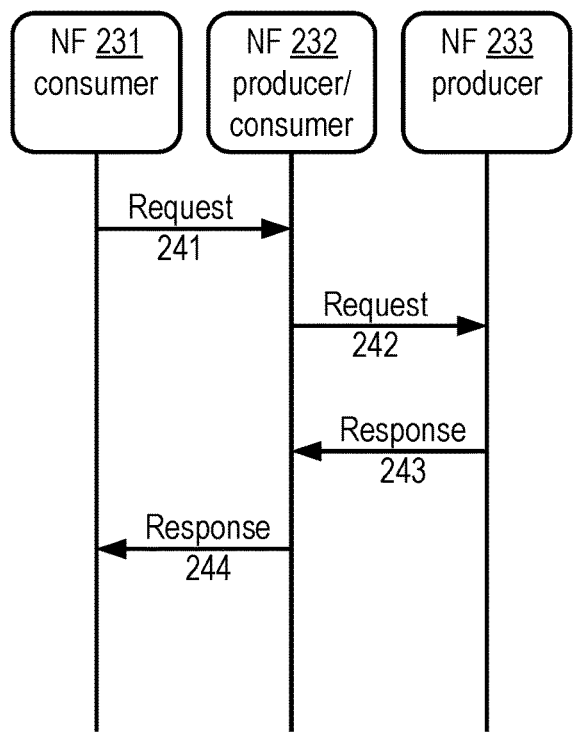

As shown in FIG. 2B, an NF 231 may send a request 241 to an NF 232. A service produced/provided by the NF 232 may comprise sending a request 242 to an NF 233 (e.g., based on receiving the request 241). The NF 233 may perform one or more actions and provide/send a response 243 to the NF 232. The NF 232 may send a response 244 to the NF 231, for example, based on receiving the response 243. As shown in FIG. 2B, an NF (e.g., a single NF) may perform the role of a producer of services, consumer of services, and/or both. A particular NF service may comprise any quantity/number of nested NF services produced by one or more other NFs.

Figure 2C:
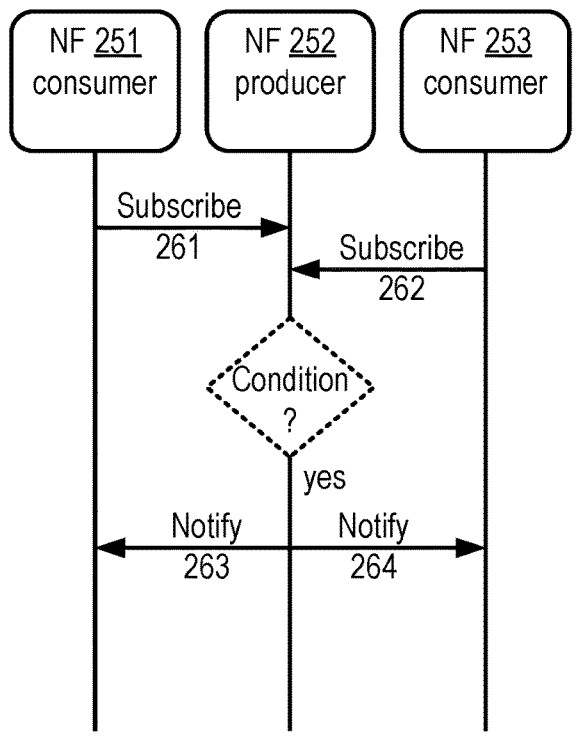

FIG. 2C shows an example of subscribe-notify interactions between a consumer NF and a producer NF. An NF 251 may send a subscription 261 (e.g., a subscription request) to an NF 252. An NF 253 may send a subscription 262 (e.g., a subscription request) to the NF 252. Although FIG. 2C shows two NFs and the NF 252 providing multiple subscription services to the two NFs, a subscribe-notify interaction may comprise one subscriber, and/or any other quantity of subscribers. The NFs 251, 253 may be independent from one another. For example, the NFs 251, 253 may independently discover the NF 252 and/or independently determine to subscribe to the service offered by the NF 252. The NF 252 may provide/send a notification to a subscribing NF, for example, based on receiving the subscription. For example, the NF 252 may send a notification 263 to the NF 251 based on the subscription 261 and/or may send a notification 264 to the NF 253 based on the subscription 262.

The sending of the notifications 263, 264 may be conditional. The sending of the notifications 263, 264 may be based on a determination that a condition has occurred. The notifications 263, 264 may be based on a determination that a particular event has occurred, a determination that a particular condition is outstanding, and/or a determination that a duration of time associated with the subscription has elapsed. The duration of time may be a time period associated with a subscription for notifications (e.g., periodic notifications). The NF 252 may send the notifications 263, 264 to the NFs 251, 253 simultaneously, substantially simultaneously, and/or based on/in response to a same condition. The NF 252 may send the notifications 263, 264 at different times and/or based on/in response to different notification conditions. The NF 251 may request a notification based on a certain parameter, as measured by the NF 252, exceeding a first threshold. The NF 252 may request a notification based on the parameter exceeding a second threshold (e.g., different from the first threshold). A parameter of interest and/or a corresponding threshold may be indicated in the subscriptions 261, 262.

Figure 2D:
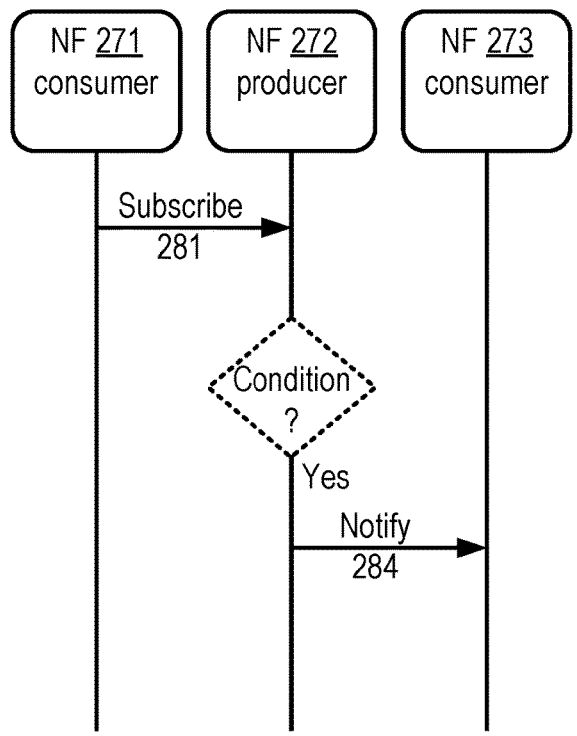

FIG. 2D shows another example of a subscribe-notify interaction. An NF 271 may send a subscription 281 to an NF 272. The NF 272 may send a notification 284, for example, based on/in response to receipt of the subscription 281 and/or a determination that a notification condition has occurred. The notification 284 may be sent to an NF 273. While the example of FIG. 2C shows a notification being sent to the subscribing NF, the example of FIG. 2D shows that a subscription and its corresponding notification may be associated with (e.g., received from and sent to) different NFs. For example, the NF 271 may subscribe to the service provided by the NF 272 on behalf of the NF 273.

Figure 3:
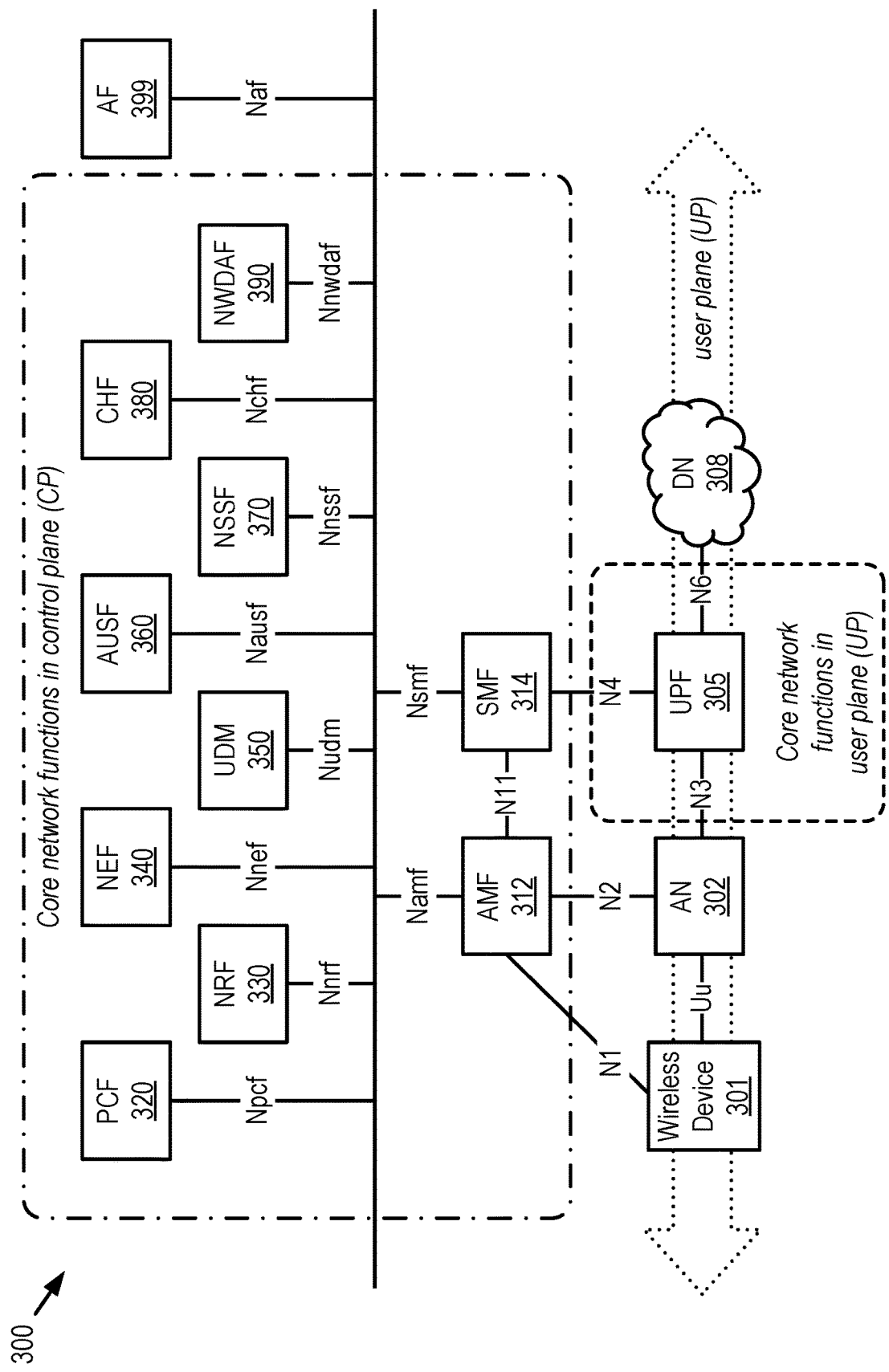
FIG. 3 shows an example communication network.

FIG. 3 shows an example communication network 300. The Communication network 300 may comprise a wireless device 301, an AN 302, and/or a DN 308. The other elements shown in FIG. 3 may be included in and/or associated with a core network. An element (e.g., each element) of the core network may be an NF.

The NFs may comprise a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and/or an application function (AF) 399. The UPF 305 may be a user plane core network function. The NFs 312, 314, and 320-390 may be control plane core network functions. The core network may comprise additional instances of any of the NFs shown in FIG. 3 and/or one or more different types of NF that provide different services. Other examples of NF type may comprise a gateway mobile location center (GMLC), a location management function (LMF), an operations, administration, and maintenance function (OAM), a public warning system (PWS), a short message service function (SMSF), a unified data repository (UDR), and/or an unstructured data storage function (UDSF).

An element (e.g., each element) shown in FIG. 3 may comprise an interface with at least one other element. The interface may be a logical connection and/or a direct physical connection. Any interface may be identified/indicated using a reference point representation and/or a service-based representation. In a reference point representation, the letter N may be used followed by a numeral to indicate an interface between two specific elements. For example, as shown in FIG. 3, the AN 302 and the UPF 305 may interface via N3, whereas UPF 305 and DN 308 may interface via N6. In a service-based representation, the letter N may be followed by one or more alphabets/letters. The letters may identify/indicate an NF that provides services to the core network. For example, PCF 320 may provide services via interface Npcf. The PCF 320 may provide services to any NF in the core network via Npcf. A service-based representation may correspond to a bundle of reference point representations. For example, the Npcf interface between PCF 320 and the core network may generally correspond to an N7 interface between PCF 320 and SMF 314, an N30 interface between PCF 320 and NEF 340, and/or an N# interface between any functions where # may indicate any number.

The UPF 305 may serve as a gateway for user plane traffic between the AN 302 and the DN 308. The wireless device 301 may connect to UPF 305 via a Uu interface and an N3 interface (also described as NG-U interface). The UPF 305 may connect to the DN 308 via an N6 interface. The UPF 305 may connect to one or more other UPFs (not shown) via an N9 interface. The wireless device 301 may be configured to receive services through a protocol data unit (PDU) session. The PDU session may be a logical connection between the wireless device 301 and the DN 308. The UPF 305 (or a plurality of UPFs) may be selected by the SMF 314 to handle/process a particular PDU session between the wireless device 301 and the DN 308. The SMF 314 may control the functions of the UPF 305 with respect to the PDU session. The SMF 314 may connect to the UPF 305 via an N4 interface. The UPF 305 may handle/process any quantity of PDU sessions associated with any quantity of wireless devices (via any quantity of ANs). The UPF 305 may be controlled, for handling the one or more PDU sessions, by any quantity of SMFs via any quantity of corresponding N4 interfaces.

The AMF 312 may control wireless device access to the core network. The wireless device 301 may register with the network via the AMF 312. for the wireless device 301 may register with the network prior to establishing a PDU session. The AMF 312 may manage a registration area of the wireless device 301, which may enable the network to track the physical location of wireless device 301 within the network. The AMF 312 may manage wireless device mobility for a wireless device in connected mode. For example, the AMF 312 may manage wireless device handovers from one AN (or portion thereof) to another. The AMF 312 may perform, for a wireless device in idle mode, registration updates, and/or page the wireless device to transition the wireless device to connected mode.

The AMF 312 may receive, from the wireless device 301, NAS messages. The NAS messages may be sent/transmitted in accordance with NAS protocol. NAS messages may relate to communications between the wireless device 301 and the core network. NAS messages may be relayed to the AMF 312 via the AN 302. Communication between the wireless device 301 and the AMF 312 may be represented as communication via the N1 interface. NAS messages may facilitate wireless device registration and mobility management, for example, by authenticating, identifying, configuring, and/or managing a connection of the wireless device 301. NAS messages may support session management procedures for maintaining user plane connectivity and quality of service (QoS) of a session between the wireless device 301 and the DN 309. The AMF 312 may send a NAS message to SMF 314, for example, if the NAS message involves (e.g., is associated with, corresponds to) session management. NAS messages may be used to transport messages between wireless device 301 and other components of the core network (e.g., core network components other than AMF 312 and SMF 314). The AMF 312 may act on/process a NAS message, or alternatively, forward the NAS message to an appropriate core NF (e.g., SMF 314, etc.).

The SMF 314 may establish, modify, and/or release a PDU session based on messaging received from the wireless device 301. The SMF 314 may allocate, manage, and/or assign an IP address to the wireless device 301, for example, based on establishment of a PDU session. Multiple SMFs may be in/associated with the network. Each of the SMFs may be associated with a respective group of wireless devices, base stations, and/or UPFs. A wireless device with multiple PDU sessions may be associated with a different SMF for each PDU session. The SMF 314 may select one or more UPFs to handle/process a PDU session. The SMF 314 may control the handling/processing of the PDU session by the selected UPF by providing rules for packet handling (e.g., packet detection rules (PDRs), forwarding action rules (FARs), QoS enforcement rules (QERs), etc.). Rules relating to QoS and/or charging for a particular PDU session may be obtained from the PCF 320 and provided to the UPF 305 (e.g., by the SMF 314).

The PCF 320 may provide/send, to other NFs, services relating to policy rules. The PCF 320 may use subscription data and information about network conditions to determine policy rules. The PCF 320 may provide the policy rules to a particular NF which may be responsible for enforcement of those rules. Policy rules may relate to policy control for access and mobility, and may be enforced by the AMF 312. Policy rules may relate to session management, and may be enforced by the SMF 314. Policy rules may be network-specific, wireless device-specific, session-specific, and/or data flow-specific.

The NRF 330 may provide service discovery functions. The NRF 330 may belong/correspond to a particular PLMN. The NRF 330 may maintain NF profiles relating to other NFs in the communication network 300. The NF profile may comprise, for example, an address, PLMN, and/or type of the NF, a slice indicator/identifier, a list of the one or more services provided by the NF, and/or authorization required to access the services.

The NEF 340 may provide an interface to external domains, permitting the external domains to selectively access the control plane of the communication network 300. The external domain may comprise, for example, third-party network functions, application functions, and/or any other functions. The NEF 340 may act as a proxy between external elements and network functions such as the AMF 312, the SMF 314, the PCF 320, the UDM 350, and/or any other functions. As an example, the NEF 340 may determine a location and/or reachability status of the wireless device 301 based on reports from the AMF 312, and/or may provide status information to an external element. An external element may provide, via the NEF 340, information that facilitates the setting of parameters for establishment of a PDU session. The NEF 340 may determine which data and capabilities of the control plane are exposed to the external domain. The NEF 340 may provide secure exposure (e.g., by authenticating and/or authorizing an external entity) to exposed data or capabilities of the communication network 300. The NEF 340 may selectively control the exposure such that the internal architecture of the core network is hidden/obscured from the external domain.

The UDM 350 may provide data storage for other NFs. The UDM 350 may permit a consolidated view of network information. The consolidated view may be used to ensure that the most relevant information may be made available to different NFs from a single resource. The UDM 350 may store and/or retrieve information from a unified data repository (UDR). For example, the UDM 350 may obtain user subscription data relating to the wireless device 301 from the UDR.

The AUSF 360 may support mutual authentication of the wireless device 301 by the core network and authentication of the core network by the wireless device 301. The AUSF 360 may perform key agreement procedures and provide keying material that may be used to improve security.

The NSSF 370 may select/determine one or more network slices to be used by the wireless device 301. The NSSF 370 may select a slice based on slice selection information. For example, the NSSF 370 may receive single network slice selection assistance information (S-NSSAI) and map the S-NSSAI to a network slice instance identifier (NSI).

The CHF 380 may control billing-related tasks associated with wireless device 301. For example, the UPF 305 may report/send traffic usage information, associated with wireless device 301, to the SMF 314. The SMF 314 may collect usage data from the UPF 305 and one or more other UPFs. The usage data may indicate a quantity of data exchanged, a DN that the data is exchanged with, a network slice associated with the data, and/or any other information that may influence billing. The SMF 314 may share the collected usage data with the CHF 380. The CHF 380 may use the collected usage data to perform billing-related tasks associated with wireless device 301. The CHF 380 may, depending on the billing status of wireless device 301, instruct the SMF 314 to limit and/or influence/control access of the wireless device 301 and/or provide billing-related notifications to wireless device 301.

The NWDAF 390 may collect and/or analyze data from other NFs and/or offer data analysis services to other NFs. The NWDAF 390 may receive/collect, from the UPF 305, the AMF 312, and/or the SMF 314, data/information relating to a load level for a particular network slice instance. The NWDAF 390 may provide (e.g., based on the collected data) load level data to the PCF 320 and/or the NSSF 370, and/or may notify the PCF 320 and/or the NSSF 370 if a load level for a slice reaches and/or if a load level for a slice exceeds a load level threshold.

The AF 399 may be outside the core network, but may interact with the core network to provide information relating to the QoS requirements and/or traffic routing preferences associated with a particular application. The AF 399 may access the core network based on the exposure constraints imposed by the NEF 340. An operator of the core network may consider the AF 399 to be a trusted domain that may directly access the core network (and/or the communication network 300).

Figure 4A:
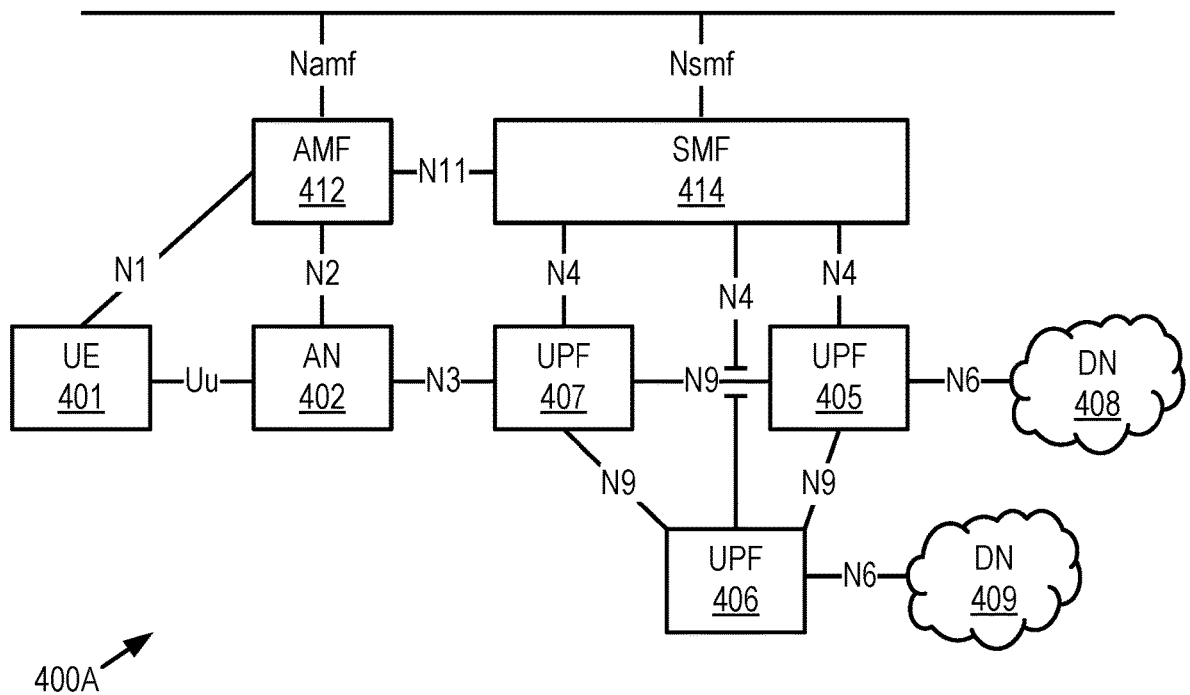
FIG. 4A and FIG. 4B show example core network architectures.
Figure 4B:
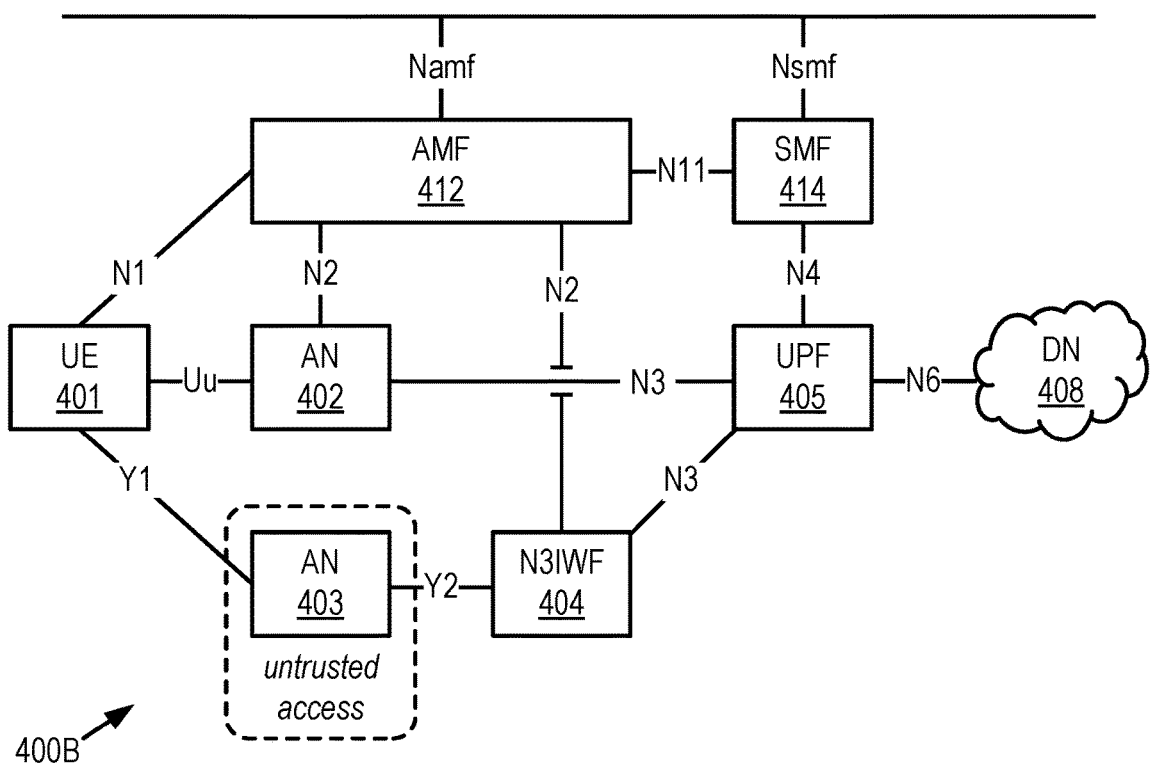
Figure 5:
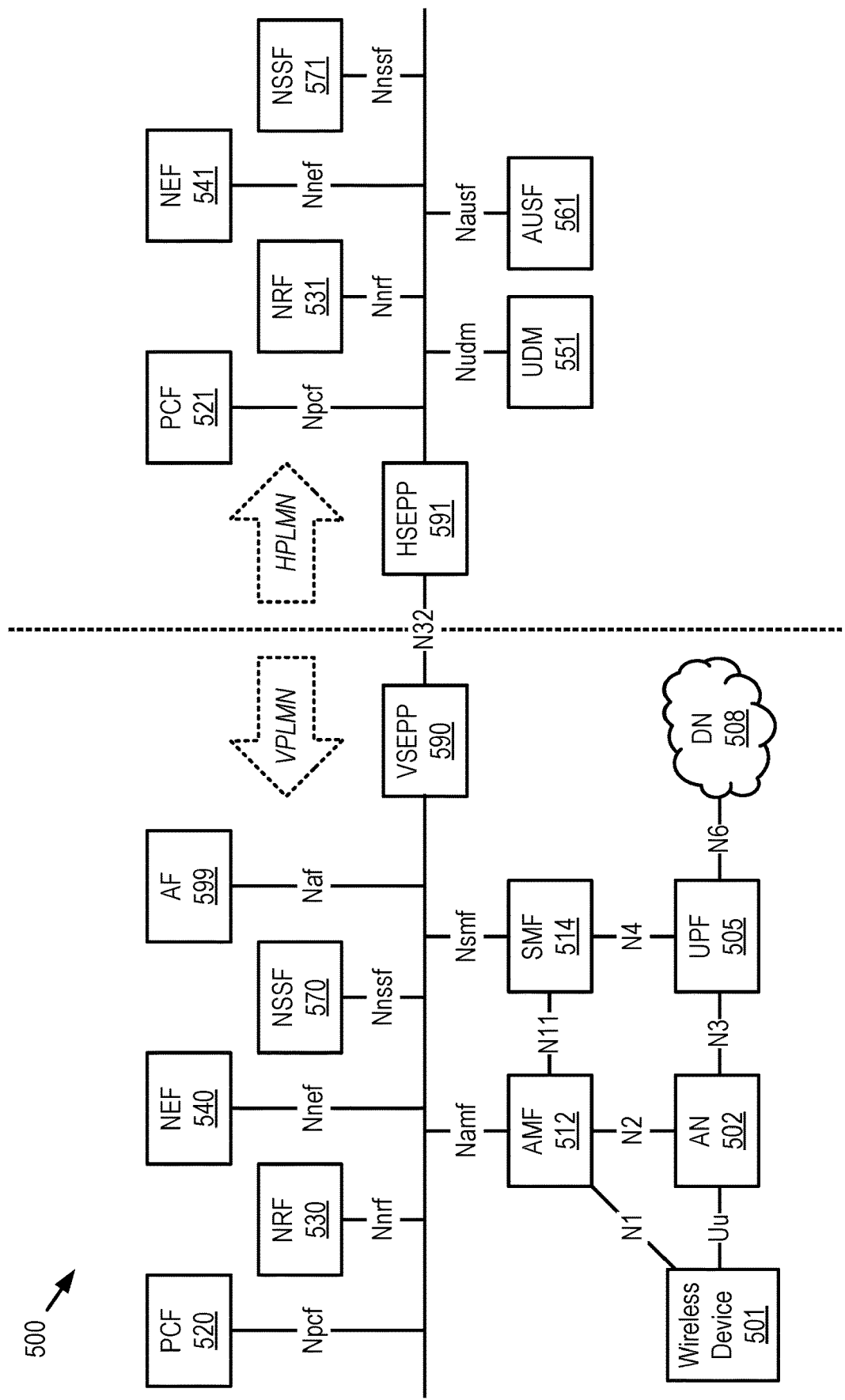
FIG. 5 shows an example of a core network architecture.

FIGS. 4A, 4B, and 5 show examples of core network architectures. The core network architectures shown in FIGS. 4A, 4B, and 5 may be analogous in some respects to the core network architecture 300 shown in FIG. 3. For brevity, some of the core network elements shown in FIG. 3 are not shown in FIGS. 4A, 4B, and 5 but may be included in one or more of these core network architectures. Many of the elements shown in FIGS. 4A, 4B, and 5 may be analogous in some respects to elements depicted in FIG. 3. For brevity, some of the details relating to their functions or operation are not shown but may be included in one or more of these core network architectures. Operation of one or more elements shown in FIGS. 4A, 4B, and 5 may be similar, or substantially similar, to corresponding elements shown in FIG. 3.

FIG. 4A shows an example of a core network architecture. The core network architecture 400A of FIG. 4A may comprise an arrangement of multiple UPFs. Core network architecture 400A may comprise one or more of: a wireless device 401, an AN 402, an AMF 412, and/or an SMF 414. The core network architecture 400A may comprise multiple UPFs (e.g., a UPF 405, a UPF 406, and a UPF 407) and multiple DNs (e.g., a DN 408 and a DN 409). Each of the multiple UPFs 405, 406, 407 may communicate with the SMF 414 via a corresponding N4 interface. The DNs 408, 409 may communicate with the UPFs 405, 406, respectively, via N6 interfaces. The multiple UPFs 405, 406, 407 may communicate with one another via N9 interfaces.

The UPFs 405, 406, 407 may perform traffic detection. The UPFs 405, 406, 407 may indicate, identify, and/or classify packets. Packet indication/identification may be performed based on PDRs provided by the SMF 414. PDRs may comprise packet detection information. Packet detection information may comprise one or more of: a source interface, a wireless device IP address, core network (CN) tunnel information (e.g., a CN address of an N3/N9 tunnel corresponding to a PDU session), a network instance indicator/identifier, a QoS flow indicator/identifier (QFI), a filter set (e.g., an IP packet filter set and/or an ethernet packet filter set), and/or an application indicator/identifier.

PDRs may indicate one or more rules for handling the packet upon detection thereof. The one or more rules may comprise, for example, FARs, multi-access rules (MARs), usage reporting rules (URRs), QERs, and/or any other rule. For example, the PDR may comprise one or more FAR identifiers, MAR identifiers, URR identifiers, and/or QER identifiers. The identifiers may indicate the rules that are prescribed/to be used for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface (e.g., "access" for downlink or "core" for uplink). The FAR may indicate a buffering action rule (BAR), for example, if a packet is to be buffered. The UPF 405 may perform data buffering of a certain quantity downlink packets, for example, if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark/indicate packets belonging to a particular QoS flow with a corresponding QFI. The marking may enable a recipient of the packet to determine a QoS of the packet (e.g., a QoS to be enforced for the packet).

The UPF 405 may provide/send usage reports to the SMF 414 in accordance with a URR. The URR may indicate one or more triggering conditions for generation and/or reporting of the usage report. The reporting may be based on immediate reporting, periodic reporting, a threshold for incoming uplink traffic, and/or any other suitable triggering condition. The URR may indicate a method for measuring usage of network resources (e.g., data volume, duration, and/or event).

The DNs 408, 409 may comprise public DNs (e.g., the Internet), private DNs (e.g., private, internal corporate-owned DNs), and/or intra-operator DNs. A DN (e.g., each DN) may provide an operator service and/or a third-party service. The service provided by a DN may be an Internet service, an IP multimedia subsystem (IMS), an augmented or virtual reality network, an edge computing or mobile edge computing (MEC) network, and/or any other service. A DN (e.g., each DN) may be indicated/identified using a data network name (DNN). The wireless device 401 may be configured to establish a first logical connection with the DN 408 (e.g., a first PDU session), a second logical connection with DN 409 (e.g., a second PDU session), or both simultaneously (e.g., the first PDU session and the second PDU sessions).

A PDU session (e.g., each PDU) session may be associated with at least one UPF configured to operate as a PDU session anchor (PSA, or anchor). The anchor may be a UPF that may provide an N6 interface with a DN.

The UPF 405 may be the anchor for the first PDU session between wireless device 401 and DN 408. The UPF 406 may be the anchor for the second PDU session between wireless device 401 and DN 409. The core network may use the anchor to provide service continuity of a particular PDU session (e.g., IP address continuity) as wireless device 401 moves from one access network to another. The wireless device 401 may establish a PDU session using a data path to the DN 408 and using an access network other than AN 402. The data path may use the UPF 405 acting as anchor. The wireless device 401 may (e.g., later) move into the coverage area of the AN 402. The SMF 414 may select a new UPF (e.g., the UPF 407) to bridge the gap between the newly-entered access network (e.g., the AN 402) and the anchor UPF (e.g., the UPF 405). The continuity of the PDU session may be preserved as any quantity/number of UPFs may be added and/or removed from the data path. A UPF added to a data path (e.g., as shown in FIG. 4A) may be described as an intermediate UPF and/or a cascaded UPF.

The UPF 406 may be the anchor for the second PDU session between wireless device 401 and the DN 409. The anchor for the first PDU session and the anchor for the second PDU sessions being associated with different UPFs (e.g., as shown in FIG. 4A) is merely exemplary. Multiple PDU sessions with a single DN may correspond to any quantity/number of anchors. A UPF at the branching point (e.g., the UPF 407 in FIG. 4) may operate as an uplink classifier (UL-CL), for example, if there are multiple UPFs. The UL-CL may divert uplink user plane traffic to different UPFs.

The SMF 414 may allocate, manage, and/or assign an IP address to the wireless device 401. The SMF 414 may allocate, manage, and/or assign an IP address to the wireless device 401, for example, based on establishment of a PDU session. The SMF 414 may maintain an internal pool of IP addresses to be assigned. The SMF 414 may (e.g., if necessary) assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of wireless device 401 may be maintained (and the same anchor UPF may be used) as the wireless device moves within the network. In SSC mode 2, the IP address of wireless device 401 may be changed as the wireless device 401 moves within the network. For example, the old IP address and an old anchor UPF may be abandoned and a new IP address and a new anchor UPF may be established, for example, as the wireless device 401 moves within the network. In SSC mode 3, it may be possible to maintain an old IP address (e.g., similar to SSC mode 1) temporarily while establishing a new IP address (e.g., similar to SSC mode 2). Applications that may be sensitive to IP address changes may operate in accordance with SSC mode 1.

UPF selection may be controlled by the SMF 414. The SMF 414 may select the UPF 405 as the anchor for the PDU session and/or the UPF 407 as an intermediate UPF, for example, based on establishment and/or modification of a PDU session between the wireless device 401 and DN 408. Criteria for UPF selection may comprise path efficiency and/or speed (e.g., a data rate) between the AN 402 and the DN 408. Reliability, load status, location, slice support and/or other capabilities of candidate UPFs may also be considered for UPF selection.

FIG. 4B shows an example of a core network architecture. The core network architecture 400B of FIG. 4B may accommodate untrusted access. The wireless device 401, as shown in FIG. 4B, may communicate with (e.g., connect to) the DN 408 via the AN 402 and the UPF 405. The AN 402 and the UPF 405 may constitute/comprise/provide trusted (e.g., 3GPP) access to the DN 408. The wireless device 401 may access the DN 408 using an untrusted access network. The untrusted access network may comprise the AN 403 and/or a non-3GPP interworking function (N3IWF) 404.

The AN 403 may be a wireless local area network (WLAN) (e.g., operating in accordance with the IEEE 802.11 standard). The wireless device 401 may communicate with (e.g., connect to) the AN 403 via an interface Y1. The connection may be in a manner that is prescribed for the AN 403. The connection to the AN 403 may or may not involve authentication. The wireless device 401 may obtain/receive an IP address from the AN 403. The wireless device 401 may determine to connect to the core network 400B using untrusted access. The AN 403 may communicate with N3IWF 404 via a Y2 interface. After selecting untrusted access, the wireless device 401 may provide N3IWF 404 with sufficient information to select an AMF. The selected AMF may be, for example, the same AMF that is used by wireless device 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA). The UPF 405 may remain the anchor for a PDU session, for example, even as wireless device 401 shifts between trusted access and untrusted access.

FIG. 5 shows an example of a core network architecture. The core network architecture 500 of FIG. 5 may correspond to an example in which a wireless device 501 may be roaming. The wireless device 501 (e.g., in a roaming scenario) may be a subscriber of a first PLMN (e.g., a home PLMN, or HPLMN) but may attach to a second PLMN (e.g., a visited PLMN, or VPLMN). The core network architecture 500 may comprise a wireless device 501, an AN 502, a UPF 505, and/or a DN 508. The AN 502 and the UPF 505 may be associated with a VPLMN. The VPLMN may manage the AN 502 and/or the UPF 505 using core network elements associated with the VPLMN. The core network elements associated with the VPLMN may comprise an AMF 512, an SMF 514, a PCF 520, an NRF 530, an NEF 540, and/or an NSSF 570. An AF 599 may be adjacent the core network of the VPLMN.

The wireless device 501 may not be a subscriber of the VPLMN. The AMF 512 may authorize the wireless device 501 to access the network (e.g., the VPLMN), for example, based on roaming restrictions that may apply to wireless device 501. The core network of the VPLMN may interact with core network elements of an HPLMN of the wireless device 501 (e.g., a PCF 521, an NRF 531, an NEF 541, a UDM 551, and/or an AUSF 561), for example, to obtain network services provided by the VPLMN. The VPLMN and the HPLMN may communicate using an N32 interface connecting respective security edge protection proxies (SEPPs). The respective SEPPs may be a VSEPP 590 and/or an HSEPP 591.

The VSEPP 590 and/or the HSEPP 591 may communicate via an N32 interface (e.g., for defined purposes). The VSEPP 590 and the HSEPP 591 may communicate via an N32 interface while concealing information about each PLMN from the other. The SEPPs may apply roaming policies, for example, based on communications via the N32 interface. The PCF 520 and/or the PCF 521 may communicate via the SEPPs to exchange policy-related signaling. The NRF 530 and/or the NRF 531 may communicate via the SEPPs to enable service discovery of NFs in the respective PLMNs. The VPLMN and HPLMN may independently maintain the NEF 540 and the NEF 541. The NSSF 570 and/or the NSSF 571 may communicate via the SEPPs to coordinate slice selection for the wireless device 501. The HPLMN may handle all authentication and subscription related signaling. The VPLMN may authenticate the wireless device 501 and/or obtain subscription data of the wireless device 501 by accessing, via the SEPPs, the UDM 551 and the AUSF 561 of the HPLMN, for example, if the wireless device 501 registers and/or requests service via the VPLMN.

The core network architecture 500 may be referred to as a local breakout configuration, in which the wireless device 501 may access the DN 508 using one or more UPFs of the VPLMN (i.e., the UPF 505). Other configurations are possible. For example, in a home-routed configuration (not shown in FIG. 5), the wireless device 501 may access a DN using one or more UPFs of the HPLMN. In the home-routed configuration, an N9 interface may run parallel to the N32 interface, crossing the frontier between the VPLMN and the HPLMN, to carry user plane data. One or more SMFs of the respective PLMNs may communicate, via the N32 interface, to coordinate session management for the wireless device 501. The SMFs may control their respective UPFs on either side of the frontier.

Figure 6:
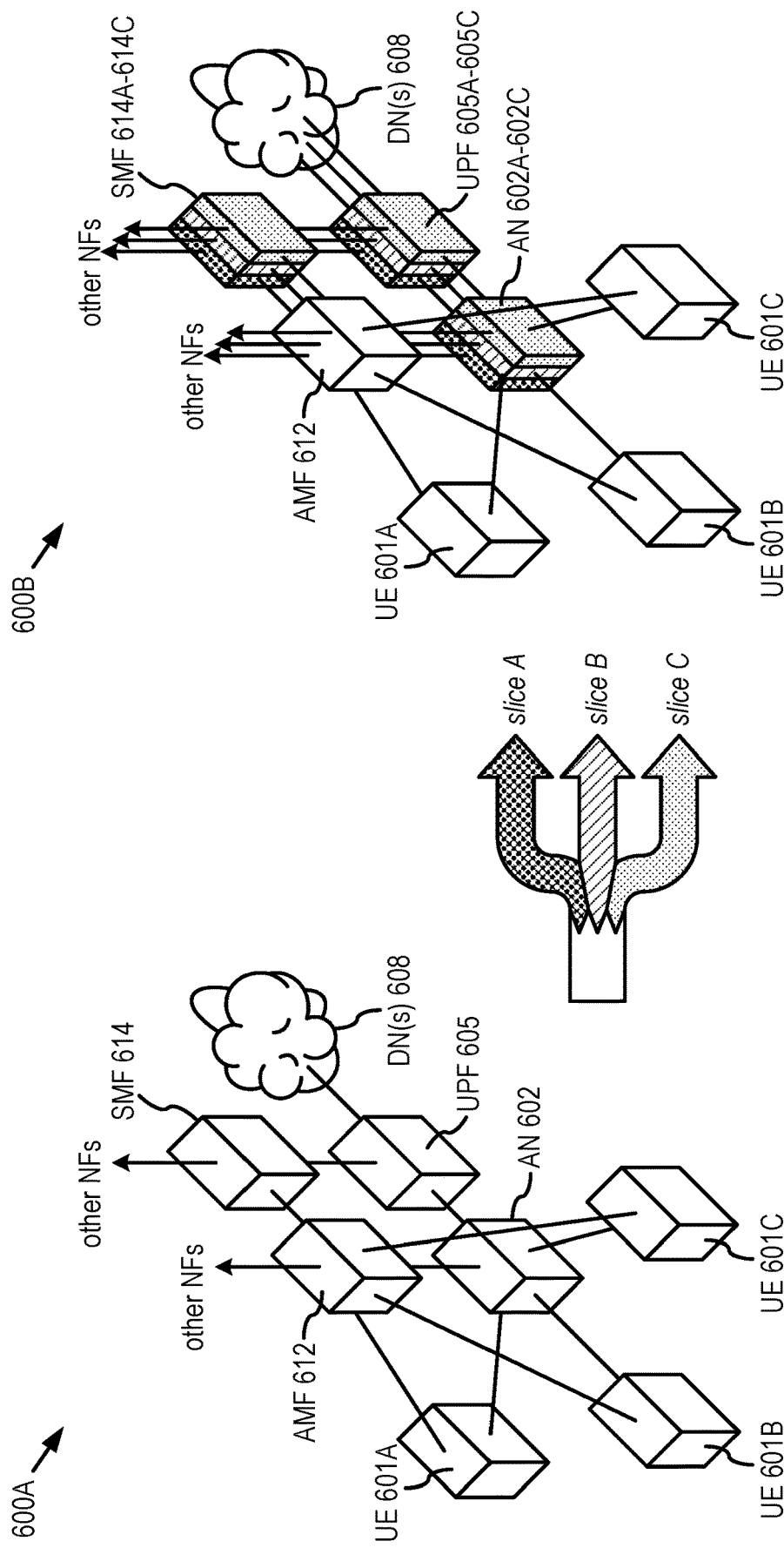
FIG. 6 shows an example of network slicing.

FIG. 6 shows an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A shows an un-sliced physical network corresponding to a single logical network. The network architecture 600A may comprise a user plane. Wireless devices 601A, 601B, 601C (collectively, wireless devices 601) may have a physical and/or a logical connection to a DN 608 via an AN 602 and a UPF 605 of the user plane. The network architecture 600A may comprise a control plane. An AMF 612 and an SMF 614, in the control plane, may control various aspects of the user plane.

The network architecture 600A may have a specific set of characteristics (e.g., relating to maximum bit rate, reliability, latency, bandwidth usage, power consumption, etc.). The set of characteristics may be affected by the nature/properties of the network elements (e.g., processing power, availability of free memory, proximity to other network elements, etc.) and/or the management thereof (e.g., optimization to maximize bit rate or reliability, reduce latency, reduce power, reduce bandwidth usage, etc.). The characteristics of the network architecture 600A may change over time. For example, by upgrading equipment and/or by modifying procedures to target a particular characteristic may change the characteristics of the network architecture 600A. At any given time, the network architecture 600A may have a single set of characteristics that may or may not be optimized for a particular use case. For example, wireless devices 601A, 601B, 601C may have different requirements, with the network architecture 600A being optimized for one of the three wireless devices.

The network architecture 600B shows an example of a sliced physical network divided into multiple logical networks. The physical network may be divided into three logical networks (e.g., slice A, slice B, and slice C). For example, the wireless device 601A may be served by AN 602A, UPF 605A, AMF 612, and SMF 614A. Wireless device 601B may be served by AN 602B, UPF 605B, AMF 612, and SMF 614B. Wireless device 601C may be served by AN 602C, UPF 605C, AMF 612, and SMF 614C. Although the respective wireless devices 601 may communicate with different network elements from a logical perspective, the network elements may be deployed by a network operator using the same physical network elements.

One or more network slices (e.g., each network slice) may be configured for providing network services with different sets of characteristics. For example, slice A may correspond to an enhanced mobile broadband (eMBB) service. Mobile broadband may refer to internet access by mobile users, commonly associated with smartphones. Slice B may correspond to ultra-reliable low-latency communication (URLLC), which may focus on reliability and speed. Relative to eMBB, URLLC may improve the feasibility of use cases such as autonomous driving and telesurgery. Slice C may correspond to massive machine type communication (mMTC), which may focus on low-power services delivered to a large number of users. For example, slice C may be optimized for a dense network of battery-powered sensors that may provide small amounts of data at regular intervals. Many mMTC use cases may be prohibitively expensive if they operated using an eMBB or URLLC network.

A network slice serving a wireless device 601 may be updated (e.g., to provide better and/or more suitable services), for example, if service requirements for one of the wireless devices 601 changes. The set of network characteristics corresponding to eMBB, URLLC, and mMTC may be varied, such that differentiated species of eMBB, URLLC, and mMTC may be provided for a wireless device. Network operators may provide entirely new services, for example, based on/in response to customer demand.

A wireless device 601 (e.g., each of the wireless devices 601) may have/use (or be associated with) a corresponding network slice. A single slice may serve any number/quantity of wireless devices and a single wireless device may operate using any number/quantity of slices. The AN 602, the UPF 605 and the SMF 614 may be separated into three separate slices, and the AMF 612 may be unsliced. A network operator may deploy any architecture that selectively utilizes any mix of sliced and unsliced network elements, with different network elements divided into different numbers/quantities of slices. Although FIG. 6 shows three core network functions (e.g., the UPF 605, the AMF 612, the SMF 614), other core network functions (e.g., such as other core network functions not shown) may be sliced. A PLMN that supports multiple network slices may maintain a separate network repository function (NFR) for each slice, which may enable other NFs to discover network services associated with that slice.

Network slice selection may be controlled by an AMF, or alternatively, by a separate network slice selection function (NSSF). For example, a network operator may define/configure and implement distinct network slice instances (NSIs). Each NSI may be associated with single network slice selection assistance information (S-NSSAI). The S-NSSAI may comprise a particular slice/service type (SST) indicator (e.g., indicating eMBB, URLLC, mMTC, etc.). For example, a particular tracking area may be associated with one or more configured S-NSSAIs. wireless devices may identify one or more requested and/or subscribed S-NSSAIs (e.g., during registration). The network may indicate to the wireless device one or more allowed and/or rejected S-NSSAIs.

The S-NSSAI may comprise a slice differentiator (SD) to distinguish between different tenants of a particular slice and/or service type. For example, a tenant may be a customer (e.g., a vehicle manufacture, a service provider, etc.) of a network operator that obtains (e.g., purchases) guaranteed network resources and/or specific policies for servicing its subscribers. The network operator may configure different slices and/or slice types, and use the SD to determine which tenant is associated with a particular slice.

Figure 7C:
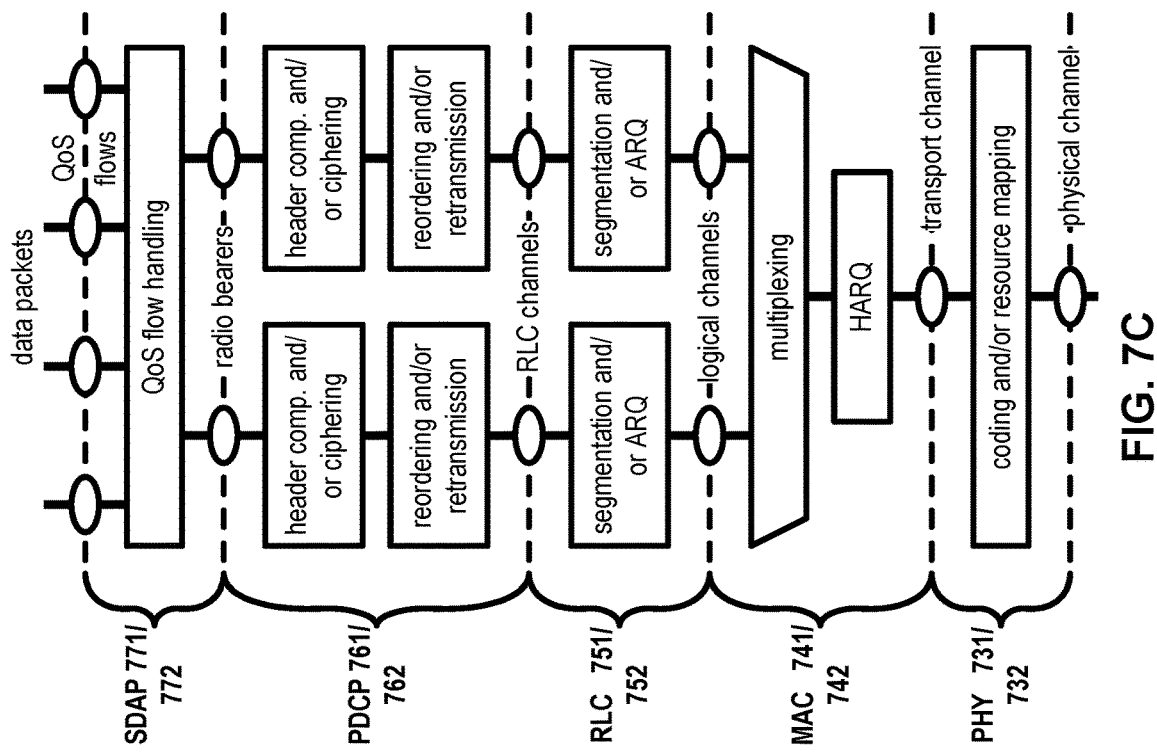
FIG. 7C shows example services provided between protocol layers of the user plane protocol stack.
Figure 7A:
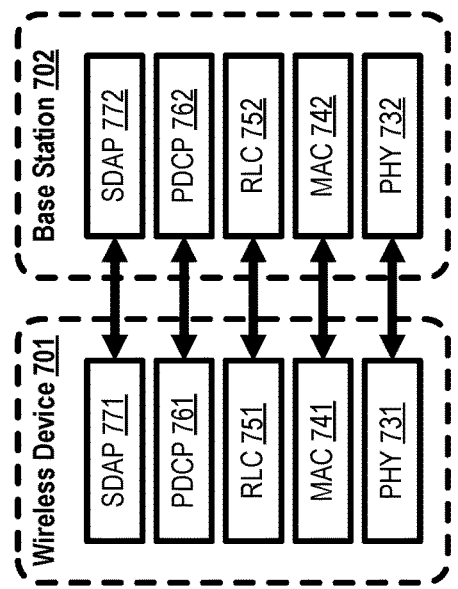
FIG. 7A shows an example a user plane protocol stack.
Figure 7B:
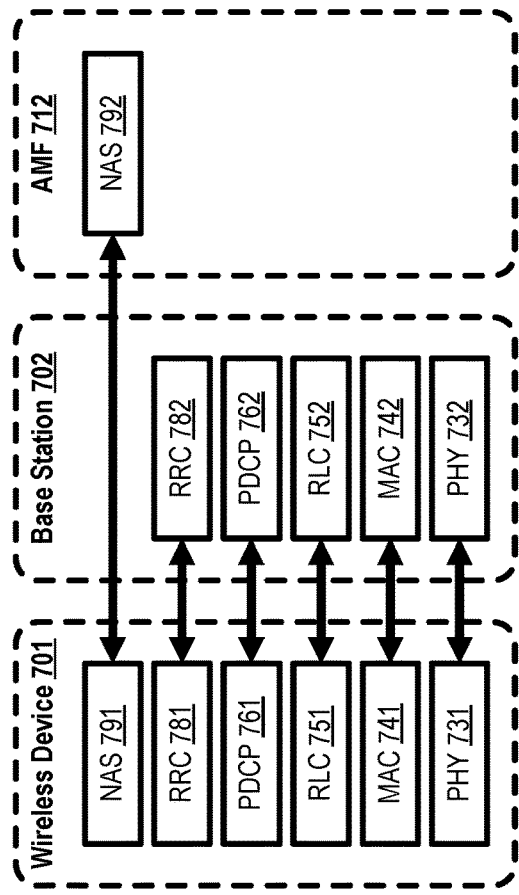
FIG. 7B shows an example a control plane protocol stack.

FIG. 7A shows an example UP protocol stack. FIG. 7B shows an example CP protocol stack. FIG. 7C shows example services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a PHY layer. PHY layer may correspond to physical infrastructure used for transfer of signals (e.g., cables, fiber optics, and/or radio frequency transceivers). Layer 1 (e.g., in NR protocols) may comprise a PHY layer. Layer 2 may correspond to a data link layer. Layer 2 may correspond to/be associated with packaging of data (into, e.g., data frames) for transfer, between nodes of the network (e.g., using the physical infrastructure of layer 1). Layer 2 (e.g., in NR protocols) may comprise a MAC layer, an RLC layer, a PDCP layer, and an SDAP layer.

Layer 3 may correspond to a network layer. Layer 3 may be associated with routing of the data which has been packaged in layer 2. Layer 3 may handle prioritization of data and traffic avoidance. Layer 3 (e.g., in NR protocols) may comprise an RRC layer and a NAS layer. Layers 4 through 7 may correspond to a transport layer, a session layer, a presentation layer, and an application layer. The application layer may interact with an end user to provide data associated with an application. An end user, implementing the application, may generate data associated with the application and initiate sending of that information to a targeted data network (e.g., the Internet, an application server, etc.). Starting at the application layer, each layer in the OSI model may manipulate and/or repackage the information and/or deliver it to a lower layer. At the lowest layer, the manipulated and/or repackaged information may be exchanged via physical infrastructure (e.g., electrically, optically, and/or electromagnetically). The information, approaching/received at the targeted data network, may be unpackaged and provided to higher layers, for example, until it reaches the application layer in a form that is usable by the targeted data network (e.g., the same form in which it was provided by the end user). The data network may perform this procedure, in reverse, for responding to the end user.

FIG. 7A shows an example UP protocol stack. The UP protocol stack may be an NR protocol stack for a Uu interface between a wireless device 701 and a base station 702. In layer 1 of the UP protocol stack, the wireless device 701 may implement a PHY layer (e.g., PHY 731) and the base station 702 may implement a PHY layer (e.g., PHY 732). In layer 2 of the UP protocol stack, the wireless device 701 may implement a MAC layer (e.g., MAC 741), an RLC layer (e.g., RLC 751), a PDCP layer (e.g., PDCP 761), and an SDAP layer (e.g., SDAP 771). The base station 702 may implement a MAC layer (e.g., MAC 742), an RLC layer (e.g., RLC 752), a PDCP layer (e.g., PDCP 762), and an SDAP layer (e.g., SDAP 772).

FIG. 7B shows a CP protocol stack. The CP protocol stack may be an NR protocol stack for the Uu interface between the wireless device 701 and the base station 702 and/or an N1 interface between the wireless device 701 and an AMF 712. In layer 1 of the CP protocol stack, the wireless device 701 may implement the PHY 731 and the base station 702 may implement the PHY 732. In layer 2 of the CP protocol stack, the wireless device 701 may implement the MAC 741, the RLC 751, the PDCP 761, an RRC layer (e.g., RRC 781), and a NAS layer (e.g., NAS 791). The base station 702 may implement the MAC 742, the RLC 752, the PDCP 762, and an RRC layer (e.g., RRC 782). The AMF 712 may implement a NAS layer (e.g., NAS 792).

The NAS (e.g., NAS 791 and NAS 792) may be concerned with/correspond to the non-access stratum. The non-access stratum may comprise communication between the wireless device 701 and the core network (e.g., the AMF 712). Lower layers may be concerned with/correspond to the access stratum. The access stratum may comprise communication between the wireless device 701 and the base station 702. Messages sent between the wireless device 701 and the core network may be referred to as NAS messages. A NAS message may be relayed by the base station 702. Content of the NAS message (e.g., information elements of the NAS message) may not be visible to the base station 702.

FIG. 7C shows an example of services provided between protocol layers (e.g., of the NR user plane protocol stack shown in FIG. 7A). The wireless device 701 may receive services through a PDU session. The PDU session may be a logical connection between the wireless device 701 and a DN. The wireless device 701 and the DN may exchange data packets associated with the PDU session. The PDU session may comprise one or more QoS flows. The SDAP 771 and/or the SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the base station 702. The wireless device 701 may be notified of the mapping (e.g., based on control signaling and/or reflective mapping). The SDAP 772 of the base station 220 may mark downlink packets with a QFI and/or deliver the downlink packets to the wireless device 701 (e.g., for reflective mapping). The wireless device 701 may determine the mapping based on the QFI of the downlink packets.

The PDCP 761 and the PDCP 762 may perform header compression and/or decompression. Header compression may reduce the amount of data transmitted over the physical layer. The PDCP 761 and the PDCP 762 may perform ciphering and/or deciphering. Ciphering may reduce unauthorized decoding of data sent/transmitted over the physical layer (e.g., intercepted on an air interface), and/or may protect data integrity (e.g., to ensure control messages originate from intended sources). The PDCP 761 and/or the PDCP 762 may perform retransmissions of undelivered packets, in-sequence delivery and/or reordering of packets, duplication of packets, and/or identification and removal of duplicate packets. The PDCP 761 and/or the PDCP 762 may perform mapping between a split radio bearer and RLC channels, for example, in a dual connectivity scenario.

The RLC 751 and the RLC 752 may perform segmentation and retransmission through automatic repeat request (ARQ). The RLC 751 and the RLC 752 may perform removal of duplicate data units received from the MAC 741 and the MAC 742, respectively. The RLC 751 and the RLC 752 may provide RLC channels as a service to the PDCP 761 and the PDCP 762, respectively.

The MAC 741 and/or the MAC 742 may perform multiplexing and/or demultiplexing of logical channels. The MAC 741 and/or the MAC 742 may map logical channels to transport channels. The wireless device 701 may (e.g., in MAC 741) multiplex data units of one or more logical channels into a transport block. The wireless device 701 may send/transmit the transport block to the base station 702 using PHY 731. The base station 702 may receive the transport block using the PHY 732. The base station 702 may demultiplex data units of the transport blocks back into logical channels. The MAC 741 and/or the MAC 742 may perform error correction through hybrid automatic repeat request (HARQ), logical channel prioritization, and/or padding.

The PHY 731 and/or the PHY 732 may perform mapping of transport channels to physical channels. The PHY 731 and/or the PHY 732 may perform digital and analog signal processing functions (e.g., coding/decoding and modulation/demodulation) for sending and receiving information (e.g., transmission via an air interface). The PHY 731 and/or the PHY 732 may perform multi-antenna mapping.

Figure 8:
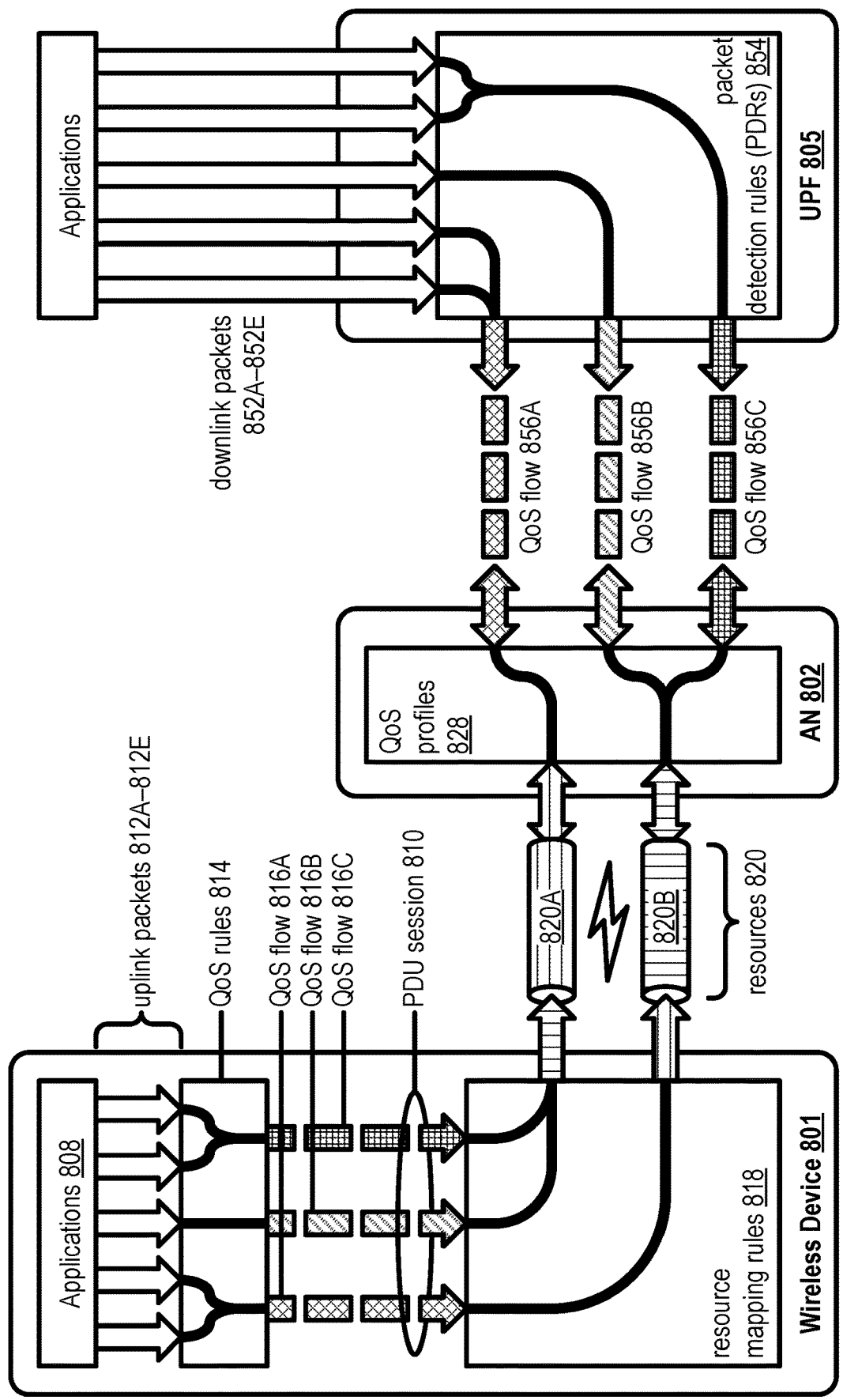
FIG. 8 shows an example quality of service (QoS) model.

FIG. 8 shows an example of a QoS model. The QoS model may be for differentiated data exchange. The QoS model may comprise a wireless device 801, an AN 802, and/or a UPF 805. The QoS model may facilitate prioritization of PDUs (which may also be referred to as packets). Higher-priority packets may be exchanged faster and/or more reliably than lower-priority packets. The network may devote more resources to exchange of high QoS packets (e.g., high priority packets).

A PDU session 810 may be established between the wireless device 801 and the UPF 805. The PDU session 810 may be a logical connection enabling the wireless device 801 to exchange data with a particular data network (e.g., the Internet). The wireless device 801 may request establishment of the PDU session 810. The wireless device 801 may indicate/identify the targeted data network based on its data network name (DNN), for example, at the time that the PDU session 810 is established. The PDU session 810 may be managed by an SMF (not shown). The SMF may select the UPF 805 (and/or optionally, one or more other UPFs, not shown), for example, to facilitate exchange of data associated with the PDU session 810, between the wireless device 801 and the data network.

One or more applications 808 associated with wireless device 801 may generate uplink packets 812A-812E associated with the PDU session 810. The wireless device 801 may apply QoS rules 814 to the uplink packets 812A-812E in accordance with a QoS model. The QoS rules 814 may be associated with the PDU session 810. The QoS rules 814 may be determined by and/or provided to the wireless device 801, for example, based on establishment and/or modification of the PDU session 810 (e.g., if/when the PDU session 810 is established and/or modified). The wireless device 801, based on the QoS rules 814, may classify the uplink packets 812A-812E, map each of the uplink packets 812A-812E to a QoS flow, and/or mark the uplink packets 812A-812E with a QFI. A packet may be sent through the network. A packet may mix with other packets from other wireless devices (e.g., having potentially different priorities). The QFI may indicate how the packet should be handled in accordance with the QoS model. As shown in the example of FIG. 8, uplink packets 812A, 812B may be mapped to a QoS flow 816A, an uplink packet 812C may be mapped to a QoS flow 816B, and the remaining packets may be mapped to QoS flow 816C.

The QoS flows may be the finest granularity of QoS differentiation in a PDU session. In FIG. 8, three QoS flows 816A-816C are shown. A different quantity/number of QoS flows may be present/used (e.g., 1, 2, 4, 5, or any other number/quantity). One or more QoS flows may be associated with a guaranteed bit rate (e.g., guaranteed bit rate (GBR) QoS flows). One or more QoS flows may have bit rates that are not guaranteed (non-GBR QoS flows). QoS flows may be subject to per-wireless device and/or per-session aggregate bit rates. A QoS flow of the QoS flows may be a default QoS flow. QoS flows may have different priorities. For example, the QoS flow 816A may have a higher priority than the QoS flow 816B, which may have a higher priority than the QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may be subject to per-wireless device and/or per-session aggregate bit rates.

The wireless device 801 may apply resource mapping rules 818 to the QoS flows 816A-816C for operating within the QoS model. The air interface between wireless device 801 and/or the AN 802 may be associated with resources 820. The QoS flow 816A may be mapped to resource 820A, and the QoS flows 816B, 816C may be mapped to resource 820B. The resource mapping rules 818 may be provided by the AN 802. The resource mapping rules 818 may designate more resources for relatively high priority QoS flows for meeting QoS requirements. A high priority QoS flow (e.g., the QoS flow 816A) may, based on the resources, be more likely to obtain the high flow bit rate, low packet delay budget, and/or other satisfy other characteristics associated with QoS rules 814. The resources 820 may comprise radio bearers. The radio bearers (e.g., data radio bearers) may be established between the wireless device 801 and the AN 802. The radio bearers in 5G, between the wireless device 801 and the AN 802, may be distinct from bearers in LTE (e.g., evolved packet system (EPS) bearers between a wireless device and a packet data network gateway (PGW), Si bearers between an eNB and a serving gateway (SGW), and/or an S5/S8 bearer between an SGW and a PGW).

A packet associated with a particular QoS flow may be received at the AN 802 via the resource 820A or the resource 820B. The AN 802 may separate packets into respective QoS flows 856A-856C based on QoS profiles 828. The QoS profiles 828 may be received from an SMF. A QoS profile (e.g., each QoS profile) may correspond to a QFI (e.g., the QFI marked on the uplink packets 812A-812E). A QoS profile (e.g., each QoS profile) may comprise QoS parameters. The QoS parameters may comprise/indicate one or both of 5G QoS identifier (5QI) and/or an allocation and retention priority (ARP). The QoS profile for non-GBR QoS flows may comprise/indicate other/additional QoS parameters (e.g., a reflective QoS attribute (RQA)). The QoS profile for GBR QoS flows may further comprise/indicate additional QoS parameters (e.g., a GFBR, an MFBR, and/or a maximum packet loss rate). The 5QI may be a standardized 5QI having one-to-one mapping to a standardized combination of 5G QoS characteristics. The 5QI may be a dynamically assigned 5QI for which the standardized 5QI values may not be defined. The 5QI may represent 5G QoS characteristics. The 5QI may comprise/indicate one or more of a resource type, a default priority level, a packet delay budget (PDB), a packet error rate (PER), a maximum data burst volume, and/or an averaging window. The resource type may indicate a non-GBR QoS flow, a GBR QoS flow, and/or a delay-critical GBR QoS flow. The averaging window may represent a duration over which the GFBR and/or MFBR may be calculated/determined. The ARP may be a priority level comprising pre-emption capability and a pre-emption vulnerability. The AN 802 may apply admission control for the QoS flows (e.g., if resource limitations are determined), for example, based on the ARP.

The AN 802 may select/determine one or more N3 tunnels for transmission of the QoS flows 856A-856C. The packets (e.g., the uplink packets 812A-812E) may be sent to the UPF 805 (e.g., towards a DN) via the selected one or more N3 tunnels. The UPF 805 may verify that the QFIs of the uplink packets 812A-812E are aligned with the QoS rules 814 provided to the wireless device 801. The UPF 805 may measure, count packets, and/or provide packet metrics to one or more other entities in the network (e.g., a NF such as a PCF).

FIG. 8 shows a process that may comprise downlink transmissions. One or more applications may generate downlink packets 852A-852E. The UPF 805 may receive the downlink packets 852A-852E from one or more DNs and/or one or more other UPFs. The UPF 805 may apply PDRs 854 to downlink the packets 852A-852E, for example, based on the QoS model. The UPF 805 may map, based on the PDRs 854, the packets 852A-852E into QoS flows. As shown in FIG. 8, downlink packets 852A, 852B may be mapped to a QoS flow 856A, downlink packet 852C may be mapped to a QoS flow 856B, and/or the remaining packets may be mapped to a QoS flow 856C.

The QoS flows 856A-856C may be sent to the AN 802. The AN 802 may apply resource mapping rules to the QoS flows 856A-856C. The QoS flow 856A may be mapped to the resource 820A. The QoS flows 856B, 856C may be mapped to the resource 820B. The resource mapping rules may designate more resources to high priority QoS flows in order to meet QoS requirements.

FIGS. 9A-9D show example states and state transitions of a wireless device. The wireless device, at any given time, may have (or be associated with) one or more of an RRC state, a registration management (RM) state, and/or a connection management (CM) state.

Figure 9A:
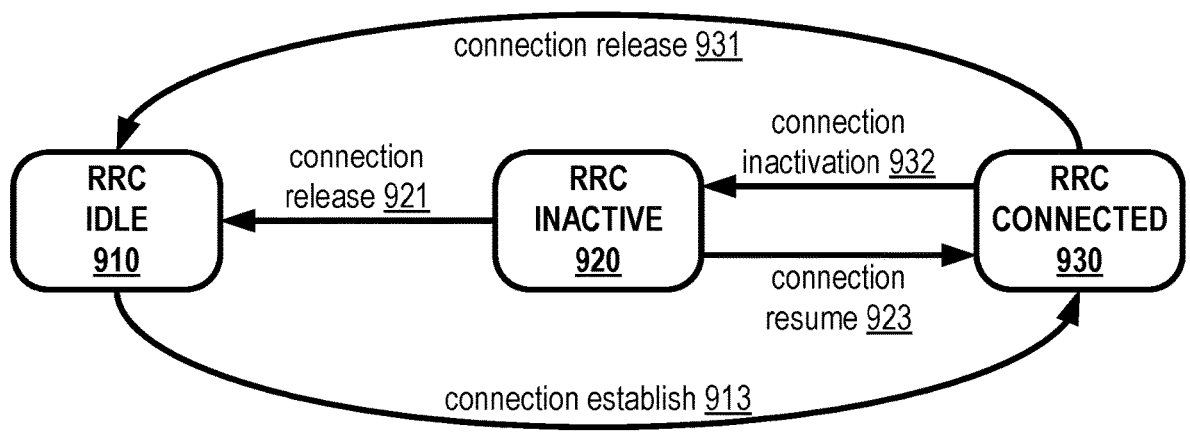
FIG. 9A, FIG. 9B, FIG. 9C, and FIG. 9D show example states and state transitions of a wireless device.

FIG. 9A shows RRC state transitions of a wireless device. The wireless device may be in one of three RRC states: RRC idle 910 (e.g., RRC_IDLE), RRC inactive 920 (e.g., RRC_INACTIVE), or RRC connected 930 (e.g., RRC_CONNECTED). The wireless device may implement/apply/use different RAN-related control plane procedures, for example, depending on the RRC state of the wireless device. Other elements of the network (e.g., a base station) may track RRC state(s) of one or more wireless devices and/or implement/apply/use RAN-related control plane procedures appropriate to an RRC state of each wireless device.

The wireless device may exchange data with a network (e.g., a base station) in an RRC connected state (e.g., RRC connected 930). The parameters necessary for exchange of data may be established and/or may be known to both the wireless device and the network. The parameters may be referred to (and/or may be included in) an RRC context of the wireless device (e.g., which may be referred to as a wireless device context). The parameters may comprise, for example, one or more access stratum (AS) contexts, one or more radio link configuration parameters, bearer configuration information (e.g., relating to a data radio bearer, signaling radio bearer, logical channel, QoS flow, and/or PDU session), security information, and/or PHY layer, MAC layer, RLC layer, PDCP layer, and/or SDAP layer configuration information. The base station with which the wireless device may be connected may store the RRC context of the wireless device.

Mobility of the wireless device, in the RRC connected state, may be managed by the access network. The wireless device may manage mobility, for example, if the wireless device is in an RRC idle state (e.g., the RRC idle 910) and/or an RRC inactive state (e.g., the RRC inactive 920). The wireless device may manage mobility, for example, by measuring signal levels (e.g., reference signal levels) of signals from a serving cell and neighboring cells, and/or by reporting measurements to the base station currently serving the wireless device. The network may initiate handover, for example, based on the reported measurements. The RRC state may transition from the RRC connected state to the RRC idle state via a connection release procedure 930. The RRC state may transition from the RRC connected state to the RRC inactive state via a connection inactivation procedure 932.

An RRC context may not be established for the wireless device. For example, this may be during the RRC idle state. During the RRC idle state (e.g., the RRC idle 910), an RRC context may not be established for the wireless device. During the RRC idle state (e.g., the RRC idle 910), the wireless device may not have an RRC connection with the base station. During the RRC idle state (e.g., the RRC idle 910), the wireless device may be in a sleep state for the majority of the time (e.g., to conserve battery power). The wireless device may wake up periodically (e.g., each discontinuous reception (DRX) cycle) to monitor for paging messages (e.g., paging messages set from the AN). Mobility of the wireless device may be managed by the wireless device via a procedure of a cell reselection. The RRC state may transition from the RRC idle state (e.g., the RRC idle 910) to the RRC connected state (e.g., the RRC connected 930) via a connection establishment procedure 913, which may involve a random access procedure.

A previously established RRC context may be maintained for the wireless device. For example, this may be during the RRC inactive state. During the RRC inactive state (e.g., the RRC inactive 920), the RRC context previously established may be maintained in the wireless device and the base station. The maintenance of the RRC context may enable/allow a fast transition to the RRC connected state (e.g., the RRC connected 930) with reduced signaling overhead as compared to the transition from the RRC idle state (e.g., the RRC idle 910) to the RRC connected state (e.g., the RRC connected 930). The RRC state may transition from the RRC inactive state (e.g., the RRC inactive 920) to the RRC connected state (e.g., the RRC connected 930) via a connection resume procedure 923. The RRC state may transition from the RRC inactive state (e.g., the RRC inactive 920) to the RRC idle state (e.g., the RRC idle 910) via a connection release procedure 921 that may be the same as or similar to connection release procedure 931.

An RRC state may be associated with a mobility management mechanism. During the RRC idle state (e.g., RRC idle 910) and the RRC inactive state (e.g., the RRC inactive 920), mobility may be managed/controlled by the wireless device via a cell reselection. The purpose of mobility management during the RRC idle state (e.g., the RRC idle 910) or during the RRC inactive state (e.g., the RRC inactive 920) may be to enable/allow the network to be able to notify the wireless device of an event via a paging message without having to broadcast the paging message over the entire mobile communications network. The mobility management mechanism used during the RRC idle state (e.g., the RRC idle 910) and/or during the RRC inactive state (e.g., the RRC inactive 920) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms may be based on different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN may send to the wireless device a list of TAIs associated with a wireless device registration area (e.g., a wireless device registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 920), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 920).

Figure 9B:
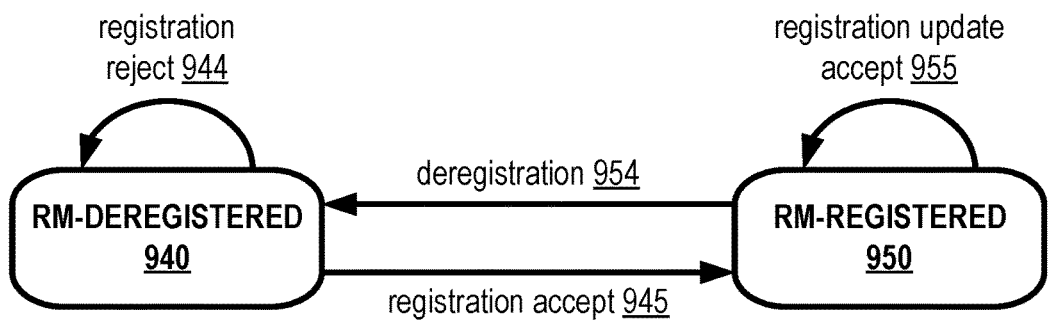

FIG. 9B shows example registration management (RM) state transitions of a wireless device. The states may be RM deregistered 940, (e.g., an RM deregistered state, RM-DEREGISTERED) and RM registered 950 (e.g., an RM deregistered state, RM-REGISTERED).

The wireless device (e.g., in RM deregistered state) may not be registered with the network, and/or the wireless device may not be reachable by the network. The wireless device may perform an initial registration, for example, in order to be reachable by the network. The wireless device may register with an AMF of the network. The wireless device may remain in the RM deregistered state, for example, if registration is rejected (e.g., via a registration reject procedure 944). The wireless device may transition to the RM registered state, for example, if the registration is accepted (e.g., via a registration accept procedure 945). The network may store, keep, and/or maintain a wireless device context for the wireless device, for example, if (e.g., while) the wireless device is in RM registered state. The wireless device context corresponding to network registration (e.g., maintained by the core network) may be different from the RRC context corresponding to RRC state (e.g., maintained by an access network or an element thereof, such as a base station). The wireless device context may comprise a wireless device indicator/identifier and a record of information relating to the wireless device. The information relating to the wireless device may comprise one or more of wireless device capability information, policy information for access and mobility management of the wireless device, lists of allowed or established slices or PDU sessions, and/or a registration area of the wireless device (i.e., a list of tracking areas covering the geographical area where the wireless device is likely to be found).

The network may store the wireless device context of the wireless device, for example, if (e.g., while) the wireless device is in an RM registered state. The network may (e.g., if necessary) use the wireless device context to reach/communicate the wireless device, for example, if (e.g., while) the wireless device is in an RM registered state. Some services may not be provided by the network unless the wireless device is registered. The wireless device may update its wireless device context while remaining in the RM registered state (e.g., via a registration update accept procedure 955). The wireless device may provide a tracking area indicator/identifier to the network, for example, if the wireless device leaves one tracking area and enters another tracking area. The network may deregister the wireless device, or the wireless device may deregister itself (e.g., via a deregistration procedure 954). The network may automatically deregister the wireless device if the wireless device is inactive for a certain amount of time. The wireless device may transition to the RM deregistered state, for example, based on the deregistration.

Figure 9C:
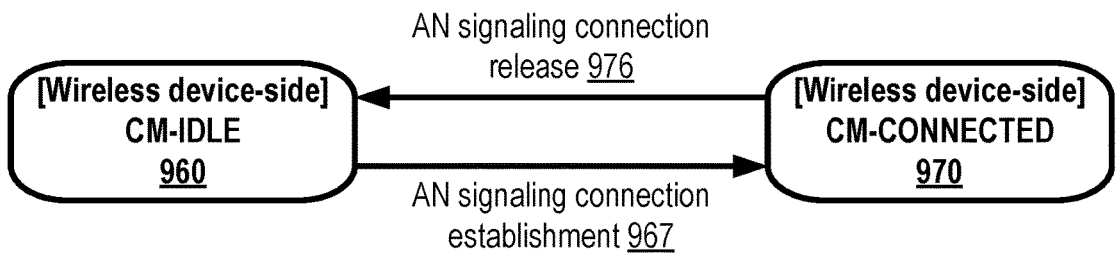

FIG. 9C shows example connection management (CM) state transitions of a wireless device. The example CM state transitions of the wireless device as shown in FIG. 9C are from a perspective of the wireless device. The wireless device may be in CM idle 960 (e.g., CM idle state, CM-IDLE) or CM connected 970 (e.g., CM connected state, CM-CONNECTED).

The wireless device may not have a NAS signaling connection with the network, for example, if the wireless device is in a CM idle state. The wireless device may not communicate with core network functions, for example, based on not having the NAS signaling connection. The wireless device may transition to a CM connected state by establishing an AN signaling connection (e.g., via an AN signaling connection establishment procedure 967). The transition may be initiated by sending an initial NAS message. The initial NAS message may be a registration request (e.g., if the wireless device is in an RM deregistered state) or a service request (e.g., if the wireless device is in an RM registered state). The wireless device may initiate the AN signaling connection establishment by sending a service request and/or the network may send a page (e.g., triggering the wireless device to send the service request), for example, If the wireless device is in an RM registered state.

The wireless device may communicate with core network functions using NAS signaling, for example, if the wireless device is in a CM connected state. For example, the wireless device may exchange (e.g., send and/or receive) NAS signaling with an AMF for registration management purposes, service request procedures, and/or authentication procedures. The wireless device may exchange NAS signaling, with an SMF, to establish and/or modify a PDU session. The network may disconnect the wireless device, or the wireless device may disconnect itself (e.g., via an AN signaling connection release procedure 976). The wireless device may transition to the CM idle state, for example, if the wireless device transitions to the RM deregistered state. The network may deactivate a user plane connection of a PDU session of the wireless device, for example, based on the wireless device transitioning to the CM idle state.

Figure 9D:
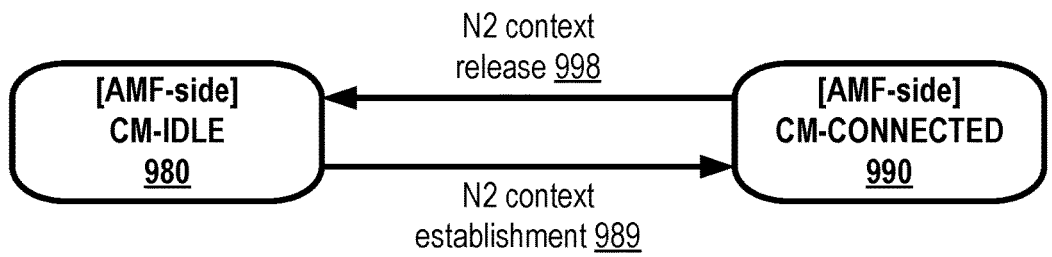

FIG. 9D shows example CM state transitions of the wireless device. The example CM state transitions of the wireless device as shown in FIG. 9D may be from a network perspective (e.g., an AMF perspective). The CM state of the wireless device, as tracked by the AMF, may be CM idle 980 (e.g., CM idle state, CM-IDLE) or CM connected 990 (e.g., CM connected state, CM-CONNECTED). The AMF many establish an N2 context of the wireless device (e.g., via an N2 context establishment procedure 989), for example, based on the wireless device transitioning from CM idle 980 to CM connected 990. The AMF may release the N2 context of the wireless device (e.g., via an N2 context release 998 procedure), for example, based on the wireless device transitioning from CM connected 990 to CM idle 980.

Figure 10:
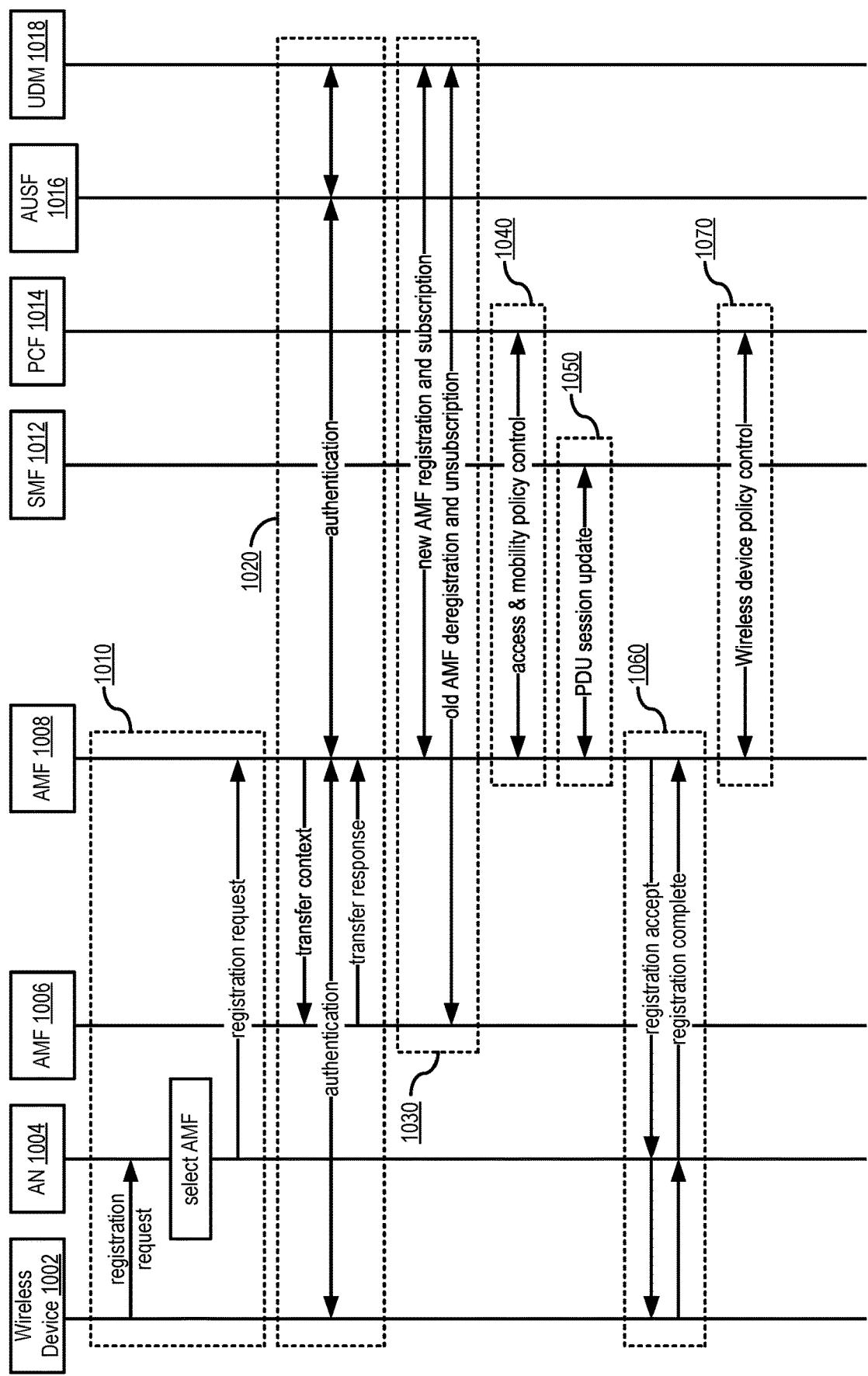
FIG. 10 shows an example registration procedure for a wireless device.
Figure 11:
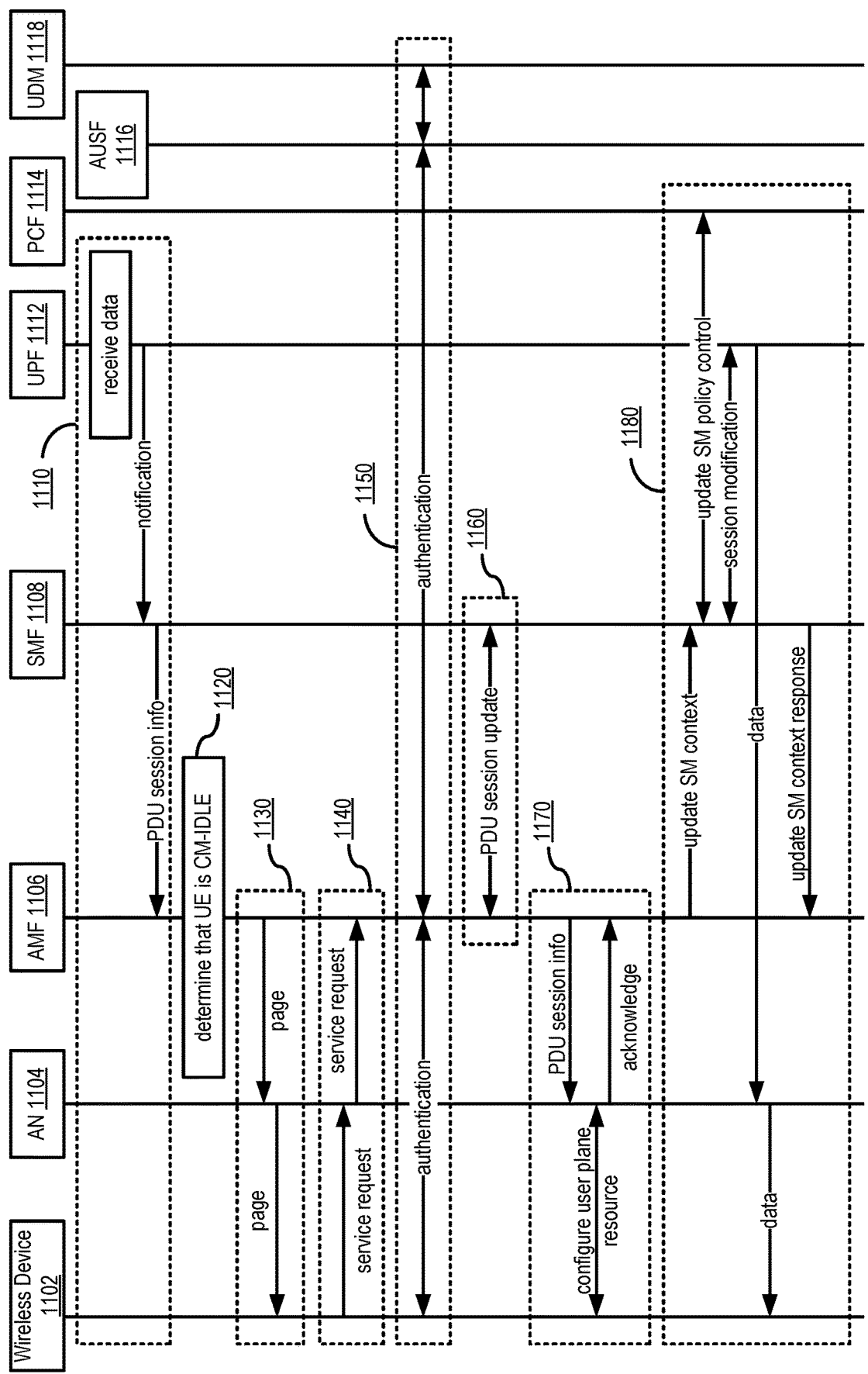
FIG. 11 shows an example service request procedure for a wireless device.
Figure 12:
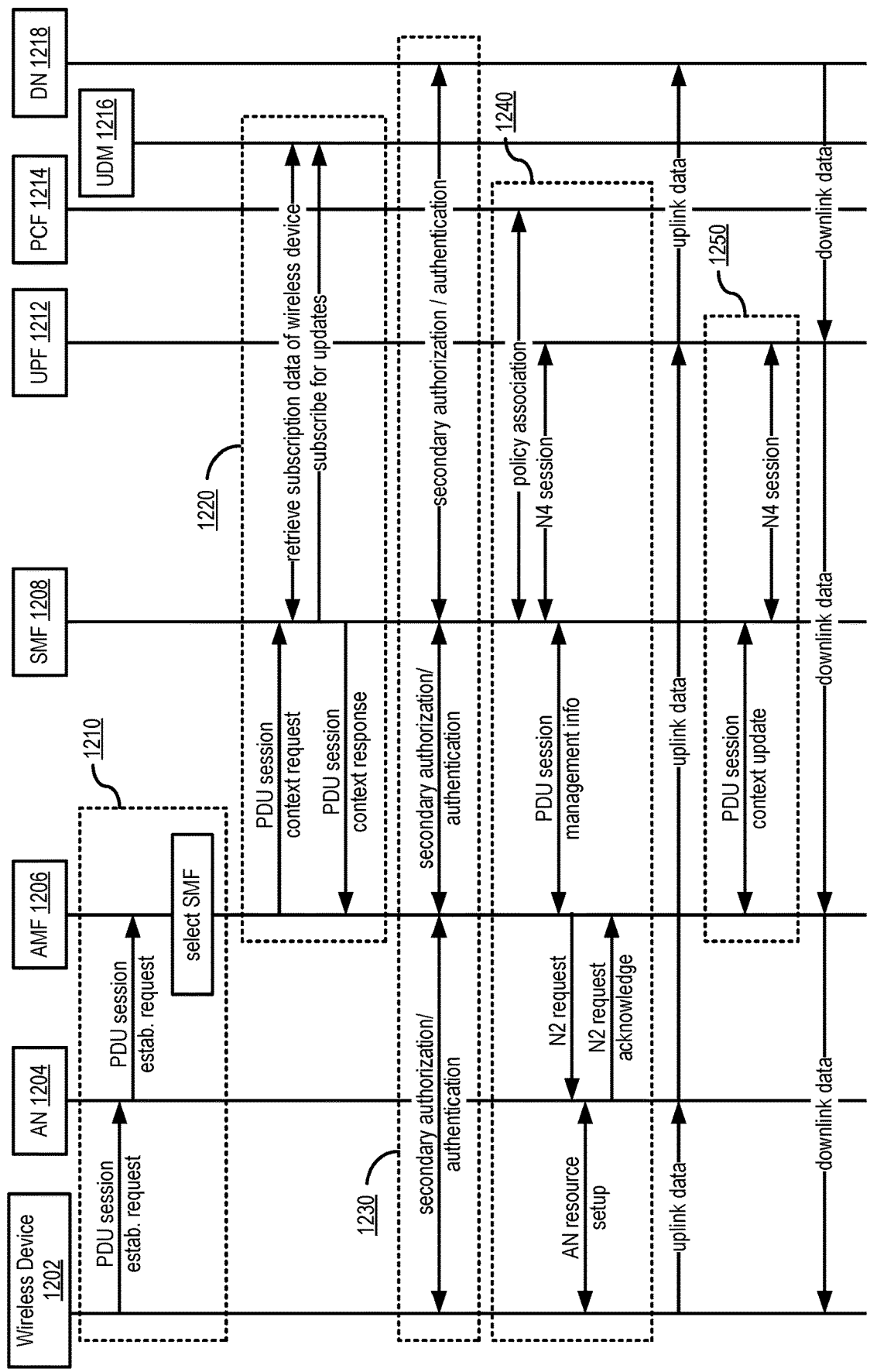
FIG. 12 shows an example of a protocol data unit session establishment procedure for a wireless device.

FIG. 10, FIG. 11, and FIG. 12 show example procedures for registering, service request, and PDU session establishment of a wireless device. FIG. 10 shows an example registration procedure for a wireless device. The wireless device 1002 may transition from an RM deregistered state (e.g., RM deregistered 940) to an RM registered state (e.g., RM registered 950), for example, based on the registration procedure.

Registration may be initiated by a wireless device 1002 for obtaining authorization to receive services, enabling mobility tracking, enabling reachability, and/or any other purpose. The wireless device 1002 may perform an initial registration (e.g., as a first step toward connecting to the network). For example, the wireless device 1002 may perform an initial registration based on the wireless device being powered on (e.g., if the wireless device is powered on), based on an airplane mode being turned off (e.g., if an airplane mode is turned off), and/or based on one or more other conditions and/or events. Registration may be performed periodically which may keep the network informed of the wireless device's presence (e.g., while the wireless device 1002 is in a CM idle state). Registration may be performed based on (e.g., in response to) a change in wireless device capability and/or registration area. Deregistration (not shown in FIG. 10) may be performed to stop network access.

At step 1010, the wireless device 1002 may send/transmit a registration request to an AN 1004. For example, the wireless device 1002 may have moved from a coverage area of a previous AMF (e.g., AMF 1006) into a coverage area of a new AMF (e.g., AMF 1008). The registration request may be/comprise a NAS message. The registration request may comprise a wireless device identifier. The AN 1004 may determine/select an AMF for registration of the wireless device. The AN 1004 may select a default AMF, or may determine/select an AMF that is already mapped to the wireless device 1002 (e.g., a previous AMF). The NAS registration request may comprise a network slice identifier. The AN 1004 may determine/select an AMF based on the requested slice. The AN 1004 may send the registration request to the selected AMF, for example, based on determination of the selected AMF. The selected AMF (e.g., AMF 1008) may receive the registration request.

At step 1020, the AMF that receives the registration request (e.g., AMF 1008) may perform a context transfer. The context may be a wireless device context (e.g., an RRC context for the wireless device). The AMF 1008 may send, to the AMF 1006, a message (e.g., an Namf_Communication_UEContextTransfer message) requesting a context of the wireless device. The message may comprise the wireless device indicator/identifier. The AMF 1006 may send, to the AMF 1008, a message (e.g., an Namf_Communication_UEContextTransfer message) that comprises the requested wireless device context. The AMF 1008 may coordinate authentication of the wireless device 1002, for example, based on receiving the wireless device context. The AMF 1008 may send, to the AMF 1006 and based on completion of authentication, a message (e.g., an Namf_Communication_UEContextTransfer Response message) indicating that the wireless device context transfer is complete.

The authentication may involve participation of one or more of the wireless device 1002, an AUSF 1016, a UDM 1018 and/or a UDR (not shown). The AMF 1008 may request that the AUSF 1016 authenticate the wireless device 1002. The AUSF may execute authentication of the wireless device 1002 (e.g., based on the request). The AUSF 1016 may get authentication data from the UDM 1018. The AUSF 1016 may send, to the AMF 1008, a subscription permanent identifier (SUPI), for example, based on the authentication being successful. The AUSF 1016 may provide an intermediate key to the AMF 1008. The intermediate key may be used to derive an access-specific security key for the wireless device 1002. The access-specific security key may enable the AMF 1008 to perform security context management (SCM). The AUSF 1016 may obtain subscription data from the UDM 1018. The subscription data may be based on information obtained from the UDM 1018 (and/or the UDR). The subscription data may comprise subscription identifiers/indicators, security credentials, access and mobility related subscription data, and/or session related data.

At step 1030, the AMF 1008 may register and/or subscribe to the UDM 1018. The AMF 1008 may perform registration using a wireless device context management service of the UDM 1018 (e.g., Nudm_UECM). The AMF 1008 may obtain subscription information of the wireless device 1002 using a subscriber data management service of the UDM 1018 (e.g., Nudm_SDM). The AMF 1008 may further request that the UDM 1018 notify/send a notification to the AMF 1008 if the subscription information of the wireless device 1002 changes. The AMF 1006 may deregister and unsubscribe, for example, based on the AMF 1008 registering and/or subscribing. The AMF 1006 may no longer need to perform mobility management of the wireless device 1006, for example, based on (e.g., after) deregistering.

At step 1040, the AMF 1008 may retrieve access and mobility (AM) policies from the PCF 1014. The AMF 1008 may provide subscription data of the wireless device 1002 to the PCF 1014. The PCF 1014 may determine access and mobility policies for the wireless device 1002, for example, based on the subscription data, network operator data, current network conditions, and/or other suitable information. For example, the owner/user of a first wireless device may purchase a higher level of service than the owner/user of a second wireless device. The PCF 1014 may provide the rules associated with the different levels of service. The network may apply different policies which facilitate different levels of service, for example, based on the subscription data of the respective wireless devices.

Access and mobility policies may relate to (e.g., may be based on and/or comprise) service area restrictions, radio access technology (RAT) frequency selection priority (RFSP), authorization and prioritization of access type (e.g., LTE versus NR), and/or selection of non-3GPP access (e.g., access network discovery and selection policy (ANDSP)). The service area restrictions may comprise list(s) of tracking areas where the wireless device is allowed to be served (and/or forbidden from being served). The access and mobility policies may comprise a wireless device (e.g., UE) route selection policy (URSP) that may influence routing to an established PDU session and/or a new PDU session. Different policies may be obtained and/or be enforced based on subscription data of the wireless device, location of the wireless device (e.g., location of the AN and/or AMF), and/or other suitable factors.

At step 1050, the AMF 1008 may update a context of a PDU session. The AMF 1008 may coordinate/communicate with an SMF (e.g., SMF 1012) to activate a user plane connection associated with an existing PDU session, for example, if the wireless device has/is associated with the existing PDU session. The SMF 1012 may update and/or release a session management context of the PDU session (e.g., Nsmf_PDUSession_UpdateSMContext, Nsmf_PDUSession_ReleaseSMContext).

At step 1060, the AMF 1008 may send a registration accept message to the AN 1004. The AN 1004 may forward the registration accept message to the wireless device 1002. The registration accept message may comprise a new wireless device indicator/identifier and/or a new configured slice indicator/identifier. The wireless device 1002 may send/transmit a registration complete message to the AN 1004. The AN 1004 may forward the registration complete message to the AMF 1008. The registration complete message may acknowledge receipt of the new wireless device identifier and/or new configured slice identifier.

At step 1070, the AMF 1008 may receive/obtain wireless device policy control information from the PCF 1014. The PCF 1014 may send/provide an ANDSP (e.g., to facilitate non-3GPP access). The PCF 1014 may provide URSP to facilitate mapping of particular data traffic to particular PDU session connectivity parameters. The URSP may indicate that data traffic associated with a particular application should be mapped to a particular SSC mode, network slice, PDU session type, and/or preferred access type (e.g., 3GPP or non-3GPP).

FIG. 11 shows an example service request procedure for a wireless device. The service request procedure may be a network-triggered service request procedure for a wireless device in a CM idle state. Other service request procedures (e.g., a wireless device-triggered service request procedure) may be performed in a manner similar to that described with reference to FIG. 11.

At step 1110, a UPF 1112 may receive data. The data may be downlink data for transmission to a wireless device (e.g., wireless device 1102). The data may be associated with an existing PDU session between the wireless device 1102 and a DN. The data may be received from a DN and/or another UPF. The UPF 1112 may buffer the received data. The UPF 1112 may notify an SMF (e.g., SMF 1108) of the received data, for example, based on (e.g., in response to) receiving the data. The identity of the SMF to be notified may be determined based on the received data. The notification may be an N4 session report. The notification may indicate that the UPF 1112 has received data associated with the wireless device 1102 and/or a particular PDU session associated with the wireless device 1102. The SMF 1108 may send PDU session information to an AMF 1106, for example, based on (e.g., in response to) receiving the notification. The PDU session information may be sent in an N1N2 message transfer for forwarding to an AN 1104. The PDU session information may comprise UPF tunnel endpoint information and/or QoS information.

At step 1120, the AMF 1106 may determine that the wireless device 1102 is in a CM idle state. The determining may be based on (e.g., in response to) the receiving of the PDU session information. The service request procedure may proceed to steps 1130 and 1140, for example, based on the determination that the wireless device is in CM idle state. The steps 1130 and 1140 may be skipped, and the service request procedure may proceed directly to 1150, for example, based on determining that the wireless device is not in CM idle state (e.g., the wireless device is in CM connected state).

At step 1130, the AMF 1106 may page the wireless device 1102. The paging at step 1130 may be performed based on the wireless device being in a CM idle state. The AMF 1106 may send a page to the AN 1104 to perform the paging. The page may be referred to as a paging or a paging message. The page may be an N2 request message. The AN 1104 may be one of a plurality of ANs in a RAN notification area of the wireless device 1102. The AN may send a page to the wireless device 1102. The wireless device 1102 may be in a coverage area of the AN 1104 and may receive the page.

At step 1140, the wireless device 1102 may request service. The wireless device 1102 may send/transmit a service request to the AMF 1106 via the AN 1104. The wireless device 1102 may request service at step 1140, for example, based on (e.g., in response to) receiving the paging at step 1130. The wireless device 1102 may receive the page and request service based on the service request procedure being a network-triggered service request procedure. The wireless device 1102 may commence a wireless device-triggered service request procedure in some scenarios (e.g., if uplink data becomes available at the wireless device). The wireless device-triggered service request procedure may commence starting at step 1140 (e.g., one or more of steps 1110 and 1120 may be skipped).

At step 1150, the network may authenticate the wireless device 1102. Authentication may require participation of the wireless device 1102, an AUSF 1116, and/or a UDM 1118 (e.g., as described herein). The authentication at step 1150 may be skipped, for example, in one or more scenarios (e.g., if the wireless device 1102 has recently been authenticated).

At step 1160, the AMF 1106 and the SMF 1108 may perform a PDU session update. The PDU session update may comprise the SMF 1108 providing, to the AMF 1106, with one or more UPF tunnel endpoint identifiers. The SMF 1108 may coordinate with one or more other SMFs and/or one or more other UPFs to set up a user plane.

At step 1170, the AMF 1106 may send PDU session information to the AN 1104. The PDU session information may be included in an N2 request message. The AN 1104 may configure a user plane resource for the wireless device 1102, for example, based on the PDU session information. The AN 1104 may perform an RRC reconfiguration of the wireless device 1102, for example, to configure the user plane resource. The AN 1104 may acknowledge the AMF 1106 (e.g., send an acknowledgment message to the AMF 1106 indicating) that the PDU session information has been received. The AN 1104 may notify the AMF 1106 (e.g., via the acknowledgment message) that the user plane resource has been configured, and/or provide information relating to the user plane resource configuration.

The wireless device 1102 may receive (e.g., at step 1170), for a wireless device-triggered service procedure, a NAS service accept message from the AMF 1106 via the AN 1104. The wireless device 1102 may send/transmit uplink data (e.g., the uplink data that caused the wireless device 1102 to trigger the service request procedure), for example, based on (e.g., after) configuring the user plane resource.

At step 1180, the AMF 1106 may update a session management (SM) context of the PDU session. The AMF 1106 may notify the SMF 1108 (and/or one or more other associated SMFs) that the user plane resource has been configured, and/or may provide information relating to the user plane resource configuration. The AMF 1106 may provide/send to the SMF 1108 (and/or one or more other associated SMFs) one or more AN tunnel endpoint identifiers/indicators of the AN 1104. The SMF 1108 may send an update SM context response message to the AMF 1106, for example, based on (e.g., after) the SM context update being complete.

The SMF 1108 may update a PCF (e.g., the PCF 1114) for purposes of policy control, for example, based on the update of the session management context. For example, the SMF 1108 may notify (e.g., via PCF 1114 update) the PCF 1114 of a new location of the wireless device 1102 if a location of the wireless device 1102 has changed. The SMF 1108 and the UPF 1112 may perform a session modification, for example, based on the update of the session management context. The session modification may be performed using N4 session modification messages. The UPF 1112 may send/transmit downlink data (e.g., the downlink data that caused the UPF 1112 to trigger the network-triggered service request procedure) to the wireless device, for example, based on the session modification being completed. The sending/transmitting of the downlink data may be based on the one or more AN tunnel endpoint identifiers of the AN 1104.

FIG. 12 shows an example PDU session establishment procedure for a wireless device. The wireless device 1202 may determine to send/transmit a PDU session establishment request (e.g., for the PDU session establishment procedure) to create a new PDU session, to hand over an existing PDU session to a 3GPP network, and/or for any other suitable reason.

At step 1210, the wireless device 1202 may initiate PDU session establishment. The wireless device 1202 may send/transmit a PDU session establishment request, via an AN 1204, to an AMF 1206. The PDU session establishment request may be a NAS message. The PDU session establishment request may indicate/comprise one or more of: a PDU session indicator/ID; a requested PDU session type (e.g., whether the requested PDU session is new or existing); a requested DN (e.g., a DNN); a requested network slice (S-NSSAI); a requested SSC mode; and/or any other suitable information. The PDU session ID may be generated by the wireless device 1202. The PDU session type may be, for example, an Internet Protocol (IP)-based type (e.g., IPv4, IPv6, or dual stack IPv4/IPv6), an Ethernet type, or an unstructured type.

The AMF 1206 may determine/select an SMF (e.g., SMF 1208) based on the PDU session establishment request. The requested PDU session may, in at least some scenarios, already be associated with a particular SMF. For example, the AMF 1206 may store a wireless device context of the wireless device 1202, and the wireless device context may indicate that the PDU session ID of the requested PDU session is already associated with the particular SMF. In some scenarios, the AMF 1206 may select the SMF based on a determination that the SMF is prepared to handle the requested PDU session. For example, the requested PDU session may be associated with a particular DNN and/or S-NSSAI. The SMF may be selected based on a determination that the SMF can manage a PDU session associated with the particular DNN and/or S-NSSAI.

At step 1220, the network may manage a context of the PDU session. The AMF 1206 may send a PDU session context request to the SMF 1208, for example, based on (e.g., after) selecting the SMF 1208 at 1210. The PDU session context request may comprise the PDU session establishment request received from the wireless device 1202 at step 1210. The PDU session context request may be a Nsmf_PDUSession_CreateSMContext Request and/or a Nsmf_PDUSession_UpdateSMContext Request. The PDU session context request may indicate/comprise indicators/identifiers of the wireless device 1202; the requested DN; and/or the requested network slice. The SMF 1208 may retrieve subscription data from a UDM 1216, for example, based on the PDU session context request. The subscription data may be session management subscription data of the wireless device 1202. The SMF 1208 may subscribe for updates to the subscription data. The PCF 1208 may send, to the SMF 1208, new information if the subscription data of the wireless device 1202 changes, for example, based on the SMF 1208 subscribing for the updates. The SMF 1208 may send/transmit a PDU session context response to the AMF 1206, for example, based on (e.g., after) receiving/obtaining the subscription data of the wireless device 1202. The PDU session context response may be a Nsmf_PDUSession_CreateSMContext Response and/or a Nsmf_PDUSession_UpdateSMContext Response. The PDU session context response may include/comprise a session management context ID.

At step 1230, secondary authorization/authentication may be performed, if necessary. The secondary authorization/authentication may involve the wireless device 1202, the AMF 1206, the SMF 1208, and/or the DN 1218. The SMF 1208 may access the DN 1218 via a server (e.g., a data network authentication, authorization, and accounting (DN AAA) server).

At step 1240, the network may set up a data path for uplink data associated with the PDU session. The SMF 1208 may select/determine a PCF (e.g., a PCF 1214). The SMF 1208 may establish a session management policy association. The PCF 1214 may provide an initial set of policy control and charging rules (PCC rules) for the PDU session, for example, based on the association. The PCF 1214 may (e.g., if targeting a particular PDU session) indicate, to the SMF 1208, one or more of a method for allocating an IP address to the PDU Session, a default charging method for the PDU session, an address of the corresponding charging entity, triggers for requesting new policies, and/or any other method, action, and/or information. The PCF 1214 may target a service data flow (SDF) comprising one or more PDU sessions. The PCF may (e.g., if targeting an SDF) indicate, to the SMF 1208, policies for one or more of applying QoS requirements, monitoring traffic (e.g., for charging purposes), steering traffic (e.g., by using one or more particular N6 interfaces), and/or any other purpose.

The SMF 1208 may determine and/or allocate an IP address for the PDU session. The SMF 1208 may select one or more UPFs (e.g., a single UPF 1212 as shown in FIG. 12) to handle the PDU session. The SMF 1208 may send an N4 session message to the selected UPF 1212. The N4 session message may be an N4 session establishment request and/or an N4 session modification request. The N4 session message may include/comprise packet detection, enforcement, and/or reporting rules associated with the PDU session. The UPF 1212 may acknowledge the N4 session message by sending an N4 session establishment response and/or an N4 session modification response.

The SMF 1208 may send PDU session management information to the AMF 1206. The PDU session management information may be/comprise a Namf_Communication_N1N2MessageTransfer message. The PDU session management information may include/comprise the PDU session ID. The PDU session management information may be/comprise a NAS message. The PDU session management information may include/comprise N1 session management information and/or N2 session management information. The N1 session management information may include/comprise a PDU session establishment accept message. The PDU session establishment accept message may include/comprise tunneling endpoint information of the UPF 1212 and QoS information associated with the PDU session.

The AMF 1206 may send an N2 request to the AN 1204. The N2 request may include/comprise the PDU session establishment accept message. The AN 1204 may determine AN resources for the wireless device 1202, for example, based on the N2 request. The AN resources may be used by the wireless device 1202 to establish the PDU session, via the AN 1204, with the DN 1218. The AN 1204 may determine resources to be used for the PDU session and indicate, to the wireless device 1202, the determined resources. The AN 1204 may send the PDU session establishment accept message to the wireless device 1202. The AN 1204 may perform an RRC reconfiguration of the wireless device 1202. The AN 1204 may send an N2 request acknowledge to the AMF 1206, for example, based on (e.g., after) the AN resources being set up. The N2 request acknowledge may include/comprise N2 session management information (e.g., the PDU session ID and tunneling endpoint information of the AN 1204).

The wireless device 1202 may (e.g., optionally) send uplink data associated with the PDU session, for example, based on the data path for uplink data being set up (e.g., at step 1240). The uplink data may be sent to a DN 1218, associated with the PDU session, via the AN 1204 and the UPF 1212.

At step 1250, the network may update the PDU session context. The AMF 1206 may send/transmit a PDU session context update request to the SMF 1208. The PDU session context update request may be a Nsmf_PDUSession_UpdateSMContext request. The PDU session context update request may comprise the N2 session management information received from the AN 1204. The SMF 1208 may acknowledge (e.g., send an acknowledgment message based on/in response to) the PDU session context update. The acknowledgement may be a Nsmf_PDUSession_UpdateSMContext response. The acknowledgement may comprise a subscription requesting that the SMF 1208 be notified of any wireless device mobility event. The SMF 1208 may send an N4 session message to the UPF 1212, for example, based on the PDU session context update request. The N4 session message may be an N4 session modification request. The N4 session message may comprise tunneling endpoint information of the AN 1204. The N4 session message may comprise forwarding rules associated with the PDU session. The UPF 1212 may acknowledge (e.g., reception of the N4 session message) by sending an N4 session modification response.

The UPF 1212 may relay downlink data associated with the PDU session, for example, based on (e.g., after) the UPF 1212 receiving the tunneling endpoint information of the AN 1204 The downlink data may be received from a DN 1218, associated with the PDU session, via the AN 1204 and the UPF 1212.

Figure 13A:
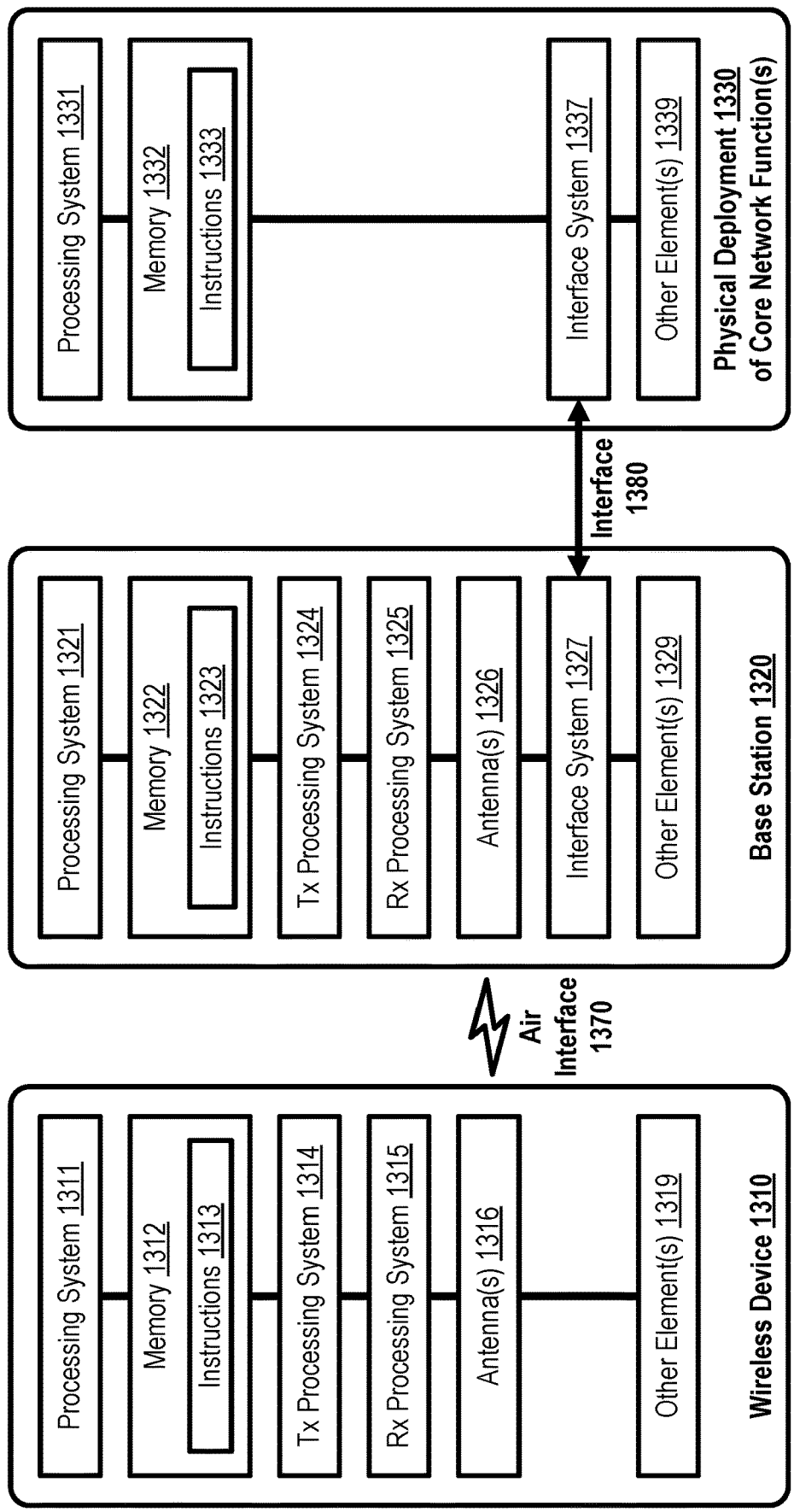
FIG. 13A shows example elements in a communications network.

FIG. 13A shows example elements in a communications network. FIG. 13A shows a wireless device 1310, a base station 1320, and a physical deployment of one or more network functions 1330 (henceforth, "deployment 1330"). Any wireless device described herein may have similar components and/or may be implemented in a similar manner as the wireless device 1310. Any base station described herein (or any portion of the base station, depending on the architecture of the base station) may have similar components and/or may be implemented in a similar manner as the base station 1320. Any physical core network deployment described herein (or any portion of the deployment, depending on the architecture of the deployment) may have similar components and may be implemented in a similar manner as the deployment 1330.

The wireless device 1310 may communicate with base station 1320 over an air interface 1370. A communication direction from wireless device 1310 to base station 1320 over air interface 1370 may be known as uplink, and a communication direction from base station 1320 to wireless device 1310 over air interface 1370 may be known as downlink. Downlink transmissions may be separated from uplink transmissions using FDD, TDD, and/or some combination of duplexing techniques. FIG. 13A shows a single wireless device 1310 and a single base station 1320, but it may be understood that wireless device 1310 may communicate with any number/quantity of base stations and/or other access network components over air interface 1370, and it may be understood that that base station 1320 may communicate with any number/quantity of wireless devices over air interface 1370.

The wireless device 1310 may comprise a processing system 1311 and a memory 1312. The memory 1312 may comprise one or more computer-readable media (e.g., one or more non-transitory computer readable media). The memory 1312 may include/comprise/store instructions 1313. The processing system 1311 may process and/or execute the instructions 1313. Processing and/or execution of the instructions 1313 may cause the wireless device 1310 and/or the processing system 1311 to perform one or more functions or activities. The memory 1312 may include/comprise data (not shown). One of the functions or activities performed by the processing system 1311 may be to store data in the memory 1312 and/or retrieve previously-stored data from the memory 1312. For example, downlink data received from the base station 1320 may be stored in the memory 1312, and uplink data for transmission to the base station 1320 may be retrieved from the memory 1312. The wireless device 1310 may communicate with the base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13A, the transmission processing system 1314 and/or the reception processing system 1315 may be coupled to a dedicated memory that may be analogous to but separate from the memory 1312. The dedicated memory may comprise instructions that may be processed and/or executed to carry out one or more respective functionalities of the transmission processing system 1314 and/or the reception processing system 1315. The wireless device 1310 may comprise one or more antennas 1316 to access the air interface 1370.

The wireless device 1310 may comprise one or more other elements 1319. The one or more other elements 1319 may comprise software and/or hardware that may provide features and/or functionalities. For example, the one or more other elements 1319 may comprise one or more of a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise or connect to one or more sources of power (e.g., a battery, a solar cell, a fuel cell, a wall outlet, an electrical grid, and/or any combination thereof).

The wireless device 1310 may send/transmit uplink data to and/or receive downlink data from the base station 1320 via the air interface 1370. One or more of the processing system 1311, transmission processing system 1314, and/or reception system 1315 may implement open systems interconnection (OSI) functionality to perform transmission and/or reception. For example, the transmission processing system 1314 and/or the reception system 1315 may perform layer 1 OSI functionality, and the processing system 1311 may perform higher layer functionality. The wireless device 1310 may transmit and/or receive data over the air interface 1370 via/using one or more antennas 1316. For scenarios where the one or more antennas 1316 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media (e.g., one or more non-transitory computer readable media). The memory 1322 may comprise instructions 1323. The processing system 1321 may process and/or execute the instructions 1323. Processing and/or execution of the instructions 1323 may cause the base station 1320 and/or the processing system 1321 to perform one or more functions or activities. The memory 1322 may comprise data (not shown). One of the functions or activities performed by the processing system 1321 may be to store data in the memory 1322 and/or retrieve previously-stored data from the memory 1322. The base station 1320 may communicate with the wireless device 1310 using a transmission processing system 1324 and/or a reception processing system 1325. The transmission processing system 1324 and/or the reception processing system 1325 may be coupled to a dedicated memory (not shown) that may be analogous to but separate from memory 1322. The dedicated memory may comprise instructions that may be processed and/or executed to carry out one or more of their respective functionalities. The base station 1320 may comprise one or more antennas 1326 to access the air interface 1370.

The base station 1320 may send/transmit downlink data to and/or receive uplink data from wireless device 1310 via the air interface 1370. To perform the transmission and/or reception, one or more of the processing system 1321, the transmission processing system 1324, and/or the reception system 1325 may implement OSI functionality. For example, the transmission processing system 1324 and/or the reception system 1325 may perform layer 1 OSI functionality, and the processing system 1321 may perform higher layer functionality. The base station 1320 may trans-mit and/or receive data via the air interface 1370 using one or more antennas 1326. For scenarios where the one or more antennas 1326 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless. The interface system 1327 may comprise one or more components suitable for communicating via the interface 1380. As shown in FIG. 13A, the interface 1380 may connect the base station 1320 to a single deployment 1330 (e.g., as shown in FIG. 13A), but it may be understood that wireless device 1310 may communicate with any number/quantity of base stations and/or CN deployments via the interface 1380, and it may be understood that that deployment 1330 may communicate with any number/quantity of base stations and/or other CN deployments via the interface 1380. The base station 1320 may comprise one or more other elements 1329 analogous to one or more of the one or more other elements 1319.

The deployment 1330 may comprise any quantity/number of portions of any quantity/number of instances of one or more NFs. The deployment 1330 may comprise a processing system 1331 and a memory 1332. The memory 1332 may comprise one or more computer-readable media (e.g., one or more non-transitory computer readable media). The memory 1332 may comprise instructions 1333. The processing system 1331 may process and/or execute instructions 1333. Processing and/or execution of the instructions 1333 may cause the deployment 1330 and/or the processing system 1331 to perform one or more functions or activities. The memory 1332 may comprise data (not shown). One of the functions or activities performed by processing system 1331 may be to store data in the memory 1332 and/or retrieve previously-stored data from the memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

The wireless device 1310, the base station 1320, and/or the deployment 1330 may implement timers and/or counters. A timer/counter may start and/or restart at an initial value. The timer/counter may run based on the starting. Running of the timer/counter may be associated with an occurrence. The value of the timer/counter may change (e.g., increment or decrement). The occurrence may be an exogenous event (e.g., a reception of a signal, a measurement of a condition, etc.), an endogenous event (e.g., a transmission of a signal, a calculation, a comparison, a performance of an action or a decision to so perform, etc.), and/or any combination thereof. The occurrence may be the passage of a particular amount of time. A timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused (e.g., a present value of the timer/counter may be held, maintained, and/or carried over), for example, even after an occurrence of one or more occurrences that would otherwise cause the value of the timer/counter to change. The timer/counter may be un-paused or continued (e.g., the value that was held, maintained, and/or carried over may begin changing again), for example, after an occurrence of the one or more occurrence occur. A timer/counter may be set and/or reset. As used herein, setting may comprise resetting. The value of the timer/counter may be set to the initial value, for example, if the timer/counter sets and/or resets. A timer/counter may be started and/or restarted. Starting may comprise restarting. The value of the timer/counter may be set to the initial value and the timer/counter may begin to run (e.g., increment or decrement), for example, if the timer/counter restarts.

Figure 13B:
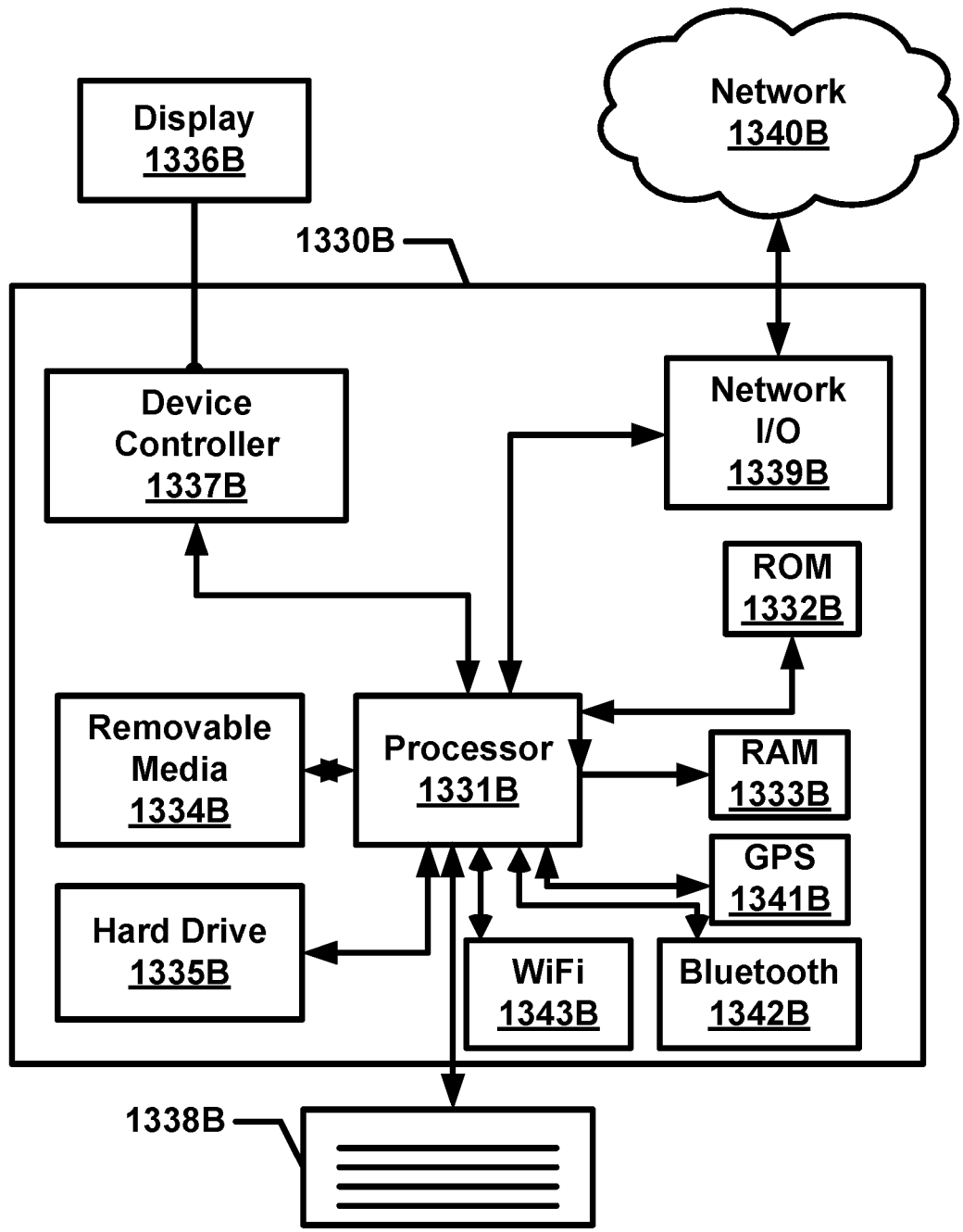
FIG. 13B shows example elements of a computing device that may be used to implement any of the various devices described herein.

FIG. 13B shows example elements of a computing device that may be used to implement any of the various devices described herein, including, for example, a base station 152A, 152B, 302, 402, 403, 502 602, 602A, 602B, 602C, 702, 802, 1004, 1104, 1204, 1320, 1520, 1620, 1720, 1920, 2020, 2320, 2420, 2520, 2620, 2720, and/or 2820, a wireless device 101, 151, 301, 401, 501, 601A, 601B, 601C, 701, 801, 1002, 1102, 1202, 1310, 1510, 1610, 1710, 1810, 1910, 2010, 2310, 2410, 2510, 2610, 2710, and/or 2810, or any other base station, wireless device, node, NF (e.g., AMF, SMF, UPF, PCF, etc.), UDM, OAM, UDM/OAM, network device, or computing device described herein. The computing device 1330B may include one or more processors 1331B, which may execute instructions stored in the random-access memory (RAM) 1333B, the removable media 1334B (such as a Universal Serial Bus (USB) drive, compact disk (CD) or digital versatile disk (DVD), or floppy disk drive), or any other desired storage medium. Instructions may also be stored in an attached (or internal) hard drive 1335B. The computing device 1330B may also include a security processor (not shown), which may execute instructions of one or more computer programs to monitor the processes executing on the processor 1331B and any process that requests access to any hardware and/or software components of the computing device 1330B (e.g., ROM 1332B, RAM 1333B, the removable media 1334B, the hard drive 1335B, the device controller 1337B, a network interface 1339B, a GPS 1341B, a Bluetooth interface 1342B, a WiFi interface 1343B, etc.). The computing device 1330B may include one or more output devices, such as the display 1336B (e.g., a screen, a display device, a monitor, a television, etc.), and may include one or more output device controllers 1337B, such as a video processor. There may also be one or more user input devices 1338B, such as a remote control, keyboard, mouse, touch screen, microphone, etc. The computing device 1330B may also include one or more network interfaces, such as a network interface 1339B, which may be a wired interface, a wireless interface, or a combination of the two. The network interface 1339B may provide an interface for the computing device 1330B to communicate with a network 1340B (e.g., a RAN, or any other network). The network interface 1339B may include a modem (e.g., a cable modem), and the external network 1340B may include communication links, an external network, an in-home network, a provider's wireless, coaxial, fiber, or hybrid fiber/coaxial distribution system (e.g., a DOCSIS network), or any other desired network. Additionally, the computing device 1330B may include a location-detecting device, such as a global positioning system (GPS) microprocessor 1341B, which may be configured to receive and process global positioning signals and determine, with possible assistance from an external server and antenna, a geographic position of the computing device 1330B.

The example in FIG. 13B may be a hardware configuration, although the components shown may be implemented as software as well. Modifications may be made to add, remove, combine, divide, etc. components of the computing device 1330B as desired. Additionally, the components may be implemented using basic computing devices and components, and the same components (e.g., processor 1331B, ROM storage 1332B, display 1336B, etc.) may be used to implement any of the other computing devices and components described herein. For example, the various components described herein may be implemented using computing devices having components such as a processor executing computer-executable instructions stored on a computer-readable medium, as shown in FIG. 13B. Some or all of the entities described herein may be software based, and may co-exist in a common physical platform (e.g., a requesting entity may be a separate software process and program from a dependent entity, both of which may be executed as software on a common computing device).

FIGS. 14A, 14B, 14C, and 14D show various example arrangements of physical core network deployments. Each of the arrangements may comprise one or more network functions and/or portions thereof. The core network deployments may comprise a deployment 1410, a deployment 1420, a deployment 1430, a deployment 1440, and/or a deployment 1450. Any of the deployments (e.g., each deployment) may be analogous to the deployment 1330 as shown in FIG. 13A. Any of the deployments (e.g., each deployment) may comprise a processing system for performing one or more functions and/or activities, memory for storing data and/or instructions, and/or an interface system for communicating with other network elements (e.g., other core network deployments). Any of the deployments (e.g., each deployment) may comprise one or more NFs. An NF may refer to a particular set of functionalities and/or one or more physical elements configured to perform those functionalities (e.g., a processing system and memory comprising instructions that, when executed by the processing system, cause the processing system to perform the functionalities). As described herein, a network function performing X, Y, and Z, may comprise the one or more physical elements configured to perform X, Y, and Z (e.g., irrespective of configuration and/or location of the deployment of the one or more physical elements), where X, Y, and Z, each may refer to one or more operations. An NF may comprise one or more of a network node, network element, and/or network device.

Different types of NF may be present in a deployment. Each type of NF may be associated with a different set of one or more functionalities. A plurality of different NFs may be flexibly deployed at different locations (e.g., in different physical core network deployments) or in a same location (e.g., co-located in a same deployment). A single NF may be flexibly deployed at different locations (e.g., implemented using different physical core network deployments) or in a same location. Physical core network deployments may also implement one or more base stations, application functions (AFs), data networks (DNs), and/or any portions thereof. NFs may be implemented in many ways, including as network elements on dedicated or shared hardware, as software instances running on dedicated or shared hardware, and/or as virtualized functions instantiated on a platform (e.g., a cloud-based platform).

FIG. 14A shows an example arrangement of core network deployments. Any of the core network deployments (e.g., each of the core network deployments) may comprise one network function. A deployment 1410 may comprise an NF 1411, a deployment 1420 may comprise an NF 1421, and a deployment 1430 may comprise an NF 1431. The deployments 1410, 1420, 1430 may communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B shows an example arrangement where a single deployment may comprise more than one NF. Multiple NFs may be deployed in deployments 1410, 1420. Deployments 1410, 1420 may implement a software-defined network (SDN) and/or a network function virtualization (NFV).

Deployment 1410 may comprise an additional network function, NF 1411A. The NFs 1411, 1411A may comprise multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. NFs 1411, 1411A may be associated with different PLMNs, but deployment 1410, which implements NFs 1411, 1411A, may be owned and/or operated by a single entity.

Deployment 1420 may comprise a NF 1421 and an additional NF 1422. The NFs 1421, 1422 may be different NF types. Similar to NFs 1411, 1411A, the NFs 1421, 1422 may be co-located within the same deployment 1420, but may be separately implemented. For example, a first PLMN may own and/or operate deployment 1420 comprising NFs 1421, 1422. As another example, the first PLMN may implement the NF 1421 and a second PLMN may obtain, from the first PLMN (e.g., rent, lease, procure, etc.), at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. Networks may operate with greater speed, coverage, security, and/or efficiency, for example, if multiple NFs are provided at a single deployment.

FIG. 14C shows an example arrangement of core network deployments in which a single instance of an NF may be implemented using a plurality of different deployments. For example, a single instance of NF 1422 may be implemented at deployments 1420, 1440. The functionality provided by NF 1422 may be implemented as a bundle or sequence of subservices. Any subservice (e.g., each subservice) may be implemented independently, for example, at a different deployment. Any subservice (e.g., each subservice) may be implemented in a different physical location. By distributing implementation of subservices of a single NF across different physical locations, the mobile communications network may operate with greater speed, coverage, security, and/or efficiency.

FIG. 14D shows an example arrangement of core network deployments in which one or more network functions may be implemented using a data processing service. As shown in FIG. 14D, NFs 1411, 1411A, 1421, 1422 may be included in a deployment 1450 that may be implemented as a data processing service. The deployment 1450 may comprise a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the FIGS. 14A-14D, different network elements (e.g., NFs) may be located in different physical deployments, or co-located in a single physical deployment. Sending and receiving of messages among different network elements, as described herein, is not limited to inter-deployment transmission or intra-deployment transmission, unless explicitly indicated.

A deployment may be a black box that may be preconfigured with one or more NFs and preconfigured to communicate, in a prescribed manner, with other black box deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figure 15:
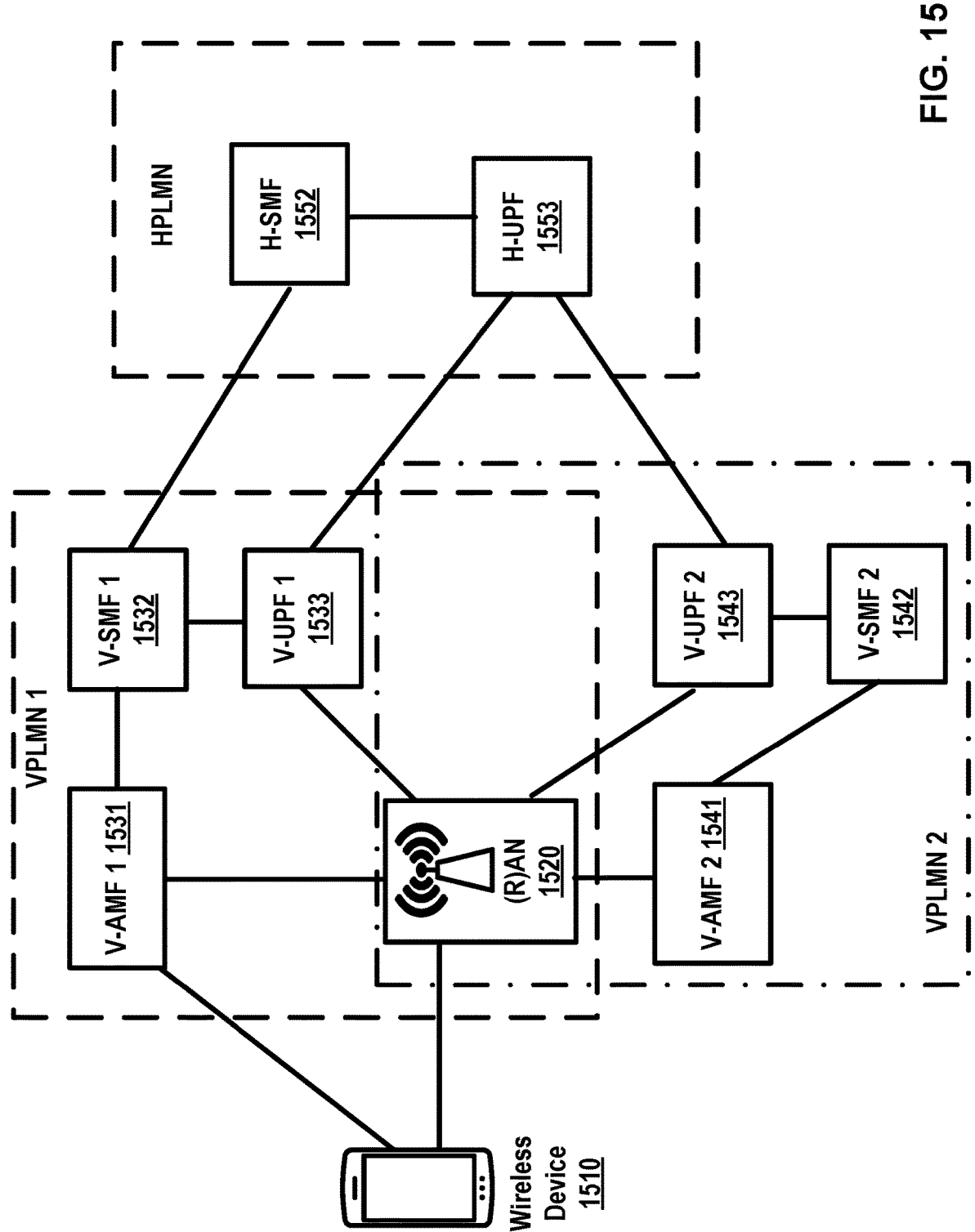
FIG. 15 shows an example of a communication network.

FIG. 15 shows an example of a communication network. The communication network may comprise a base station (e.g., a radio access network (R)AN 1520 may be shared by visited VPLMN 1 and VPLMN 2 for a roaming scenario). A wireless device 1510 may be roaming to one or more visited public land mobile networks (VPLMNs) comprising a plurality of VPLMNs (e.g., VPLMN 1 and VPLMN 2, etc.). The plurality of VPLMNs (e.g., comprising VPLMN 1 and VPLMN 2) may share the same base station (e.g., the same (R)AN 1520). The plurality of VPLMNs (e.g., VPLMN 1 and VPLMN 2) may have an overlapped coverage. The VPLMN 1 may comprise one or more network functions (e.g., one or more visited network functions, such as the (R)AN 1520, a visited access and mobility management function (V-AMF) 1 1531, a visited session management function (V-SMF) 1 1532, a visited user plane function (V-UPF) 1 1533, and/or the like, for one or more visiting/roaming wireless devices). The VPLMN 2 may comprise one or more network functions (e.g., one or more visited network functions, such as the (R)AN 1520, a V-AMF 2 1541, a V-SMF 2 1542, a V-UPF 2 1543, and/or the like, for one or more visiting/roaming wireless devices). A home PLMN (HPLMN) may comprise one or more network functions (e.g., one or more home network functions, such as a home SMF (H-SMF) 1552, a home UPF (H-UPF) 1553, and/or the like). The HPLMN may have a roaming agreement with the plurality of VPLMNs (e.g., the VPLMN 1 and/or the VPLMN 2). The roaming agreement may allow the wireless device (e.g., a visiting/roaming UE) to access the plurality of VPLMNs (e.g., the VPLMN 1 and/or the VPLMN 2) for different network slices simultaneously. The roaming agreement may allow the wireless device (e.g., the visiting/roaming UE) to access a first network slice of/with a first type (e.g., a first slice/service type, such as an eMBB network slice) via VPLMN 1 and access a second network slice of/with a second type (e.g., a second slice/service type, such as a URLLC network slice) via VPLMN 2 at the same time. The HPLMN may communicate with the plurality of VPLMNs (e.g., the VPLMN1 and the VPLMN2), for example, based on the roaming agreement. H-SMF 1552 may establish a connection with the V-SMF 1 1532 and/or the V-SMF 2 1542. H-UPF 1553 may establish a connection with the V-UPF 1 1533 and/or the V-UPF 2 1543. The wireless device 1510 may communicate with the base station (e.g., (R)AN 1520) via one or more wireless signals. The wireless device 1510 and the V-AMF 1 1531 may communicate using one or more NAS messages via an N1 interface as described above with respect to FIG. 3. The wireless device 1510 and the V-AMF 2 1541 may communicate using one or more NAS messages via an N1 interface as described above with respect to FIG. 3. The plurality of VPLMNs may also serve as home PLMNs for one or more non-vising/non-roaming wireless devices.

Figure 16:
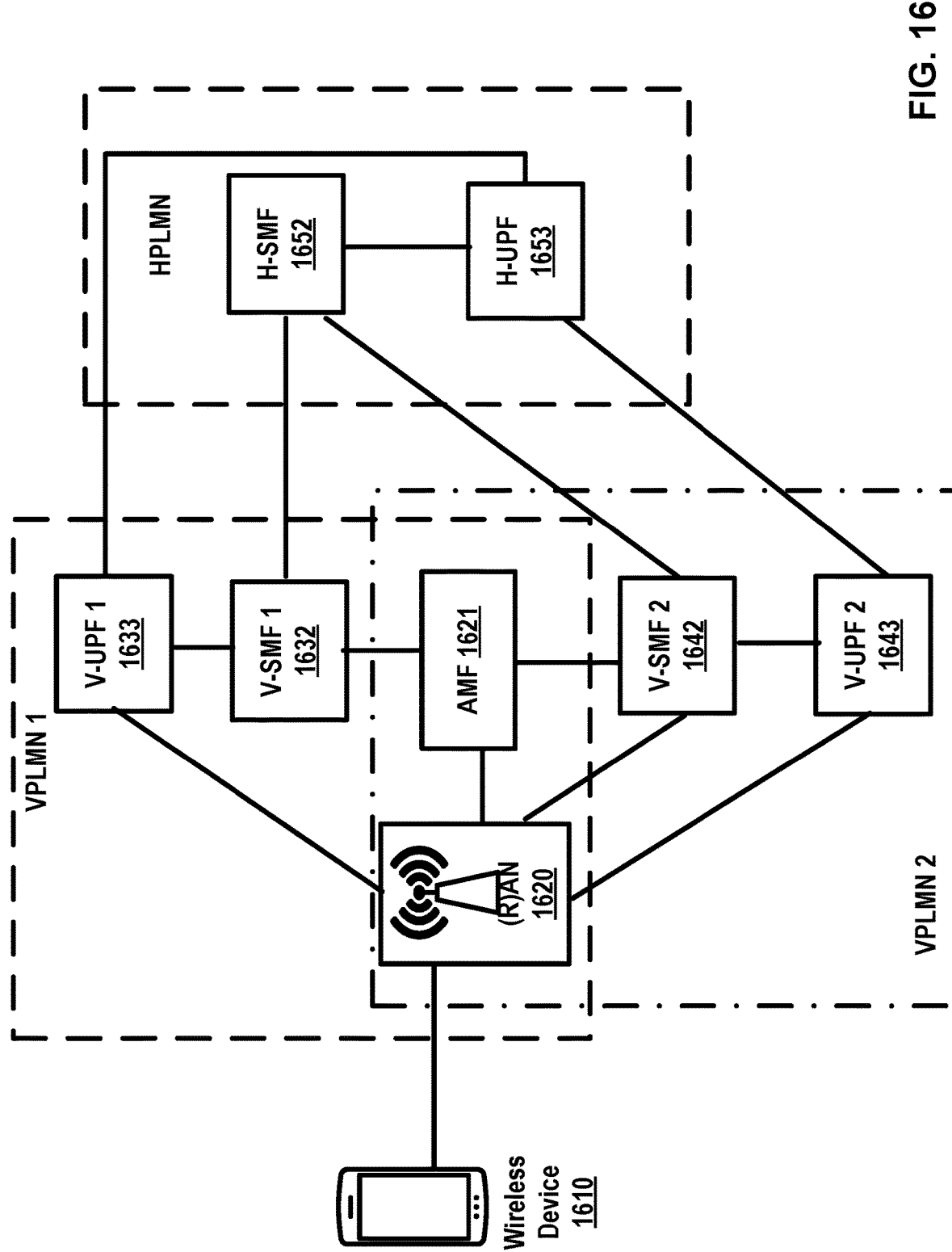
FIG. 16 shows an example of a communication network.

FIG. 16 shows an example of a communication network. The communication network may comprise a base station (e.g., (R)AN 1620) and an AMF 1621 shared by the plurality of VPLMNs (e.g., the VPLMN 1 and the VPLMN 2 for a roaming scenario). A wireless device 1610 may be roaming to one or more visited public land mobile networks (VPLMNs) (e.g., comprising the VPLMN 1 and the VPLMN 2). The plurality of VPLMNs (e.g., the VPLMN 1 and VPLMN 2) may share the same (R)AN 1620 and the same AMF 1621. The plurality of VPLMNs (e.g., the VPLMN 1 and VPLMN 2) may have an overlapped coverage. The VPLMN 1 may comprise one or more network functions (e.g., one or more visited network functions, such as the (R)AN 1620, the AMF 1621, a V-SMF 1 1632, a V-UPF 1 1633, and/or the like). The VPLMN 2 may comprise one or more network functions (e.g., one or more visited network functions, such as the (R)AN 1620, the AMF 1621, a V-SMF 2 1642, a V-UPF 2 1643, and/or the like). A home PLMN (HPLMN) may comprise one or more network functions (e.g., one or more home network functions, such as a H-SMF 1652, a H-UPF 1653, and/or the like). The HPLMN may have a roaming agreement with the plurality of VPLMNs (e.g., the VPLMN 1 and/or the VPLMN 2). The roaming agreement may allow the wireless device 1610 (e.g., a visiting/roaming UE) to access the plurality of VPLMNs (e.g., the VPLMN 1 and/or VPLMN 2 for different network slices simultaneously). The roaming agreement may allow the wireless device 1610 (e.g., the visiting/roaming UE) to access a first network slice of a first type (e.g., an eMBB network slice) via the VPLMN 1 and access a second network slice of a second type (e.g., a URLLC network slice) via VPLMN 2 at the same time. The HPLMN may communicate with the plurality of VPLMNs (e.g., the VPLMN1 and the VPLMN2), for example, based on the roaming agreement. H-SMF 1652 may establish a connection with the V-SMF 1 1632 and/or the V-SMF 2 1642. H-UPF 1653 may establish a connection with the V-UPF 1 1633 and/or the V-UPF 2 1643. The wireless device 1610 may communicate with the base station (e.g., (R)AN 1620) via one or more wireless signals. The wireless device 1610 and the V-AMF 1 1621 may communicate using one or more NAS messages via an N1 interface as described above with respect to FIG. 3.

Figure 17:
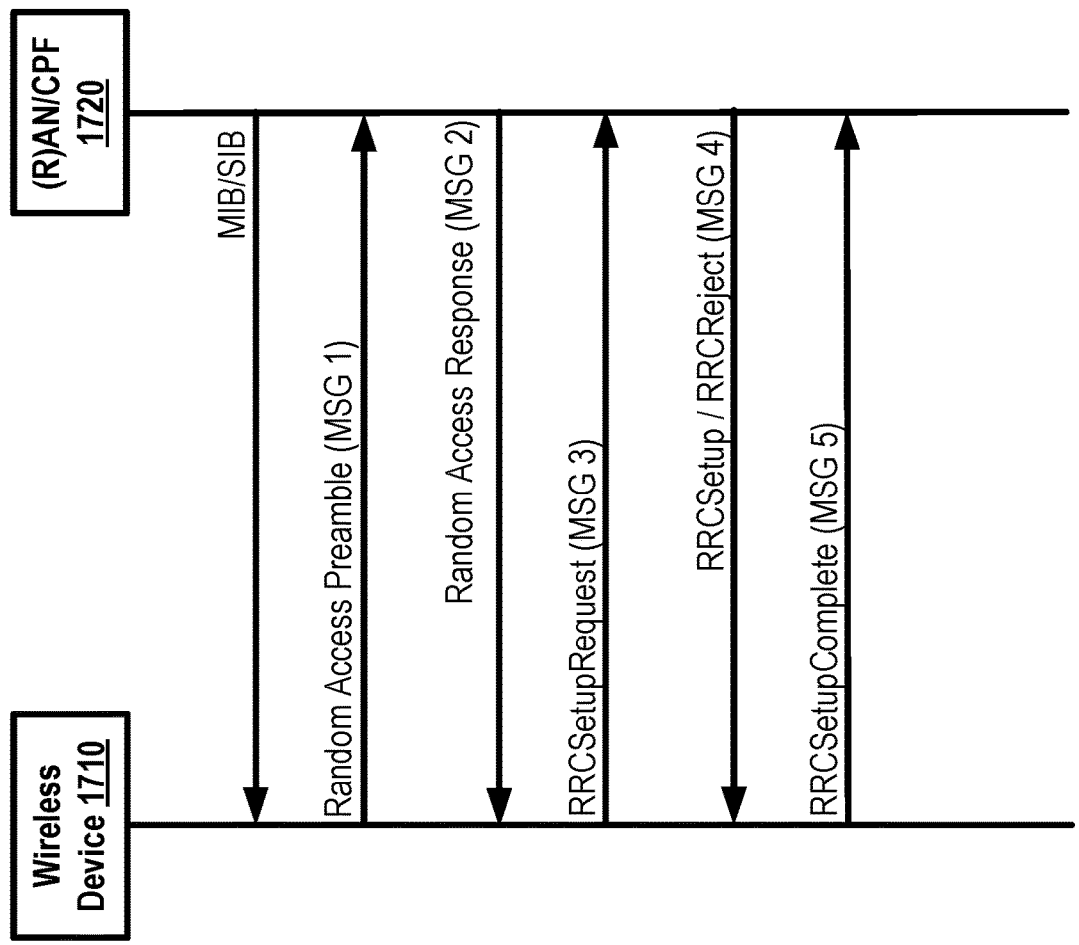
FIG. 17 shows an example wireless communications to establish an RRC connection.

FIG. 17 shows example wireless communications to establish an RRC connection. A wireless device 1710 (e.g., a visiting/roaming UE) may receive master information block (MIB) information (e.g., MIB comprising information element(s), parameter(s), message(s)) and/or system information block (SIB) 1 information (e.g., SIB1 comprising information element(s), parameter(s), message(s)) from a base station (e.g., (R)AN 1720). The MIB information may comprise system information. The MIB information may comprise at least one parameter. The at least one parameter may comprise a parameter indicating a system frame number (e.g., systemFrameNumber), a parameter indicating a subcarrier spacing (e.g., subCarrierSpacingCommon), a parameter indicating a subcarrier offset of a synchronization signal block (e.g., ssb-SubcarrierOffset), a parameter indicating a position of demodulation reference signal (e.g., dmrs-TypeA-Position), a parameter indicating a physical downlink control channel configuration (e.g., pdcch-ConfigSIB1), a parameter indicating a barred cell (e.g., cellBarred), a parameter indicating a reselection of intra-frequency (e.g., intraFreqReselection), and/or the like. The SIB 1 information may comprise information associated with an evaluation of whether a wireless device is allowed to access a cell and may define the scheduling of other system information (e.g., other system information, such as SIB 2 to SIB 9). The SIB 1 information may comprise radio resource configuration information that may be common for a plurality of wireless devices (e.g., all UEs in a cell) and barring information applied to the unified access control. The wireless device may receive SIB x information (e.g., information element(s), parameter(s), message(s)) from the (R)AN and/or a control plane function (CPF) 1720 (e.g., an AMF). The SIB x information may comprise SIB 2, SIB 3, SIB 4, and/or the like, other than SIB 1. The SIB 2 information may comprise cell re-selection information common for intra-frequency, inter-frequency and/or inter-RAT cell re-selection (e.g., applicable for more than one type of cell re-selection but not necessarily for all types) as well as intra-frequency cell re-selection information other than neighboring cell-related information. The SIB 2 message may comprise at least one parameter. The at least one parameter may comprise a parameter indicating cell reselection information (e.g., cellReselectionInfoCommon), a parameter indicating cell reselection serving frequency information (e.g., cellReselectionServingFreqInfo), intraFreqCellReselectionInfo, and/or the like. The SIB 3 information may comprise neighboring cell related information. The neighboring cell related information may be relevant only for intra-frequency cell re-selection. The IE may indicate cells with specific re-selection parameters as well as blacklisted cells. The SIB 3 information may comprise at least one parameter. The at least one parameter may comprise a parameter indicating an intra frequency neighbor cell list (e.g., intraFreqNeighCellList), and/or a parameter indicating an intra frequency black cell list (e.g., intraFreqBlackCellList).

The wireless device 1710 may send/transmit at least one random access preamble (MSG 1) to the (R)AN 1720, for example, after or in response to the message (e.g., MIB and/or SIB) received from the (R)AN and/or the CPF 1720. The wireless device 1710 may send/transmit at least one random access preamble (MSG 1) to the CPF 1720 (e.g., via the (R)AN 1720). The wireless device 1710 may send/transmit the at least one random access preamble (MSG 1) to the base station (e.g., the (R)AN 1720) via a message 1 (MSG 1). The base station (e.g., (R)AN 1720) may send/transmit a random access response message (MSG 2) to the wireless device 1710, for example, after or in response to the at least one random access preamble (MSG 1) received from the wireless device 1710. The network (e.g., the CPF 1720) may send/transmit a random access response message (MSG 2) to the wireless device 1710 (e.g., via the (R)AN 1720). The network (e.g., the CPF 1720) and/or the base station (e.g., the (R)AN 1720) may send/transmit the random access response message (MSG 2) to the wireless device 1710 via a message 2 (MSG 2).

The wireless device 1710 may send/transmit a message (e.g., RRC setup request) to the base station (e.g., the (R)AN 1720) and/or the network (e.g., the CPF 1720), for example, after or in response to the random access response message (MSG 2). The wireless device 1710 may send/transmit the RRC setup request message via a message 3 (MSG 3). The wireless device 1710 may send/transmit the RRC setup request message (MSG 3) to the network (e.g., the CPF 1720) via the base station (e.g., the (R)AN 1720). The RRCSetupRequest message (MSG 3) may indicate establishing an RRC connection for the wireless device 1710. The RRCSetupRequest message (MSG 3) may comprise at least one of: a wireless device identity (e.g., a temporary mobile subscriber identity (TMSI)), a parameter (e.g., establishmentCause) indicating a cause value of an RRC establishment, and/or a dedicated NAS message (e.g., a dedicated-NAS-Message). The parameter (e.g., establishmentCause) indicating a cause value of an RRC establishment may comprise at least one of values: a value indicating an emergency (e.g., emergency), a value indicating a high priority access (e.g., highPriorityAccess), mobile terminating access (e.g., mt-Access), mobile originating signaling (e.g., mo-Signalling), mobile originating data (e.g., mo-Data), mobile originating voice call (e.g., mo-VoiceCall), mobile originating video call (e.g., mo-VideoCall), mobile originating SMS (e.g., mo-SMS), multimedia priority service priority access (e.g., mps-PriorityAccess), mission critical service priority access (e.g., mcs-PriorityAccess), and/or the like.

The base station (e.g., the (R)AN 1720) and/or the network (e.g., the CPF 1720) may send/transmit an RRC setup message to the wireless device 1710 via a message 4 (MSG 4), for example, after or in response to the message (MSG 3) received from the wireless device 1710. The network (e.g., the CPF 1720) may send/transmit the RRC setup message (MSG 4) to the wireless device 1710 via the base station (e.g., the (R)AN 1720). The RRC setup message (MSG 4) may be used to establish SRB 1. The RRC setup message (MSG 4) may comprise at least one information element. The at least one information element may comprise a parameter indicating a master cell group (e.g., masterCell-Group), a parameter indicating a radio bearer configuration (e.g., radioBearerConfig) and/or a parameter indicating a dedicated NAS message (e.g., dedicatedNAS-Message). The parameter indicating a master cell group (e.g., master-CellGroup) may indicate that the network configures the RLC bearer for the SRB1. The parameter indicating a radio bearer configuration (e.g., radioBearerConfig) may indicate that the SRB1 may be configured in an RRC setup.

The wireless device 1710 may send/transmit a RRCSetupComplete message (MSG 5) to the base station (e.g., the (R)AN 1720), for example, after or in response to the message (MSG 4) received from the base station and/or the network. The wireless device 1710 may send/transmit an RRCSetupComplete message (MSG 5) to the network (e.g., the CPF 1720) via a message 5 (MSG 5). The wireless device 1710 may send/transmit the RRCSetupComplete message (MSG 5) to the network (e.g., the CPF 1720) via the base station (e.g., the (R)AN 1720). The RRCSetupComplete message (MSG 5) may comprise at least one parameter. The at least one parameter may comprise a parameter indicating a selected PLMN identity (e.g., selectedPLMN-Identity), a parameter indicating a registered CPF (e.g., registeredCPF), a parameter indicating a global unique AMF identity type (e.g., guami-Type (e.g., native, mapped)), a parameter indicating an NSSAI list (e.g., s-NSSAI-List (e.g. list of network slice identifiers)), a parameter indicating a dedicated NAS message (e.g., dedicatedNAS-Message), a parameter indicating a TMSI, and/or the like. The parameter indicating a registered CPF (e.g., registeredCPF) may comprise a PLMN identity and/or a CPF identifier. The RRCSetupComplete message (MSG 5) may comprise a NAS message. The dedicatedNAS-Message of the RRCSetupComplete message (MSG 5) may comprise the NAS message. The parameter indicating a dedicated NAS message (e.g., dedicatedNAS-Message) may comprise a registration request message.

Figure 18:
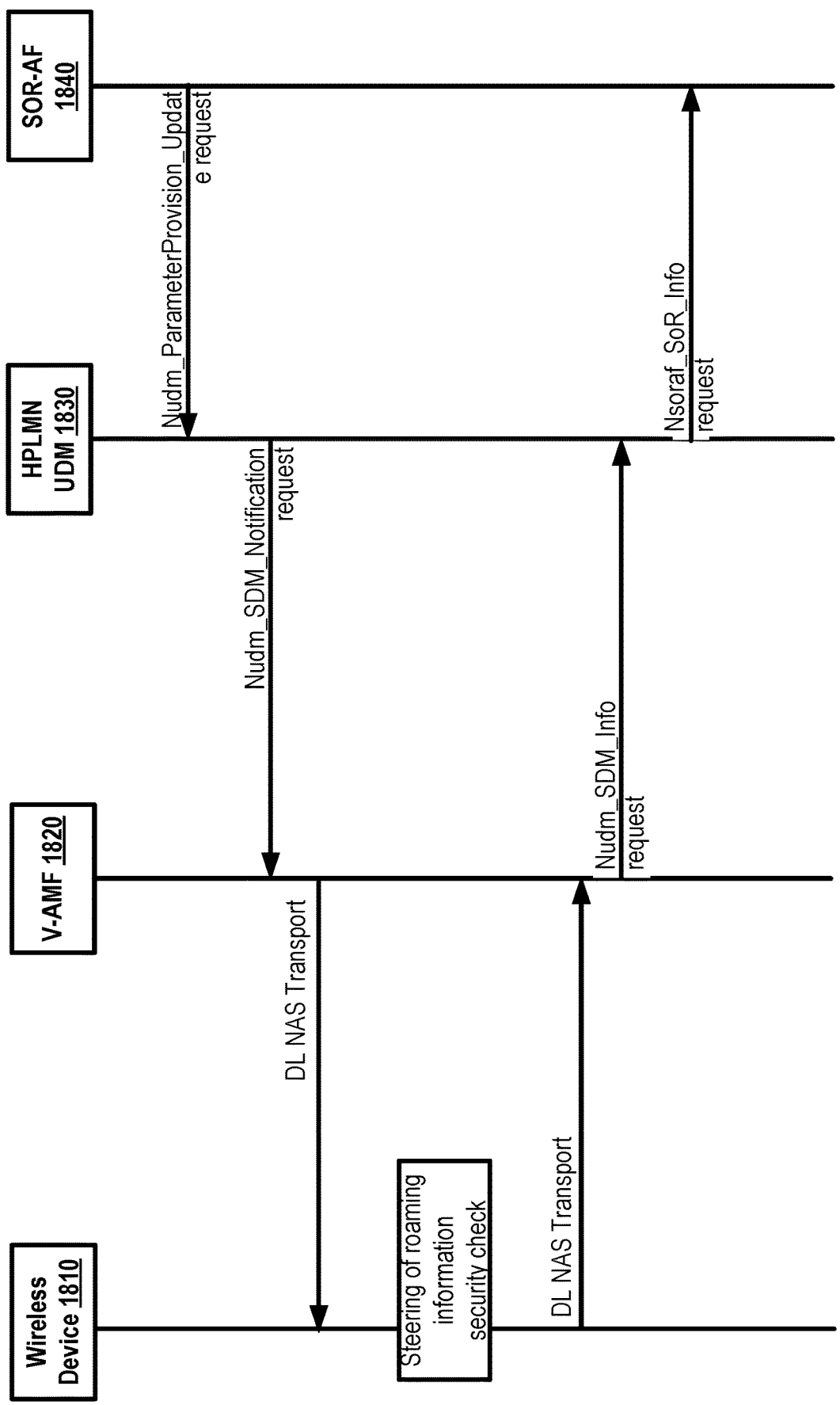
FIG. 18 shows an example configuration procedure for a wireless device.

FIG. 18 shows an example configuration procedure for a wireless device. A network may configure a wireless device 1810 with steering of roaming connected mode control information (SOR-CMCI) in HPLMN or VPLMN, for example, after registration.

The steering of roaming application function (SOR-AF) 1840 may send/transmit an update request (e.g., network function unified data management (Nudm) parameter provision update request (e.g., Nudm_ParameterProvision_Update request)) to the HPLMN unified data management (UDM) 1830 to trigger the update of the wireless device 1810 with the SOR-CMCI. The HPLMN UDM 1830 may send/transmit a notification message (e.g., Nudm SDM notification message (e.g., Nudm_SDM_Notification message)) to an AMF (e.g., an affected AMF, such as V-AMF 1820). The HPLMN UDM 1830 may notify the changes of the user profile to the affected AMF by sending/invoking a notification (e.g., Nudm_SDM_Notification service operation). The notification (e.g., Nudm_SDM_Notification service operation) may comprise the steering of roaming information that needs to be delivered transparently to the wireless device 1810 over NAS within the access and mobility subscription data. The notification (e.g., Nudm_SDM_Notification service operation) may also comprise an indication that the HPLMN UDM 1830 requests an acknowledgement from the wireless device 1810 as part of the steering of roaming information, for example, if the HPLMN (e.g., the HPLMN UDM 1830) determines that the wireless device 1810 is to acknowledge successful security check of the received steering of roaming information. The HPLMN UDM 1830 may include/add the SOR-CMCI and the HPLMN indication that a list is not to be changed (e.g., 'no change of the "Operator Controlled PLMN Selector with Access Technology" list stored in the wireless device 1810 is needed and thus no list of preferred PLMN/access technology combinations is provided'), into the steering of roaming information.

The AMF (e.g., the V-AMF 1820) may send/transmit a downlink NAS transport message (e.g., DL NAS TRANSPORT message) to the wireless device 1810 (e.g., a served UE). In the downlink NAS transport message (e.g., DL NAS TRANSPORT message), the AMF may include/add the steering of roaming information received from the HPLMN UDM 1830.

The wireless device 1810 may perform a security check on the steering of roaming information comprised in the NAS message (e.g., the DL NAS TRANSPORT message) to verify that the steering of roaming information is provided by the HPLMN (e.g., HPLMN UDM 1830), for example, after or upon receiving the steering of roaming information comprising the SOR-CMCI and the HPLMN indication that a list is not to be changed (e.g., 'no change of the "Operator Controlled PLMN Selector with Access Technology" list stored in the wireless device 1810 is needed and thus no list of preferred PLMN/access technology combinations is provided'). The wireless device 1810 may store the SOR-CMCI, for example, if the security check is successful. The wireless device 1810 may send/transmit an uplink NAS transport message (e.g., a UL NAS TRANSPORT message) to the AMF (e.g., the serving AMF, such as the V-AMF 1820) with an SOR transparent container including the acknowledgement of the wireless device 1810, for example, if the HPLM UDM 1830 has requested an acknowledgement from the wireless device 1810 (e.g., via/in the downlink NAS transport message). The security check is not successful and the wireless device 1810 may be in automatic network selection mode, for example, if the selected PLMN is a VPLMN. The wireless device 1810 may wait at least until it moves/transits to an idle mode or a 5G mobility management connected mode (e.g., 5GMM-CONNECTED mode), for example, if the selected PLMN is a VPLMN. The wireless device 1810 may wait at least until it moves/transits to the idle mode or the 5G mobility management connected mode with an RRC inactive indication, for example, before attempting to obtain service on a higher priority PLMN by acting as if a timer T that controls periodic attempts has expired, with an exception that the current PLMN is considered as the lowest priority. The wireless device 1810 may attempt to perform the PLMN selection after the emergency PDU session is released, for example, if the selected PLMN is a VPLMN and the wireless device 1810 has an established emergency PDU session.

The wireless device 1810 may stay/remain on the VPLMN, for example, if the wireless device 1810 is in a manual mode of operation or the currently chosen VPLMN is part of a user controlled PLMN list (e.g., "User Controlled PLMN Selector with Access Technology" list). The AMF (e.g., the V-AMF 1820) may use the notification (e.g., the Nudm_SDM_Info service operation) to provide the received SOR transparent container to the HPLMN UDM 1830, for example, if the uplink NAS transport message with an SOR transparent container is received. The HPLMN UDM 1830 may verify that the acknowledgement is provided by the wireless device 1810, for example, if the HPLMN (e.g., HPLMN 1830) decides/determines that the wireless device 1830 is to acknowledge successful security check of the received steering of roaming information. The HPLMN UDM 1830 may inform the SOR-AF 1840 about successful delivery of the SOR-CMCI using steering of routing (SoR) information (e.g., network steering of routing application function (Nsoraf)_SoR_Info, subscription permanent identifier (SUPI) of the wireless device 1810, successful delivery, and/or other information), for example, if the present flow was invoked by the HPLMN UDM 1830 after receiving from the SOR-AF 1840 the SOR-CMCI for a wireless device identified by SUPI using an update request (e.g., Nudm_ParameterProvision_Update request), and/or if the HPLMN UDM verification of the acknowledgement of the wireless device 1810 is successful. The HPLMN UDM 1830 may send/transmit a SoR message (e.g., Nsoraf_SoR_Info, SUPI of the wireless device 1810, successful delivery) to the SOR-AF 1840. The HPLMN UDM 1830 may inform the SOR-AF 1840 about successful delivery of the SOR-CMCI to the wireless device 1810, for example, if the HPLMN policy for the SOR-AF invocation is present and the HPLMN UDM 1830 received and verified the acknowledgement of the wireless device 1810.

Figure 19:
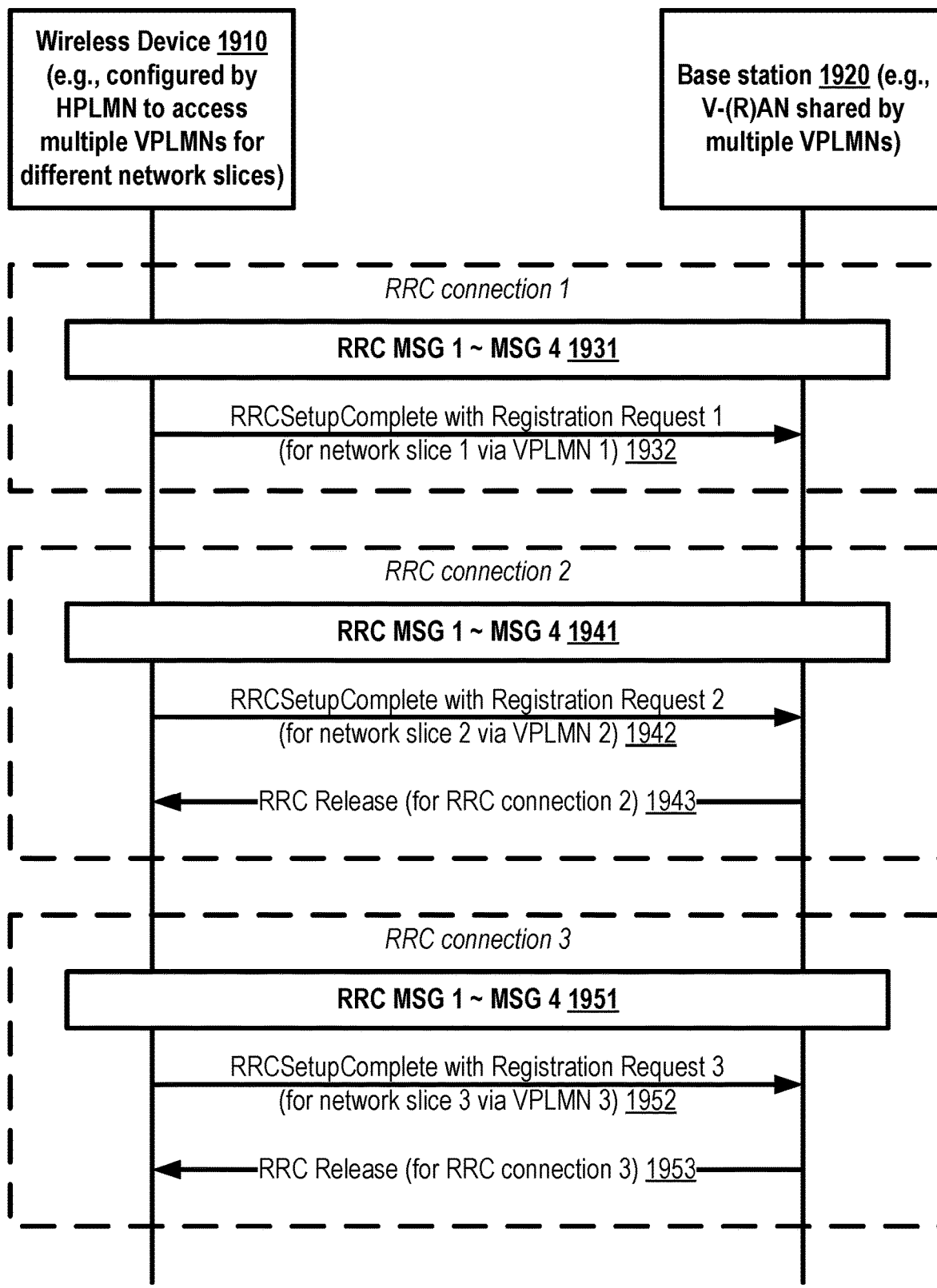
FIG. 19 shows an example access attempt.

FIG. 19 shows an example access attempt. A wireless device 1910 may attempt to obtain access, via a base station 1920 (e.g., a shared V-(R)AN), to different network slices of/via different VPLMNs. The wireless device 1910 may be roaming to one or more VPLMNs (e.g., VPLMN 1, VPLMN 2 and VPLMN 3). The VPLMN 1, the VPLMN 2, and the VPLMN 3 may share a same network elements (e.g., V-(R) AN and/or a same V-AMF). A HPLMN may have a roaming agreement with the VPLMN 1, VPLMN 2 and/or the VPLMN 3. The roaming agreement may allow the wireless device 1910 to access the VPLMN 1, the VPLMN 2, and/or the VPLMN 3 for different network slices simultaneously. The wireless device 1910 may be configured with the roaming agreement. The roaming agreement may allow the wireless device 1910 to access a network slice of a first type (e.g., an eMBB network slice) via VPLMN 1, access a network slice of a second type (e.g., a URLLC network slice) via VPLMN 2, and/or a network slice of a third type (e.g., an MIoT network slice) via VPLMN 3 at the same time.

One or more wireless devices may have a capability for certain services (e.g., a capability to simultaneously access a plurality of networks, such as a plurality of VPLMNs) that are associated with a visited network, for example, if the one or more wireless devices are visiting/roaming wireless devices in the visited network. The one or more wireless devices may be subscribed in communication services provided by HPLMNs of a first area (e.g., foreign countries, states, etc.) and may be visiting/roaming wireless devices if they are located in the visited network in a second area (e.g., domestic areas, states, etc.), for example, based on a roaming agreement between the HPLMNs and the visited network. The visited network may comprise a plurality network entities, such as one or more base stations, one or more AMFs, one or more SMFs, one or more PCFs, one or more VPLMNs, etc. The plurality of network entities of the visited network may be serving as visited network entities (e.g., visited base station, V-AMFs, V-SMFs V-PCFs, etc.) for the visiting/roaming wireless devices. The at least one entity of the visited network may be incapable and/or unavailable for providing certain services (e.g., a service providing simultaneous access to a plurality of network slices of a plurality of VPLMNs associated with the visited network) for the visiting/roaming wireless devices, for example, even if the roaming agreement authorizes the services for the visiting/roaming wireless devices. The incapability or the unavailability for providing certain services may be due to some reasons and/or problems, such as overloaded, load balance, limited resource, physical failure of the equipment, abnormal of communication link, and/or the like. The incapability or the unavailability for providing certain services may be temporary (e.g., network traffic is too high) and/or may be associated with a particular entity of the visited network (e.g., a visited base station or AMF uses a legacy system that is incapable of providing the requested services). The visiting/roaming wireless devices may not be aware of the incapability or the unavailability of the visited network, and may continue to attempt to request for the services. The visited network may repeatedly deny the requests sent from the visiting/roaming wireless devices, which may cause issues such as service access failures and/or wasted signaling overhead.

The visited network may or may not allow a visiting wireless device to simultaneously access the plurality of networks, for example, based on a status of the visited network (e.g., even if the visiting wireless device is authorized by a home network and is capable of simultaneously accessing the plurality of networks). For example, at least one entity (e.g., a base station, an AMF, etc.) of the visited network may be overloaded with service traffic for a plurality of wireless devices, and may prioritize the plurality of wireless devices over the visiting wireless device. To address the above problems, the visited network may indicate, to the visiting wireless device, whether the visited network supports, for the visiting wireless device, simultaneous access to the plurality of networks. The visiting wireless device may not attempt to simultaneously access a plurality of VPLMNs of the visited network, for example, based on the indication received from the visited network (e.g., the status of the visited network, the capability of the visited network, the availability of the visited network, etc.). Failures of service access attempts may be reduced. Efficient access procedures may provide one or more advantages such as reduced retransmissions, reduced connection releases, reduced power consumption, improved data throughput, and/or enabled selection of various functions/procedures that may provide improved quality of service (QoS).

The network elements (e.g., the V-(R)AN and/or the V-AMF) may not support the wireless device 1910 to access the VPLMN 1, VPLMN 2, and/or VPLMN 3 for different network slices simultaneously, for example, due to some reasons and/or problems (e.g., overloaded, load balance, limited resource, physical failure of the equipment, abnormal of communication link, and/or the like). The base station 1920 (e.g., the V-(R)AN) may support the wireless device 1910 to access only one VPLMN for one network slice but may not support the wireless device 1910 to access more than one VPLMN for more than one network slice simultaneously, for example, due to network overload, and/or any other condition.

The wireless device 1910 may successfully establish a first RRC connection (e.g., RRC connection 1) with the base station 1920 (e.g., a visited base station, the V-(R)AN). The wireless device 1910 may exchange RRC messages (e.g., MSG 1, MSG 2, MSG 3, and MSG 4 shown in FIG. 17 or MSG 1, MSG 2, MSG 3, MSG 4 1931 shown in FIG. 19) with the base station 1910 (e.g., the V-(R)AN), for example, to establish the first RRC connection. The wireless device 1910 may send/transmit an RRC setup complete message 1932 to the base station 1920 (e.g., the V-(R)AN), for example, after the exchange of the RRC messages. The RRC setup complete message 1932 may indicate an identifier of network slice 1. The wireless device 1910 may access a first network slice (e.g., network slice 1) via a first VPLMN (e.g., the VPLMN 1), for example, using the first RRC connection.

The wireless device 1910 may be allowed to setup a second RRC connection with the base station 1920 (e.g., V-(R)AN), for example, based on the configured roaming agreement. The wireless device 1910 may attempt to access a second network slice (e.g., network slice 2) via a second VPLMN (e.g., the VPLMN 2) via a second RRC connection (e.g., RRC connection 2). The base station 1920 (e.g., the V-(R)AN) may not support the wireless device 1910 to access more than one VPLMN for more than one network slice simultaneously, for example, due to reasons and/or problems such as described herein. The base station 1920 (e.g., the V-(R)AN) may release the second RRC connection (e.g., RRC connection 2), for example, if the base station 1920 (e.g., the V-(R)AN) does not support the wireless device 1910 to access more than one VPLMN for more than one network slice simultaneously. The wireless device 1910 may exchange RRC messages (e.g., MSG 1, MSG 2, MSG 3, and MSG 4 shown in FIG. 17 or MSG 1, MSG 2, MSG 3, MSG 4 1941 shown in FIG. 19) with the base station 1920 (e.g., the V-(R)AN), which may be similar to the messaging for the first RRC connection. The wireless device 1910 may send/transmit an RRC setup complete message 1942 indicating a second network slice (e.g., network slice 2). The base station 1920 (e.g., V-(R)AN) may receive the RRC setup complete message 1942 indicating the second network slice (e.g., network slice 2). The base station 1920 may determine (e.g., due to reasons and/or problems as described herein) to release the second RRC connection. The base station 1920 may send/transmit an RRC release message 1943 to release the second RRC connection.

The wireless device 1910 may attempt to access another slice via another PLMN (e.g., VPLMN 3), for example, after receiving the RRC release message 1943 for releasing the second RRC connection. The wireless device 1910 may establish a third RRC connection (e.g., RRC connection 3), for example, by exchanging RRC messages (e.g., MSG 1, MSG 2, MSG 3, and MSG 4 shown in FIG. 17 or MSG 1, MSG 2, MSG 3, MSG 4 1951 shown in FIG. 19) with the base station 1920. The wireless device 1910 may send/transmit an RRC setup complete message 1952 indicating a third network slice (e.g., network slice 3). The base station 1920 (e.g., V-(R)AN) may receive the RRC setup complete message 1952 indicating the third network slice, and may determine, due to the reasons and/or problems as described above, to release the third RRC connection (e.g., RRC connection 3). The base station 1920 may send/transmit an RRC release message 1953 to release the third RRC connection. The wireless device 1910 may repeat the process of RRC establishment for the second network slice (e.g., network slice 2), the third network slice (e.g., network slice 3), and/or for additional slices via additional PLMNs (e.g., VPLMNs). The wireless device 1910 may continue to fail, and/or wasted signaling attempts may increase.

An enhanced mechanism may be configured to indicate support for simultaneous access to multiple PLMNs. A base station may be configured to indicate to one or more wireless devices whether the base station supports simultaneous access to multiple PLMNs. A wireless device may receive from a base station, a first message comprising a parameter indicating whether the base station supports simultaneous access to a plurality of different network slices via a plurality of VPLMNs. The wireless device may determine to select the plurality of VPLMNs, for example, based on the parameter indicating support for simultaneous access. The wireless device may access to at least one network slice of the plurality of different network slices via the selected plurality of VPLMNs, for example, based on the determining to select the plurality of VPLMNs. The enhanced mechanism(s) may enable the wireless device to determine to access multiple VPLMNs based on the simultaneous access to multiple PLMNs capability of the base station. Unsuccessful RRC connection attempts may be avoided and/or wasted signaling attempts may be avoided, for example, if the wireless device selectively attempts simultaneous access to multiple VPLMNs based on the simultaneous access to multiple PLMNs capability of the base station.

Figure 20:
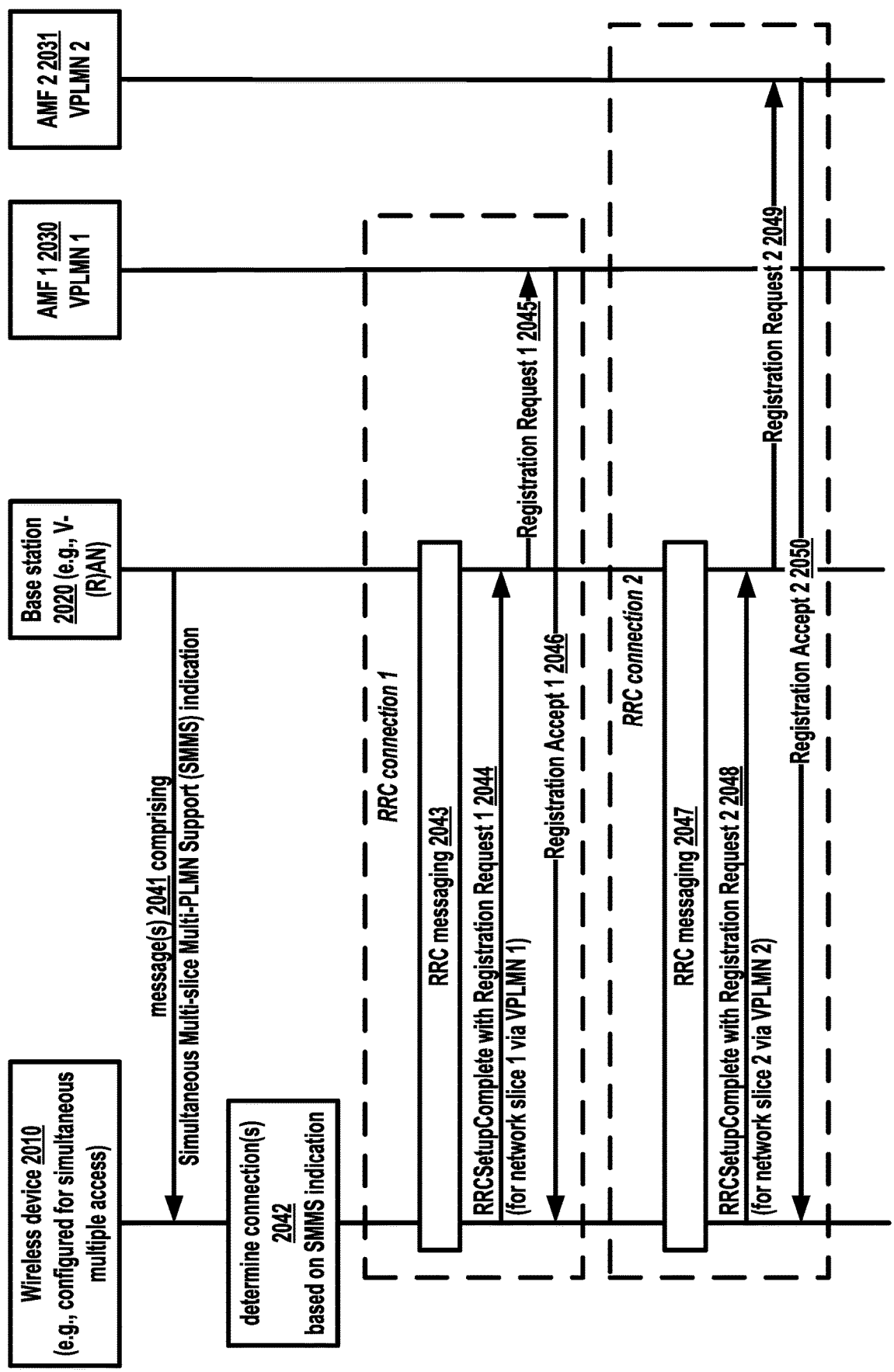
FIG. 20 shows an example connection via multiple networks (e.g., public land mobile networks (PLMNs))s.
Figure 22B:
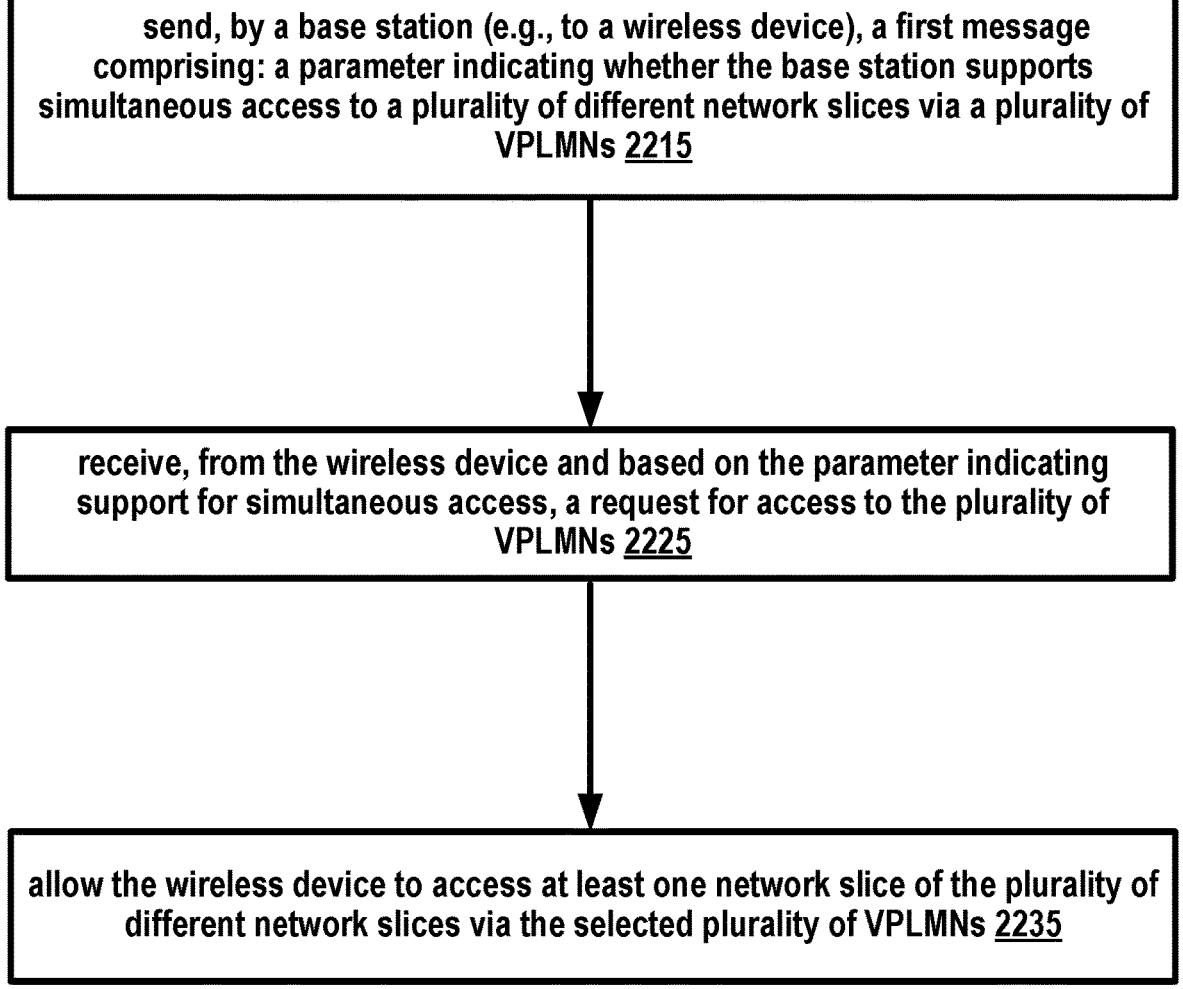
FIG. 22B shows an example procedure for a network to determine whether to allow simultaneous access to a plurality of networks (e.g., PLMNs).

FIG. 20 shows an example connection via multiple networks. The multiple networks may comprise, for example, multiple PLMNs. A wireless device 2010 may be configured for simultaneous multiple access. The wireless device 2010 may be configured for simultaneous access to multiple network slices via multiple different VPLMNs (e.g., network slice 1 via VPLMN 1 and network slice 2 via VPLMN 2). FIG. 21 shows an example SIB 1 message that may be used to indicate capability for simultaneous multiple access. FIG. 22A shows an example procedure for a wireless device to determine whether to simultaneously access a plurality of networks (e.g., PLMNs). FIG. 22B shows an example procedure for a network (e.g., a base station) to determine whether to allow simultaneous access to a plurality of networks (e.g., PLMNs).

A base station 2020 (e.g., V-(R)AN) may be shared by the different visited PLMNs (e.g., VPLMN 1 and VPLMN 2). The base station 2020 (e.g., V-(R)AN) may or may not support simultaneous access to multiple network slices via the multiple different visited PLMNs. The base station 2020 (e.g., the V-(R)AN) may not be configured to, or may not be allowed to, support the simultaneous access. Support for simultaneous access may fail and/or may not be allowed, for example, due to overloading, load balancing, limited resources, physical failure of equipment, abnormal communication linkage, priority requirements, and/or any other reasons. The base station 2020 (e.g., V-(R)AN) may send/transmit, to the wireless device 2010, an indication associated with simultaneous PLMN access (e.g., one or more messages 2041 shown in FIG. 20), for example, at step 2215 shown in FIG. 22B. The base station 2020 (e.g., V-(R)AN) may send/transmit, to the wireless device 2010, an indication associated with simultaneous PLMN access (e.g., a simultaneous multi-slice multi-PLMN support (SMMS) indication, an indication that the base station 2020 supports simultaneous PLMN access for the wireless device 2010, etc.), for example, if the base station supports (or does not support) simultaneous access for the wireless device 2010 to access the plurality of VPLMNs (e.g., VPLMN 1 and VPLMN 2) for a plurality of network slices of the plurality of PLMNs. The SMMS indication may indicate that SMM is supported. The SMMS indication may indicate that SMM is not supported and/or has failed.

The wireless device 2010 may receive an indication associated with simultaneous PLMN access (e.g., one or more messages 2041 shown in FIG. 20), for example, at step 2210 shown in FIG. 22A. The wireless device 2010 may receive the SMMS indication (e.g., from the base station 2010 or from any other devices, such as a relay, another wireless device, etc.). The wireless device 2010 may make one or more connection determinations, for example, based on the SMMS indication. The one or more connection determinations may reduce wasteful signaling overhead.

The wireless device 2010 may establish and/or attempt to establish multiple RRC connections (e.g., simultaneous RRC connections comprising RRC connection 1 and RRC connection 2, as shown in FIG. 20) with multiple PLMNs via the base station (e.g., V-(R)AN), for example, based on the SMMS indication indicating that multiple access is supported by the base station 2020. The multiple RRC connections may be associated with different network slices (e.g., network slice 1 and network slice 2, as shown in FIG. 20).

The wireless device 2010 may establish and/or attempt to establish a single RRC connection (e.g., RRC connection 1, as shown in FIG. 20) with a single PLMN via the base station 2020 (e.g., V-(R)AN), for example, based on the SMMS indication indicating that multiple access is failed and/or not supported by the base station 2020. The single RRC connection may be associated with a first network slice (e.g., network slice 1, as shown in FIG. 20). The first network slice may be prioritized over a second network slice (e.g., network slice 2, as shown in FIG. 20). The wireless device 2010 may avoid establishing and/or attempting to establish a second RRC connection (e.g., RRC connection 2, as shown in FIG. 20), for example, based on the SMMS indication indicating that multiple access is failed and/or not supported. The second RRC connection may be avoided, for example, based on the prioritizing of the first RRC connection. The second RRC connection may be avoided, for example, based on the establishment of the first RRC connection.

The wireless device 2010 may be configured for simultaneous multiple access. The wireless device 2010 may be configured by a HPLMN for simultaneous access to a plurality of different network slices via a plurality of VPLMNs (e.g., different VPLMNs). The wireless device 2010 may comprise one subscriber identification module (SIM) card, and the wireless device 2010 may access to the plurality of VPLMNs with the same SIM card but with different wireless device identities. The wireless device 2010 may access VPLMN 1 with subscription permanent identifier (SUPI) 1, access VPLMN 2 with SUPI 2, and/or access VPLMN 3 with SUPI 3. The wireless device 2010 may comprise multiple SIM cards, and the wireless device may access the plurality of VPLMNs with the different SIM cards and/or different identities of the wireless device 2010. The wireless device 2010 may access VPLMN 1 with SIM card 1 and/or SUPI 1. The wireless device 2010 may access VPLMN 2 with SIM card 2 and/or SUPI 2. The wireless device 2010 may access VPLMN 3 with SIM card 3 and/or SUPI 3.

The HPLMN may send configuration information to the wireless device 2010. The configuration information may indicate the wireless device 2010 may simultaneously access a plurality of different network slices via a plurality of respective VPLMNs. The wireless device 2010 may be configured to access the base station 2020 (e.g., V-(R)AN that is shared by PLMN 1 and PLMN 2). The wireless device 2010 may access a first network slice (e.g., network slice 1) via PLMN 1 and simultaneously access a second network slice (e.g., network slice 2) via PLMN 2. The wireless device may receive the configuration information from the HPLMN via a visited network function. The visited network function may comprise at least one of: a (visited) base station 2020; a (visited) AMF (e.g., AMF 1 2030, AMF 2 2031); a (visited) SMF; and/or a (visited) PCF.

The wireless device 2010 may receive configuration information from the HPLMN, for example, based on the roaming agreement. The configuration information may allow the wireless device 2010 to access a network slice of a first type (e.g., eMBB network slice) via VPLMN 1, access a network slice of a second type (e.g., a URLLC network slice) via VPLMN 2, and/or a network slice of a third type (e.g., MIoT network slice) via VPLMN 3 at the same time. The configuration information may comprise subscribed VPLMNs and an indication that the wireless device 2010 may access multiple network slices simultaneously. As described herein, simultaneous access and/or simultaneously accessing (e.g., a plurality of network slices, a plurality of nodes, a plurality of networks, a plurality of PLMNs, and/or of a plurality of resources) may refer to access that overlaps during at least a time period such that access is more than a singular access (e.g., access to more than a single network slice, access to more than a single node, access to more than a single network, access to more than a single PLMN, and/or access to more than a single resource) during that time period but need not be access that overlaps during all time periods.

The wireless device 2010 may receive subscribed VPLMNs information and/or subscribed simultaneous multi-slice and/or multi-PLMN (SSMM) information. The subscribed VPLMNs information and/or the SSMM information may be received from a UDM of the HPLMN. The subscribed VPLMNs information and/or the SSMM information may comprise at least one of: an indication associated with a simultaneous access to multiple network slices on different PLMNs; a list of allowed PLMNs and associated network slices; and/or a list of forbidden PLMN and associated network slices. The indication associated with simultaneous access to multiple network slices on different PLMNs may indicate that the wireless device is allowed to access to multiple network slices on different PLMNs simultaneously. The indication associated with simultaneous access to multiple network slices on different PLMNs may indicate that the wireless device is not allowed to access to multiple network slices on different PLMNs simultaneously.

The list of allowed PLMNs and associated network slices may comprise at least one of: at least one allowed PLMN; a priority of the at least one allowed PLMN; and/or a network slice associated with the at least one allowed PLMN. The at least one allowed PLMN may indicate the wireless device is allowed to access the at least one allowed PLMN (e.g., VPLMN). The priority of the at least one allowed PLMN may be used by the wireless device 2010 to select one or more of the at least one allowed PLMN, for example, based on each of the priority of the at least one allowed PLMN. The wireless device 2010 may select a PLMN with a higher priority. The network slice associated with the at least one allowed PLMN may indicate the network slice(s) supported by the at least one allowed PLMN. The at least one allowed PLMN may comprise VPLMN 1, VPLMN 2 and VPLMN 3. The priority of the at least one allowed PLMN may indicate that the priority of VPLMN 1 is a first value (e.g., 1 (the highest)), the priority of VPLMN 2 is a second value (e.g., 2 (the second highest)), and/or the priority of VPLMN 3 is a third value (e.g., 3 (lowest)). The network slice associated with the at least one allowed PLMN may comprise at least one of: a network slice for a first type (e.g., an eMBB) and/or a network slice for a second type (e.g., URLLC) that is/are associated with the VPLMN 1; a network slice for a third type (e.g., an mIoT) that is associated with VPLMN 2; and/or a network slice for a fourth type (e.g., a V2X) that is associated with VPLMN 3.

The list of forbidden PLMNs and associated network slices may comprise at least one of: at least one forbidden PLMN; and/or a network slice associated with the at least one forbidden PLMN. The at least one forbidden PLMN may indicate that the wireless device is not allowed to access the at least one forbidden PLMN (e.g., VPLMN). The network slice associated with the at least one forbidden PLMN may indicate the network slice(s) not supported by the at least one forbidden PLMN. At least one forbidden PLMN may comprise VPLMN 4 and/or VPLMN 5. The network slice associated with the at least one forbidden PLMN may comprise at least one of: a network slice for a first type (e.g., an eMBB) and/or a network slice for a second type (e.g., V2X) that is/are associated with the VPLMN 4; and/or a network slice for a third type (e.g., an mIoT) that is associated with VPLMN 5.

The subscribed VPLMNs information and/or SSMM information may comprise wireless device identities mapping information. The wireless device identities mapping information may comprise information indicating a plurality of wireless device identities respectively mapped to a plurality of PLMNs and/or mapped to a same device identity. The wireless device identities mapping information may comprise the plurality of wireless device identities (e.g., international mobile subscriber identity (IMSI) 1, IMSI 2, and/or IMSI 3) mapping to the same device identity (e.g., the same international Mobile Station Equipment Identity (IMEI)). The wireless device identities mapping information may indicate that the IMSI 1 may be mapped/applied to VPLMN 1, the IMSI 2 may be mapped/applied to VPLMN 2, and/or the IMSI 3 may be mapped/applied to VPLMN 3. The wireless device identities mapping information may comprise the plurality of wireless device identities (e.g., SUPI 1, SUPI 2, and/or SUPI 3) mapping to the same device identity (e.g., the same permanent equipment identifier (PEI)). The wireless device identities mapping information may indicate that the SUPI 1 may be mapped/applied to VPLMN 1, the SUPI 2 may be mapped/applied to VPLMN 2, and/or the SUPI 3 may be mapped/applied to VPLMN 3.

The configuration information may comprise at least one of: an HPLMN selector with access technology, an operator controlled PLMN selector with access technology, a user controlled PLMN selector with access technology, forbidden PLMNs, and/or equivalent HPLMNs (EHPLMNs). The HPLMN selector with access technology may comprise the subscribed VPLMNs information and/or SSMM information and/or the UE identities mapping information.

The HPLMN selector with access technology may comprise a HPLMN code/identifier, and/or codes/identifiers together with the respected/respective access technology. The user controlled PLMN selector with access technology may comprise user preferred PLMNs in priority order and/or access technologies for each PLMN in this list. The operator controlled PLMN selector with access technology may comprise operator preferred PLMNs in priority order, and/or access technologies for each PLMN in this list. The forbidden PLMNs may comprise PLMNs which the wireless device 2010 may not automatically attempt to access. The equivalent HPLMNs may comprise a list of PLMNs which can be regarded as a HPLMN.

The operator controlled PLMN selector with access technology may comprise the subscribed VPLMNs information and/or information indicating network slices (e.g., subscribed network slices) can be accessed simultaneously and/or the wireless device identities mapping information. The user controlled PLMN selector with access technology may comprise the subscribed VPLMNs information and/or information indicating network slices can be accessed simultaneously and/or the wireless device identities mapping information. The forbidden PLMNs may comprise the subscribed VPLMNs information and/or information indicating network slices can be accessed simultaneously and/or the wireless device identities mapping information. The equivalent HPLMNs may comprise the subscribed VPLMNs information and/or information indicating network slices can be accessed simultaneously and/or the wireless device identities mapping information.

The wireless device 2010 may receive (e.g., from the base station 2020) a first message comprising a parameter indicating whether the base station 2020 supports simultaneous access to a plurality of different network slices via a plurality of VPLMNs. The first message may be a MIB message. The first message may be a SIB message. FIG. 21 shows an example SIB1 message. The SIB message comprises a plurality of parameters comprising a parameter indicating a capability of supporting multiple PLMN access (e.g., MultiplePLMNCapablity, multi-PLMN-Capability, or any other parameter definitions that indicates the capability of supporting multiple PLMN access). The capability of supporting multiple PLMN access may indicate a capability of supporting multiple PLMN access by the base station 2020 and/or an AMF (e.g., the AMF 1 2030 and/or the AMF 2 2031).

The first message may be a Random Access (RA) preamble assignment message. The wireless device may receive one or more messages 2041 (e.g., a MIB and/or SIB message). The one or more messages 2041 may comprise a parameter indicating support simultaneous access to multiple PLMNs capability of a (visited) base station and/or a (visited) AMF. The plurality of VPLMNs may comprise a first VPLMN corresponding to a first network slice and a second PLMN corresponding to a second network slice. The accessing may comprise accessing the first network slice via the (visited) base station 2020 and/or the (visited) AMF 1 2030; and/or simultaneously accessing the second network slice via the (visited) base station 2020 and/or the (visited) AMF 2 2031. The parameter may indicate whether the (visited) AMF (e.g., the AMF 1 2030 and/or the AMF 2 2031) associated with the (visited) base station 2020 supports simultaneous access to a plurality of VPLMNs (e.g., VPLMN 1 and VPLMN 2). The parameter may indicate the (visited) base station 2020 and/or the (visited) AMF may be shared by the plurality of VPLMNs.

The parameter may indicate that at least one visited base station of a VPLMN supports simultaneous access to the plurality of VPLMNs for the plurality of different network slices. The parameter may indicate at least one visited AMF of a VPLMN supports simultaneous access to the plurality of VPLMNs for the plurality of different network slices. Each of the plurality of VPLMN supports at least one network slice of the plurality of different network slices. Each of the plurality of different network slices may comprise at least one slice/service type (SST). The SST may comprise at least one of: a plurality of service types (e.g., eMBB; URLLC; MIoT; and/or V2X).

The wireless device 2010 may determine to select the plurality of VPLMNs, for example, after or in response to the one or more messages 2041 (e.g., the first message). The wireless device 2010 may determine whether to access the plurality of VPLMNs simultaneously (e.g., connection(s) 2042 shown in FIG. 20, and at step 2220 shown in FIG. 22A), for example, based on the parameter indicating support for simultaneous access, based on the parameter indicating the simultaneous support by the base station and the AMF, and/or based on the configuration information.

The wireless device 2010 may determine to select the plurality of VPLMNs, for example, based on the parameter indicating support for simultaneous access, based on the parameter indicating the simultaneous support by the visited base station, and/or based on the subscribed VPLMNs information and/or information indicating network slices can be accessed simultaneously. The wireless device 2010 may determine to select VPLMN 1 for network slice 1, and/or determine to select VPLMN 2 for network slice 2 and network slice 3, for example, based on the indication of the simultaneous access to multiple network slices on different PLMNs, based on the list of allowed PLMNs and associated network slices, and/or based on the list of forbidden PLMN and associated network slices.

The wireless device 2010 may access at least one network slice of the plurality of different network slices via the selected plurality of VPLMNs (e.g., step 2230 shown in FIG. 22A), for example, based on the determining 2042. The wireless device 2010 may setup a first RRC connection (e.g., RRC connection 1) to the base station 2020 (e.g., V-(R)AN) for the VPLMN 1 and/or the network slice 1. The wireless device 2010 may perform the procedure described with respect to FIG. 17 (e.g., exchange of messages 2043, such as MSG 1 to MSG 5) to establish the first RRC connection. The wireless device 2010 may send/transmit a first RRC setup complete message 2044 (e.g., RRCSetupComplete 1 message (e.g., MSG 5 shown in FIG. 17)) to the base station 2020 (e.g., V-(R)AN). The first RRC setup complete message 2044 (e.g., RRCSetupComplete 1 message) may comprise a registration request 1 message for the VPLMN 1 and/or network slice 1. The first RRC setup complete message 2044 (e.g., RRCSetupComplete 1 message) and/or the registration request 1 message may comprise at least one of: an identifier of the VPLMN 1, an identifier of the network slice 1, a wireless device identity, and/or a device identifier of the wireless device 2010. The first RRC setup complete message 2044 (e.g., RRCSetupComplete 1 message) may comprise one or more parameters/information elements as described with respect to FIG. 17. The registration request 1 message may comprise at least one of: a registration type, a subscription concealed identifier (SUCI) or SUPI or a global unique temporary identifier (GUTI), such as 5G-GUTI, a last visited tracking area identity (TAI) (if available), security parameters, requested NSSAI, mapping of requested NSSAI, a core network capability of a wireless device (e.g., a 5G core network (5GC) capability of a wireless device, such as UE 100 5GC capability), a PDU session status, PDU session(s) to be re-activated, a follow on request, a MICO mode preference, and/or the like. The base station 2020 receives, from the wireless device 2010, the one or more messages and/or requests for access to at least one of the plurality of VPLMNs (e.g., at step 2230 shown in FIG. 22B).

The base station 2020 may select the V-AMF 1 2030 for the VPLMN 1 and/or the network slice 1, for example, after or in response to the message(s) 2043 and 2044. The base station 2020 (e.g., V-(R)AN) may determine/select the V-AMF 1 2030 for the VPLMN 1 and/or the network slice 1, for example, based on the identifier of the VPLMN 1, the identifier of the network slice 1, the wireless device identity, and/or the device identifier of the wireless device 2010. The base station 2020 (e.g., V-(R)AN) may send/forward the registration request 1 message 2045 to the V-AMF 1 2030. The V-AMF 1 2030 may accept the registration request 1 2045 and send a registration accept 1 message 2046 to the wireless device 2010, for example, based on subscription information of the wireless device 2010. The base station 2020 may allow the wireless device 2010 to access at least one network slice of a plurality of different network slices via one or more selected VPLMNs (e.g., at step 2235 shown in FIG. 22B).

The wireless device 2010 may setup a second RRC connection (e.g., RRC connection 2) to the base station 2020 (e.g., the V-(R)AN) for the VPLMN 2 and/or a second network slice (e.g., the network slice 2). The wireless device 2010 may perform the procedure described above with respect to FIG. 17. The wireless device 2010 may exchange messages 2047 (e.g., RRC messaging 2047 shown in FIG. 20, MSG 1 to MSG 5 shown in FIG. 17) to establish the second RRC connection. The wireless device 2010 may send/transmit a second RRC setup complete message 2048 (e.g., RRCSetupComplete 2 message (e.g., MSG 5)) to the base station 2020 (e.g., the V-(R)AN). The second RRC setup complete message 2048 (e.g., RRCSetupComplete 2 message) may comprise a second registration request message (e.g., a registration request 2 message) for the VPLMN 2 and/or the second network slice (e.g., network slice 2). The second RRC setup complete message (e.g., RRCSetupComplete 2 message) and/or the second registration request message (e.g., the registration request 2 message) may comprise at least one of: an identifier of the VPLMN 2, an identifier of the second network slice, the wireless device identity, and/or an device identifier of the wireless device 2010. The RRCSetupComplete 2 message and/or the registration request 2 message may comprise the wireless device identities mapping information. The RRCSetupComplete 2 message may comprise one or more parameters and/or information elements as described with respect to FIG. 17. The registration request 2 message may comprise at least one of: a registration type, SUCI or SUPI or 5G-GUTI, last visited TAI (if available), security parameters, requested NSSAI, mapping of requested NSSAI, a core network capability (e.g., a core network capability of a wireless device, such as UE 100 5GC capability), a PDU session status, PDU session(s) to be re-activated, a follow on request, a MICO mode preference, and/or the like.

The base station 2020 (e.g., V-(R)AN) may determine to accept the second RRC connection and/or the second registration request, for example, after or in response to the message received. The base station 2020 (e.g., V-(R)AN) may determine to accept the second RRC connection and/or the second registration request, for example, based on the identifier of the VPLMN 2, the identifier of the network slice 2, the wireless device identity, the device identifier of the wireless device 2020, and/or the wireless device identities mapping information. The base station 2020 (e.g., V-(R)AN) may determine to accept the second RRC connection and/or the second registration request and/or the base station 2020 (e.g., V-(R)AN) may send/forward the second registration request message to the V-AMF 2 2031, for example, based on the identifier of the VPLMN 2, the identifier of the network slice 2, the wireless device identity, the device identifier of the wireless device 2010, and/or the wireless device identities mapping information. The base station 2020 (e.g., V-(R)AN) may send/forward the second registration request message to the V-AMF 2 2031. The V-AMF 2 2031 may accept the second registration request, and send a second registration accept message 2050 (e.g., registration accept 2 message) to the wireless device 2010, for example, based on subscription information of the wireless device 2010.

The wireless device 2010 may establish a first PDU session (e.g., PDU session 1) for the first network slice (e.g., network slice 1) via the VPLMN 1, and/or the wireless device 2010 may establish a second PDU session (e.g., PDU session 2) for a second network slice 2 (e.g., network slice 2) via the VPLMN 2, for example, after registered to VPLMN 1 and/or VPLMN 2. The wireless device 2010 may access the network slice 1 and/or PDU session 1 via the VPLMN 1, and/or access the network slice 2 and/or PDU session 2 via the VPLMN 2 simultaneously.

An HPLMN may determine configuration information for a wireless device, for example, in at least some wireless communications. The configuration information may indicate the wireless device to simultaneously access a plurality of different network slices via a plurality of VPLMNs. One or more wireless devices (e.g., a visiting wireless device, a roaming wireless device, etc.) may be capable of simultaneous access to a plurality of VPLMNs. One or more network nodes (e.g., a visited base station, a visited AMF, the VPLMNs, etc.) may not be in a status to allow the simultaneous access to the plurality of VPLMNs. The HPLMN may not know/detect the status of the one or more network nodes (e.g., e.g., a visited base station, a visited AMF, the VPLMNs, etc.) with respect to multiple access, which may cause a failure of the wireless device in accessing the VPLMNs simultaneously. One or more wireless device may be capable of providing information about/for available VPLMNs and/or wireless device location information to one or more network nodes (e.g., a visited base station, a visited AMF, the VPLMNs, the HPLMN, etc.). The one or more network nodes (e.g., a visited base station, a visited AMF, the VPLMNs, the HPLMN, etc.) may determine, based on the available VPLMNs and/or the wireless device location information, allowed VPLMNs. The one or more network nodes may determine, based on the available VPLMNs and/or wireless device location information, network slices that may be accessed simultaneously. The one or more network nodes may send/transmit, to the wireless device via a VPLMN, information regarding allowed VPLMNs and/or network slices that may be accessed simultaneously. The information may be based on the available VPLMNs information and/or wireless device location information. Network access failure and/or signaling overhead may be reduced and/or avoided, for example, based on the above information and/or a VPLMN access decision based on the above information.

Figure 23:
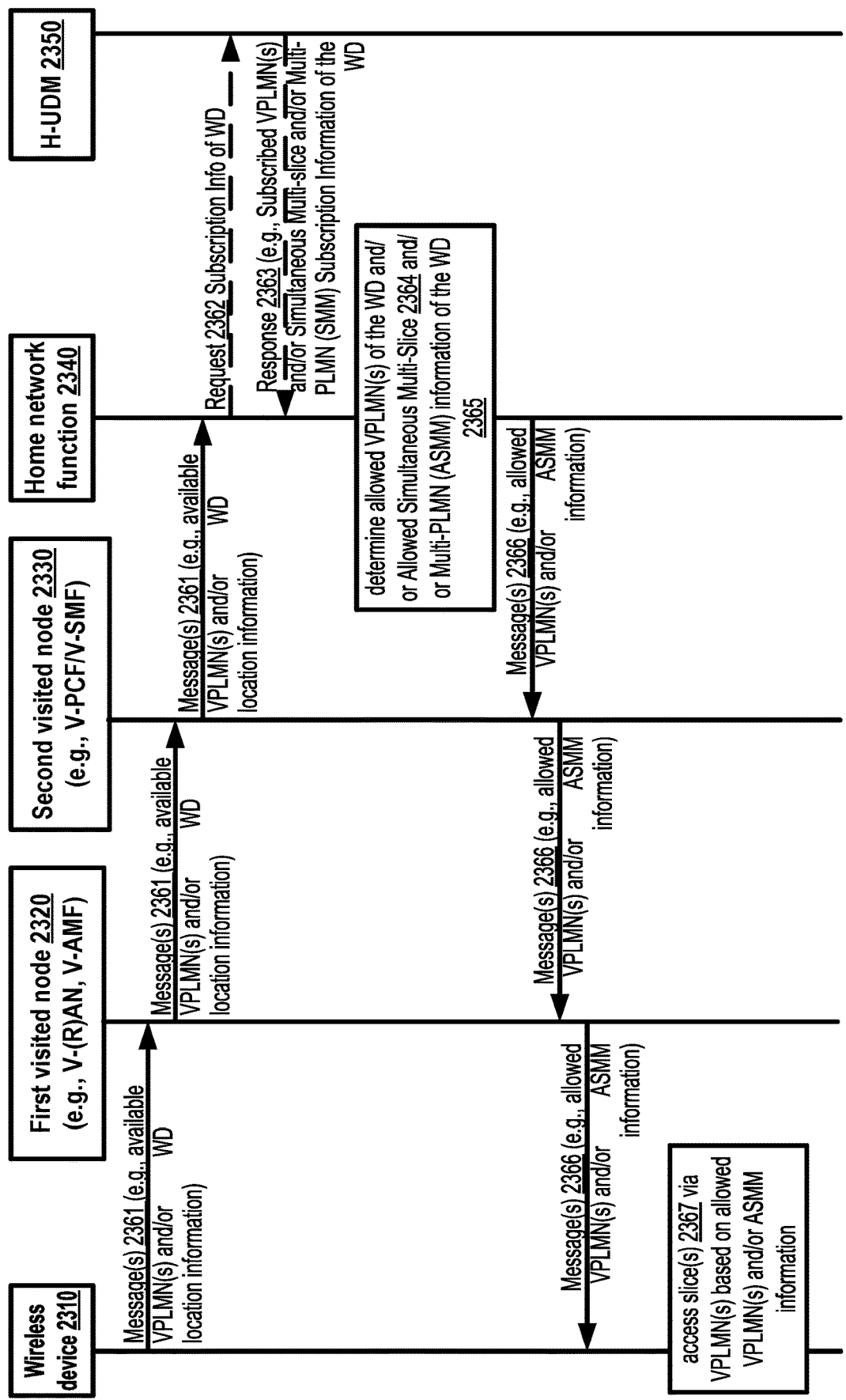
FIG. 23 shows an example visited node (e.g., visited PLMN (VPLMN)) access procedure.

FIG. 23 shows an example visited node (e.g., VPLMN) access procedure. A home network function 2340 may receive one or more messages 2361 (e.g., available VPLMN information and/or wireless device (WD) location information, such as UE location information, etc.) from a wireless device, for example, via at least one visited node (e.g., a first visited node 2320, a second visited node 2330). The home network function 2340 may be a network function of an HPLMN. The HPLMN may comprise an HPLMN-UDM (H-UDM) 2350. The home network function 2340 may be a core network function. The network function may be a PCF, SMF, AMF and/or any other network functions. The one or more messages 2361 (e.g., available VPLMN information and/or wireless device (WD) location information, such as UE location information, etc.) may be received via one or more network functions of a VPLMN. The network function(s) may comprise one or more of an AMF, PCF, and SMF. The one or more messages 2361 may comprise a registration request message. The one or more messages 2361 may comprise a PDU session create request message. The one or more messages 2361 may comprise a service request message. The one or more messages 2361 may comprise a policy request message. The one or more messages 2361 may comprise a wireless device identifier and/or UE identity (e.g., SUPI, IMSI) of the wireless device 2310.

The one or more messages 2361 may comprise a list of available VPLMNs. The list of available VPLMNs may comprise a plurality of VPLMNs which are available and/or accessible by the wireless device 2310. The list of available VPLMNs may comprise PLMNs that provide service(s) to the wireless device 2310. The wireless device 2310 may receive the list of available VPLMNs, for example, from the first visited node 2320 (e.g., from one or more visited Wi-Fi access points, one or more visited base stations, one or more V-(R)ANs, and/or a visited AMF). The one or more messages 2361 may be further processed (e.g., scrambling, descrambling, encrypting, decrypting, encoding, decoding, parsing, etc.) before sent/transmitted to the next node, function or any other network entity (e.g., the first visited node 2320 may further process the received one or more messages 2361 before sending it to the second visited node 2330).

The one or more messages 2361 may comprise WD location information. The WD location information may indicate a (geographical) location of the wireless device 2310. The WD location information may comprise at least one of: a Cell Global Identification (CGI), a Service Area Identity (SAD, a Routing Area Identification (RAI), a Tracking Area Identity (TAI), a EUTRAN CGI (ECGI), a eNodeB ID, a gNodeB ID, and/or the like. The WD location information may comprise a latitude and/or a longitude of the wireless device 2310.

The home network function 2340 may obtain subscription information of the wireless device 2310, for example, after or in response to receiving the one or more messages 2361 (e.g., available VPLMN information and/or wireless device (WD) location information, such as UE location information, etc.). The home network function 2340 may send/transmit a request 2362 for subscription information. The request 2362 may be sent to the H-UDM 2350. The request 2362 may comprise the wireless device identifier and/or WD identity of the wireless device 2310. The request 2362 may comprise the WD location information. The home network function 2340 may receive a response message 2363 (e.g., a subscription response) from the H-UDM 2350. The response 2363 may comprise subscription information of the wireless device 2310. The subscription information may indicate identifiers of one or more PLMNs. The one or more PLMNs may be VPLMNs that the wireless device 2310 is allowed and/or permitted to access (e.g., whether the wireless device 2310 is subscribed for access to the VPLMNs). The one or more PLMNs may be VPLMNs that the wireless device 2310 is forbidden to access (e.g., forbidden to access simultaneously but allowed to access for a single RRC connection, or forbidden to access regardless of whether a simultaneous access for a plurality of RRC connections or a single RRC connection). The subscription information may indicate whether the wireless device 2310 is allowed and/or permitted to simultaneously access multiple different network slices (e.g., whether the wireless device 2310 is subscribed for such access). The subscription information may indicate whether the wireless device 2310 is allowed and/or permitted to simultaneously access the multiple different network slices via multiple different PLMNs (e.g., whether the wireless device 2310 is subscribed for such access). The information comprised in the response 2363 may comprise simultaneous multi-slice and/or multi-PLMN (SMM) subscription information.

The home network function 2340 may determine the simultaneous multi-slice and/or multi-PLMN (SMM) subscription information (e.g., allowed VPLMNs information and/or information indicating network slices can be accessed simultaneously) 2364, for example, after or in response to receiving the response 2363. The home network function 2340 may determine allowed VPLMNs information and/or information indicating network slices can be accessed simultaneously 2364, for example, based on at least one of: the list of available VPLMNs, the WD location information; the SMM subscription information; the WD identities and/or the device identifier of the wireless device 2310. The home network function 2340 may determine allowed simultaneous multi-slice and/or multi-PLMN (ASMM) information 2365 (e.g., VPLMNs that the wireless device 2310 is allowed to access). The home network function 2340 may determine the ASMM information (e.g., whether the wireless device 2310 is allowed to simultaneously access multiple network slices via multiple VPLMNs. The home network function 2340 may send/transmit one or more messages 2366 (e.g., the allowed VPLMN(s) and/or the ASMM information) to the wireless device 2310. The one or more messages 2366 may be sent to the wireless device 2310 via one or more visited network entities (e.g., the first visited node 2320, the second visited node 2330, the VPLMN(s), one or more network functions, etc.). The wireless device 2310 may use one or more messages 2366 to determine its VPLMN selection and/or determine whether to access (and/or attempt to access) multiple network slices via multiple selected VPLMNs. The one or more messages 2366 may be further processed (e.g., scrambling, descrambling, encrypting, decrypting, encoding, decoding, parsing, etc.) before sent/transmitted to the next node, function or any other network entity (e.g., the second visited node 2323 may further process the received one or more messages 2366 before sending it to the first visited node 2320).

The home network function 2340 may determine one or more allowed VPLMNs that the wireless device 2310 is allowed to access. At least one of the allowed VPLMNs may be used for communications of the wireless device 2310. The wireless device 2310 may attempt access via one or more of the one or more allowed VPLMNs. The wireless device 2310 may avoid attempts to access via any PLMN, even if available, that is not of the one or more allowed VPLMNs. The allowed VPLMNs may be determined based on (e.g., selected from) the list of VPLMNs received from the wireless device 2310. The home network function 2340 may determine that a first VPLMN (from the list of available PLMNs provided by the wireless device 2310) is allowed based on the subscription information indicating that the wireless device 2310 is allowed to access the first VPLMN. The home network function 2340 may determine that a second VPLMN (from the list of available PLMNs provided by the wireless device 2310) is not allowed based on the subscription information indicating that the wireless device 2310 is not allowed to access the second VPLMN.

The home network function 2340 may determine the allowed VPLMNs based on WD location information. The home network function 2340 may determine that a third VPLMN (from the list of available PLMNs provided by the wireless device 2310) is allowed based on the subscription information indicating that the wireless device 2310 is allowed to access the third VPLMN from a particular WD location and the WD location information indicating that the wireless device 2310 is in the particular WD location. The home network function 2340 may determine that a fourth VPLMN (from the list of available PLMNs) is not allowed based on the subscription information indicating that the wireless device 2310 is allowed to access the fourth VPLMN from a particular WD location and the WD location information indicating that the wireless device 2310 is not in the particular WD location.

The home network function 2340 may determine priorities of the one or more allowed VPLMNs (e.g., relative priorities relative to other allowed VPLMNs). The priorities may be based on the WD location, subscription information, etc. The wireless device 2310 may determine to access a first VPLMN based on the first VPLMN having a high priority than another VPLMN. The network slice 2367 associated with the at least one allowed PLMN may indicate the network slice(s) supported by the at least one allowed PLMN. The at least one allowed PLMN may comprise VPLMN1, VPLMN2 and VPLMN3. The priority of the at least one allowed PLMN may indicate that the priority of VPLMN1 is a first value (e.g., 1 (the highest)), the priority of VPLMN2 is a second value (e.g., 2 (the second highest), and/or the priority of VPLMN3 is a third value (e.g., 3 (lowest)).

The home network function 2340 may determine one or more network slices associated with the allowed VPLMNs (e.g., one or more network slices associated with each respective VPLMN). The wireless device 2310 may be allowed to access a particular VPLMN and may be allowed to access one or more particular network slices via the particular VPLMN. VPLMN1 may be associated with access to a first service type (e.g., eMBB) slice and/or a second service type (e.g., URLLC network) slice; VPLMN2 may be associated with access to a third service type (e.g., mIoT) slice; and/or VPLMN3 may be associated with a fourth service type (e.g., V2X) slice, etc. The particular network slices may be determined based on the identifier of the respective VPLMN. A VPLMN may support one network slice (e.g., one service type), but not another (e.g., another service type). The particular network slices may be determined based on the subscription information of the wireless device 2310. A VPLMN may support a network slice, but the wireless device 2310 may not be subscribed for access to that particular combination of a VPLMN and a network slice. The particular network slices may be determined based on the WD location of the wireless device 2310. The wireless device 2310 may be subscribed for access to a particular combination of VPLMN and network slice, but the subscription may be limited to one or more particular locations.

The home network function 2340 may determine whether the wireless device 2310 is allowed and/or permitted to simultaneously access multiple different network slices, for example, based on the ASMM information. The home network function 2340 may determine whether the wireless device 2310 is allowed and/or permitted to simultaneously access the multiple different network slices via multiple different PLMNs (e.g., via multiple allowed VPLMNs of the one or more VPLMNs), for example, based on the ASMM information.

The determining of the ASMM information may be, for example, based on the information, received from the wireless device 2310 and/or via the one or more network entities (e.g., the VPLMN), (e.g., the wireless device identifier and/or WD identity of the wireless device 2310, the list of available VPLMNs, and/or WD location information). The determining may be, for example, based on the subscription information of the wireless device 2310. The determining may be, for example, based on the SMM subscription information. The ASMM information may be the same as the SMM subscription information (e.g., include the same information element, field, parameter, flag, indicator, and/or the like) or may comprise the same information comprised in the SMM subscription information.

The home network function 2340 may send/transmit one or more messages 2366 (e.g., one or more response messages) to the wireless device. The one or more messages 2366 may comprise the wireless device identifier and/or WD identity (e.g., SUPI, IMSI) of the wireless device 2310. The one or more messages 2366 may comprise the allowed VPLMNs (e.g., a list of VPLMN identifiers associated with the allowed VPLMNs). The one or more messages 2366 may comprise the ASMM information. The one or more messages 2366 may comprise a registration accept message or a registration reject message (a registration accept/reject message) for a registration request procedure. The one or more messages 2366 may comprise a PDU session create response message for a PDU session establishment/modification procedure. The one or more messages 2366 may comprise a service response message for a service request. The one or more messages 2366 may comprise a policy response message.

The wireless device 2310 may determine whether or not to select one or more VPLMNs, for example, based on the received one or more messages 2366. The wireless device 2310 may determine whether or not to select one or more VPLMNs, for example, based on the allowed VPLMNs and/or the ASMM information. The wireless device 2310 may determine whether to access one or more network slices via one or more VPLMNs simultaneously, for example, based on the allowed VPLMNs and/or the ASMM information. The wireless device 2310 may attempt to access a first allowed VPLMN and avoid attempting to access a second allowed VPLMN (e.g., if the ASMM information indicates that simultaneous access of different slices via different PLMNs is not allowed), for example, based on the determining. The wireless device 2310 may access a first allowed VPLMN and avoid attempting to access a second allowed VPLMN (e.g., if the access to the first allowed VPLMN is successful and the ASMM information indicates that simultaneous access of different slices via different PLMNs is not allowed), for example, based on the determining. The wireless device 2310 may access or attempt to access a first allowed VPLMN and access or attempt to access a second allowed VPLMN (e.g., if the ASMM information indicates that simultaneous access of different slices via different PLMNs is allowed), for example, based on the determining.

A visited network entity (e.g., a visited base station, a V-(R)AN, a V-AMF, etc.) may be shared by multiple VPLMNs. The visited network entity may partly support or may not support the roaming agreement with the HPLMN that allows simultaneously access to multiple VPLMNs, for example, due to various reasons (e.g., load control, limited resource, and/or other reasons). The visited network entity (or entities) may partly support or may not support the roaming agreement with the HPLMN, and the wireless device 2310 may fail to access multiple VPLMNs via the visited network entity (or entities). The wireless device 2310 may avoid and/or reduce such problems by adopting one or more schemes described herein (e.g., to indicate a request for accessing multiple VPLMNs for multiple network slices simultaneously. The visited base station may determine allowed VPLMNs information and/or information indicating network slice can be accessed simultaneously information, for example, based on status of the visited base station, subscribed VPLMNs information, and/or information indicating a network slice (e.g., a subscribed network slice) can be accessed simultaneously). The wireless device 2310 may determine whether or not to select multiple VPLMNs, and/or access to different network slices simultaneously, for example, based on the allowed VPLMNs information and/or information indicating a network slice can be accessed simultaneously. The failure to access the network and the wasteful signaling overhead may be reduced and/or avoided, based on the one or more schemes described herein.

The ASMM information and SMM subscription information described above (e.g., with respect to FIG. 23 or any other figures) may be analogous to ASMM information and SMM subscription information described below (e.g., comprise similar contents, data, messages, etc.).

Figure 24:
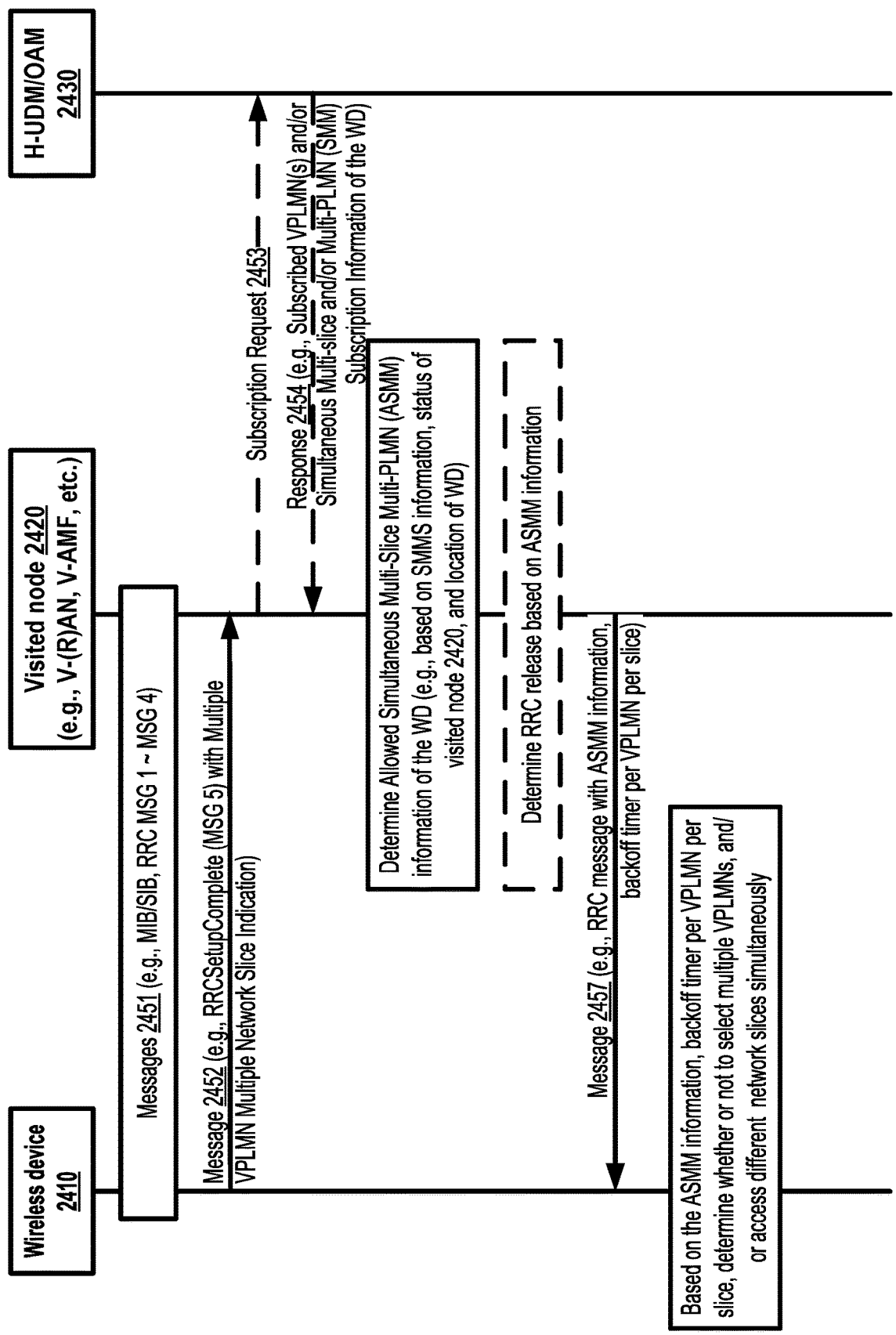
FIG. 24 shows an example visited node (e.g., VPLMN) selection procedure.

FIG. 24 shows an example visited node (e.g., VPLMN) selection procedure. A wireless device 2410 (e.g., a UE) may establish multiple RRC connections, for example, if the wireless device 2410 is capable of establishing multiple RRC connections (e.g., simultaneous Tx/Rx supports). Each of the RRC connection may be used for respective VPLMNs. A visited node 2420 (e.g., V-(R)AN, a base station, a V-AMF, etc.) may have multiple WD contexts (e.g., UE contexts) of the wireless device 2410. Each WD context may be associated with a particular RRC connection (and/or a particular respective VPLMN). The visited node 2420 (e.g., the base station) may associate one WD context to another WD context, for example, based on WD identities mapping information (e.g., multiple WD identities mapped to the same device identifier). The visited node 2420 (e.g., the base station) may not associate one WD context to another WD context (e.g., the base station may consider a single device to be different devices based on each WD context).

The visited node 2420 (e.g., the base station) may be connected to multiple AMFs and multiple SMFs (e.g., as shown in FIG. 15). Each of the multiple AMFs and each of the multiple SMFs may keep one WD context, and each of the multiple AMFs and each of the multiple SMFs may belong to a different VPLMN. The visited node 2420 (e.g., the base station) is connected to the same AMF (e.g., as shown in FIG. 16) The AMF may have all WD contexts (e.g., associated with the multiple SMFs and/or the multiple VPLMNs). Each of the WD contexts stored in the AMF may be for a different VPLMN. The AMF may connect to different SMFs for access to different VPLMNs.

The wireless device 2410 may establish a first RRC connection (e.g., exchanges messages, such as MIB, SIB, MSG 1 to MSG 4, etc.) with the visited node 2420 (e.g., the V-(R)AN) for a first VPLMN. The procedure of establishing the RRC connection may be similar to the procedures described herein (e.g., with respect to FIG. 17 and other figures). The wireless device 2410 may send/transmit a message 2452 (e.g., an MSG 5, RRCSetupComplete) to the visited node 2420 (e.g., the V-(R)AN). The message 2452 (e.g., MSG 5) may comprise at least one of: a WD identity, a device identifier of the wireless device 2410, WD location information, VPLMN 1 identifier, an S-NSSAI 1 associated with the VPLMN 1, and/or a multiple VPLMN multiple network slice indication. The multiple VPLMN multiple network slice indication may indicate a request for accessing multiple VPLMNs and multiple network slices simultaneously.

The visited node 2420 (e.g., the V-(R)AN) may obtain subscription information of the wireless device 2410, for example, after or in response to the message 2452. The visited node 2420 (e.g., the V(R)AN) may send/transmit a subscription request 2453 to a home unified data management (e.g., a H-UDM/operation-administration-management (OAM) 2430). The visited node 2420 (e.g., the V-(R) AN) may receive subscription information of the wireless device 2410 from a home unified data management (e.g., the H-UDM/OAM 2430). The signaling and received subscription information may be similar to signaling and received subscription information described above (e.g., with respect to FIG. 23 or any other figures).

The visited node 2420 (e.g., the V-(R)AN) may determine VPLMNs that the wireless device 2410 is allowed to access, for example, after or in response to the response 2454 received from the H-UDM. The visited node 2420 (e.g., the V-(R)AN) may determine ASMM information, for example, after or in response to the message received from the H-UDM. The determining may be based on at least one of: the message 2452 (e.g., the MSG 5 the multiple VPLMN multiple network slice indication); the WD location information; the subscribed VPLMNs information and/or SMM subscription information; the WD identity, the device identifier of the wireless device 2410; and/or status of the visited node 2420. The status of the visited node 2420 (e.g., the base station) may indicate an operating status (e.g., good, poor). The status of the visited node 2420 (e.g., the base station) may indicate a load condition of the visited node 2420 (e.g., light load, medium load, heavy load). The status of the visited node 2420 may indicate a resource condition of the visited node 2420 (e.g., 30% resource (or any other percentage of resource) is available). The status of the visited node 2420 may indicate an overload condition of the visited node 2420 (e.g., lightly overloaded, heavily overloaded, 110% overloaded, etc.).

The visited node 2420 (e.g., the V-(R)AN) may determine the allowed VPLMNs and/or ASMM information, for example, based on the subscribed VPLMNs information and/or SMM subscription information, and/or the status of the base station information (e.g., medium load, or any other load). The wireless device 2410 may be allowed to access VPLMN 1 for a network slice of a first service type (e.g., a network slice for URLLC), VPLMN 2 for a network slice for a second service type (e.g., an eMBB network slice), and/or any other type of network slice is allowed for any VPLMNs.

The visited node 2420 (e.g., the V-(R)AN) may determine the allowed VPLMNs and/or ASMM information, for example, based on the subscribed VPLMNs information and/or SMM subscription information, and/or the status of the visited node 2420 (e.g., lightly overloaded) The wireless device 2410 may be allowed to access VPLMN 1 for a network slice for a first service type (e.g., a network slice for URLLC) and VPLMN 2 for a network slice for a second service type (e.g., an mMTC network slice). A network slice for a third service type (e.g., a network slice eMBB) may not be allowed for the wireless device 2410 to access any of the VPLMNs.

The allowed VPLMNs information and/or ASMM information may comprise at least one of: an indication of simultaneous access to multiple network slices on different PLMNs; and/or a list of allowed PLMNs and associated network slices.

The ASMM information may indicate that the wireless device 2410 is allowed to access multiple network slices on different PLMNs simultaneously. The list of allowed PLMNs and associated network slices may comprise at least one of: at least one allowed PLMN (e.g., VPLMN); a priority of the at least one allowed PLMN; and/or a network slice associated with the at least one allowed PLMN. The at least one allowed PLMN may indicate the wireless device 2410 is allowed to access the at least one allowed PLMN. The priority of the at least one allowed PLMN may be used by the wireless device 2410 to select one or more of the at least one allowed PLMN, for example, based on each of the priority of the at least one allowed PLMN. The wireless device 2410 may select a PLMN with a higher priority. The network slice associated with the at least one allowed PLMN may indicate the network slice(s) supported by the at least one allowed PLMN. The at least one allowed PLMN may comprise VPLMN 1, VPLMN 2 and VPLMN 3 (and/or any other VPLMNs). The priority of the at least one allowed PLMN may indicate that the priority of VPLMN 1 is a first value (e.g., 1 (the highest)), the priority of VPLMN 2 is a second value (e.g., 2 (the second highest)), and/or the priority of VPLMN 3 is a third value (e.g., 3 (lowest)). The network slice associated with the at least one allowed PLMN may comprise at least one of: one or more network slices (e.g., a network slice for eMBB and/or a network slice for URLLC) associated with the VPLMN 1; one or more network slices (e.g., a network slice for mIoT) associated with VPLMN 2; and/or one or more network slices (e.g., a network slice for V2X) associated with VPLMN 3.

The indication of simultaneous access to multiple network slices on different PLMNs of the allowed VPLMNs and the information indicating network slices can be accessed simultaneously (e.g., determined by the visited node 2420) may be the same as (or may comprise) the indication of the simultaneous access to multiple network slices on different PLMNs of the subscribed VPLMNs and the indication that network slices can be accessed simultaneously (e.g., provided by the H-UDM/OAM 2430 to the visited node 2420). The indication of simultaneous access to multiple network slices on different PLMNs of the allowed VPLMNs and the information indicating network slices can be accessed simultaneously (e.g., determined by the visited node 2420) may be different from the indication of simultaneous access to multiple network slices on different PLMNs of the subscribed VPLMNs and the information indicating network slices can be accessed simultaneously (e.g., provided by the H-UDM/OAM 2430 to the visited node 2420).

The list of allowed PLMNs and associated network slices of the allowed VPLMNs and the information indicating network slices can be accessed simultaneously (e.g., determined by the visited node 2420) may be the same as (or may comprise) the list of allowed PLMNs and associated network slices of the subscribed VPLMNs and the information indicating network slices can be accessed simultaneously (e.g., provided by the H-UDM/OAM 2430 to the visited node 2420). The list of allowed PLMNs and associated network slices of the allowed VPLMNs and information indicating network slices can be accessed simultaneously (e.g., determined by the visited node 2420) may be different from the list of allowed PLMNs and associated network slices of the subscribed VPLMNs and the information indicating network slices can be accessed simultaneously (e.g., provided by the H-UDM/OAM 2430 to the visited node 2420).

The visited node 2420 (e.g., the V-(R)AN) may determine to release an RRC connection of the wireless device 2410 (e.g., one RRC connection of a plurality of RRC connections corresponding to different VPLMNs), for example, based on the determined allowed VPLMNs information and/or the ASMM information. The RRC connection may be released, for example, if it is associated with a network slice that is not associated with an allowed VPLMNs. The RRC connection may be released, for example, if another RRC connection is associated with an allowed VPLMN and the ASMM information indicates that simultaneous access is not allowed, permitted, and/or subscribed.

The visited node 2420 (e.g., the V-(R)AN) may send/transmit a message 2457 (e.g., a response message) to the wireless device 2410. The message 2457 may comprise at least one of: the allowed VPLMNs information, the ASMM information, and/or a backoff timer per VPLMN per network slice. The backoff timer per VPLMN per network slice may indicate, for example, a time that the wireless device 2410 can establish (or attempt to establish) a new RRC connection per VPLMN per network slice later. The message 2457 may be an RRC release message. The message 2457 may be an RRC reject message.

The wireless device 2410 may determine whether or not to select one or more VPLMNs, for example, based on the message 2457. The wireless device 2410 may determine whether or not to select one or more VPLMNs, for example, based on the allowed VPLMNs information and the ASMM information. The wireless device 2410 may determine whether to access one or more network slices via one or more VPLMNs simultaneously, for example, based on the allowed VPLMNs information and the ASMM information. The wireless device 2410 may start a timer, for example, based on the backoff timer per VPLMN per network slice. The wireless device 2410 may start/initiate a new RRC connection per VPLMN per network slice, for example, after the timer is expired.

Figure 25:
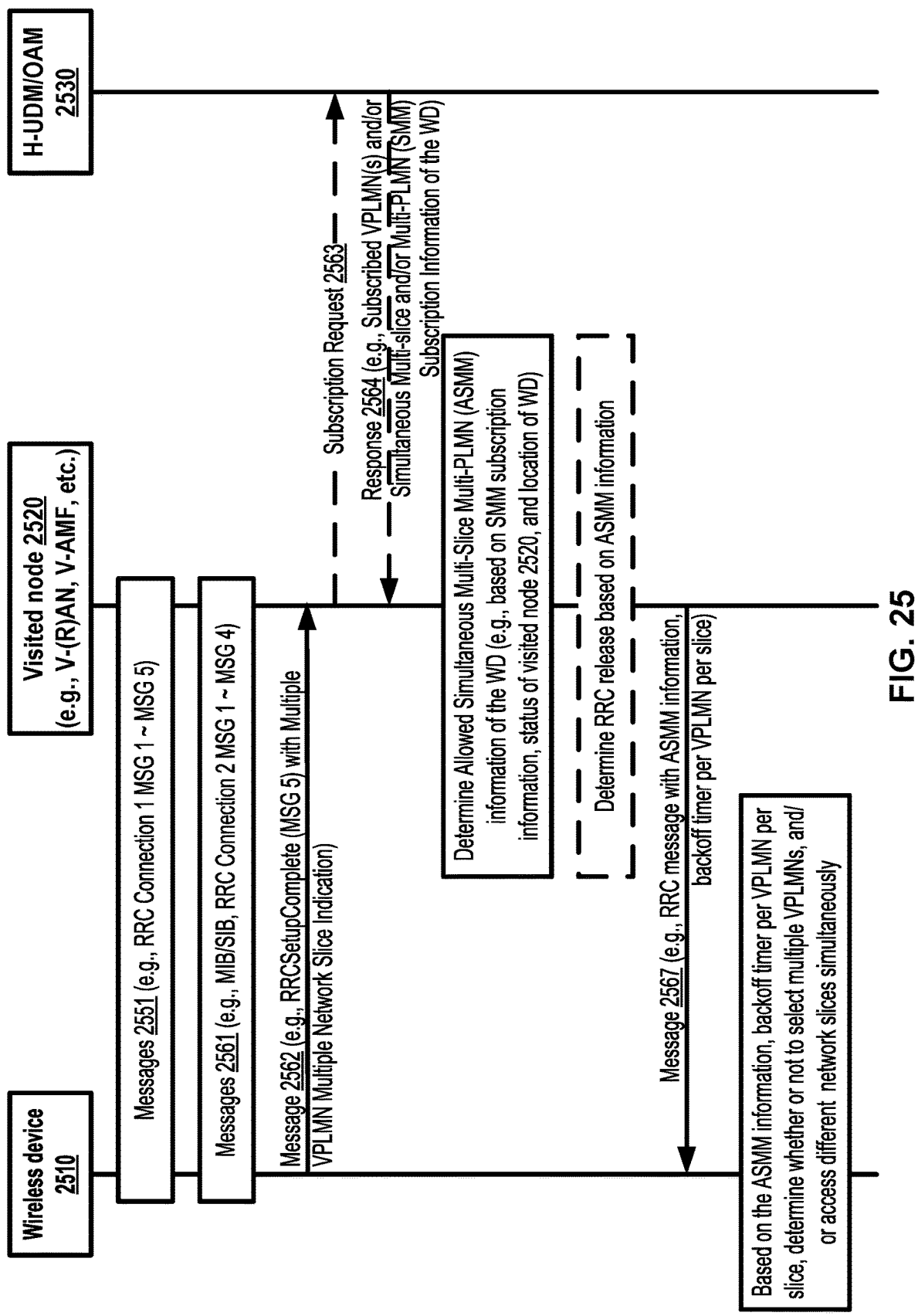
FIG. 25 shows an example visited node (e.g., VPLMN) selection procedure.

FIG. 25 shows an example visited node (e.g., VPLMN) selection procedure. In FIG. 25, a first RRC connection (e.g., RRC Connection 1) may be established by exchanging one or more messages 2551, for example, before exchanging one or more messages 2561 for establishing a second RRC connection (e.g., RRC Connection 2). Other operations described herein with respect to FIG. 25 may be similar to those described above with respect to FIG. 24.

A wireless device 2510 (e.g., a UE) may have established the first RRC connection with a visited node 2520 (e.g., a base station, a V-(R)AN). The first RRC connection may be used for a first VPLMN and/or a first network slice (e.g., S-NSSAI 1, a network slice of URLLC). The wireless device 2510 may establish the second RRC connection (e.g., by exchanging the one or more messages 2561, such as MSG 1 to MSG 4) with the visited node 2520 for a second VPLMN. The procedure of establishing the first RRC connection and/or the second RRC connection may be similar to the procedure described above with respect to FIG. 17. The wireless device 2510 may send/transmit a message 2562 (e.g., an MSG 5, RRCSetupComplete) to the visited node. The message 2562 (e.g., MSG 5) may comprise at least one of: a WD identity, a device identifier of the wireless device 2510, WD location information, VPLMN 2 identifier, a S-NSSAI 2 (e.g., a network slice of eMBB) associated with the VPLMN 2, WD identities mapping information, and/or a multiple VPLMN multiple network slice indication. The WD identities mapping information may comprise a plurality of WD identities mapped to a plurality of PLMNs and/or mapped to a same device identity. The multiple VPLMN multiple network slice indication may indicate a request for accessing multiple VPLMNs and multiple network slices simultaneously.

The visited node 2520 may obtain subscription information of the wireless device 2510, for example, after or in response to receiving the one or more messages 2561 and/or the message 2562. The visited node 2520 (e.g., the V(R)AN) may send/transmit a subscription request 2563 to a H-UDM (e.g., H-UDM/OAM 2530). The visited node 2520 (e.g., the V-(R)AN) may receive subscription information of the wireless device 2510 from the H-UDM. The signaling and received subscription information may be similar to signaling and received subscription information described above with respect to FIG. 24.

The visited node 2520 (e.g., the V-(R)AN) may determine VPLMNs that the wireless device 2510 is allowed to access, for example, after or in response to receiving the response 2564. The visited node 2520 (e.g., the V-(R)AN) may determine the ASMM information, for example, after or in response to receiving the response 2564. The determining may be based on at least one of: the message 2562 (e.g., MSG 5, the multiple VPLMN multiple network slice indication), the WD location information; the subscribed VPLMNs information and/or SMM subscription information; the WD identity; the device identifier of the wireless device 2510; the WD identities mapping information; and/or status of the visited node 2520. The status of the visited node 2520 may indicate an operating status (e.g., good, poor). The status of the visited node 2520 may indicate a load condition of the visited node 2520 (e.g., light load, medium load, heavy load). The status of the visited node 2520 may indicate a resource condition of the visited node 2520 (e.g., 30% resource is available or any other percentage of resource is available). The status of the visited node 2520 may indicate an overload condition of the visited node 2520 (e.g., lightly overloaded, 110% overloaded).

The visited node 2520 may determine the allowed VPLMNs information and/or the ASMM information, for example, based on the subscribed VPLMNs and/or SMM subscription information, and/or the status of the visited node 2520 (e.g., medium load). The wireless device 2510 may be allowed to access VPLMN 1 for a network slice (e.g., for URLLC), VPLMN 2 for a network slice (e.g., for eMBB), and/or any type of network slice allowed for any VPLMNs.

The visited node 2520 may determine the allowed VPLMNs information and/or the ASMM information, based on the subscribed VPLMNs and/or SMM subscription information, and/or the status of the visited node 2520 (e.g., lightly overloaded). The wireless device 2510 may be allowed to access VPLMN 1 for a network slice (e.g., for URLLC) and VPLMN 2 for a network slice (e.g., for mMTC). A network slice (e.g., for eMBB) may not be allowed for any VPLMNs.

The indication of simultaneous access to multiple network slices on different PLMNs may indicate that the wireless device is allowed to access to multiple network slices on different PLMNs simultaneously. The list of allowed PLMNs and associated network slices may comprise at least one of: at least one allowed PLMN (e.g., VPLMN); a priority of the at least one allowed PLMN; and/or a network slice associated with the at least one allowed PLMN.

The visited node 2520 may determine to keep the first RRC connection, but release the second RRC connection, for example, based on the determined allowed VPLMNs information and/or the ASMM information. The determined allowed VPLMNs information and information indicating network slices can be accessed simultaneously may not comprise network slice S-NSSAI 2 (e.g., a network slice of eMBB), so that the visited node 2520 may release the second RRC connection.

The visited node 2520 (e.g., the V-(R)AN) may send/transmit a message 2567 (e.g., a response message) to the wireless device 2510. The message 2567 may comprise at least one of: the allowed VPLMNs information and/or the ASMM information, and/or a backoff timer per VPLMN per network slice (e.g., a backoff timer for VPLMN 2 for a network slice of mMTC). The backoff timer per VPLMN per network slice may indicate, for example, a time that the wireless device 2510 can establish a new RRC connection per VPLMN per network slice later. The message 2567 may be an RRC release message. The message 2567 may be an RRC reject message.

The wireless device 2510 may determine whether or not to select one or more VPLMNs, for example, based on the message 2567. The wireless device 2510 may determine whether or not to select one or more VPLMNs, for example, based on the allowed VPLMNs information and/or the ASMM information. The wireless device 2510 may determine whether to access one or more network slices via one or more VPLMNs simultaneously, for example, based on the allowed VPLMNs information and/or the ASMM information. The wireless device 2510 may start a timer, for example, based on the backoff timer per VPLMN per network slice. The wireless device 2510 may start/initiate a new RRC connection per VPLMN per network slice, for example, after the timer is expired.

A visited node (e.g., a visited base station and/or a visited AMF) may be shared by multiple VPLMNs. The visited node may at least partly support or may not support the roaming agreement with the HPLMN that allows simultaneous access to multiple VPLMNs (e.g., due to load control, limited resource, and/or other reasons), which may cause the wireless device 2510 to fail to access multiple VPLMNs via the visited node. The wireless device may indicate a request for accessing multiple VPLMNs for multiple network slices simultaneously, the visited AMF may determine allowed VPLMNs information and information indicating a network slice can be accessed simultaneously, for example, to address these problems. The wireless device may indicate a request for accessing multiple VPLMNs for multiple network slices simultaneously, the visited AMF may determine allowed VPLMNs information and information indicating a network slice can be accessed simultaneously, for example, based on a status of the visited node and/or VPLMNs and information indicating a network slice can be accessed simultaneously. The wireless device may determine whether or not to select multiple VPLMNs, and/or access different network slices simultaneously, for example, based on the allowed VPLMNs information and information indicating a network slice can be accessed simultaneously. The enhanced mechanism may prevent the wireless device from failing to access the network and may reduce the signaling overhead.

Figure 26:
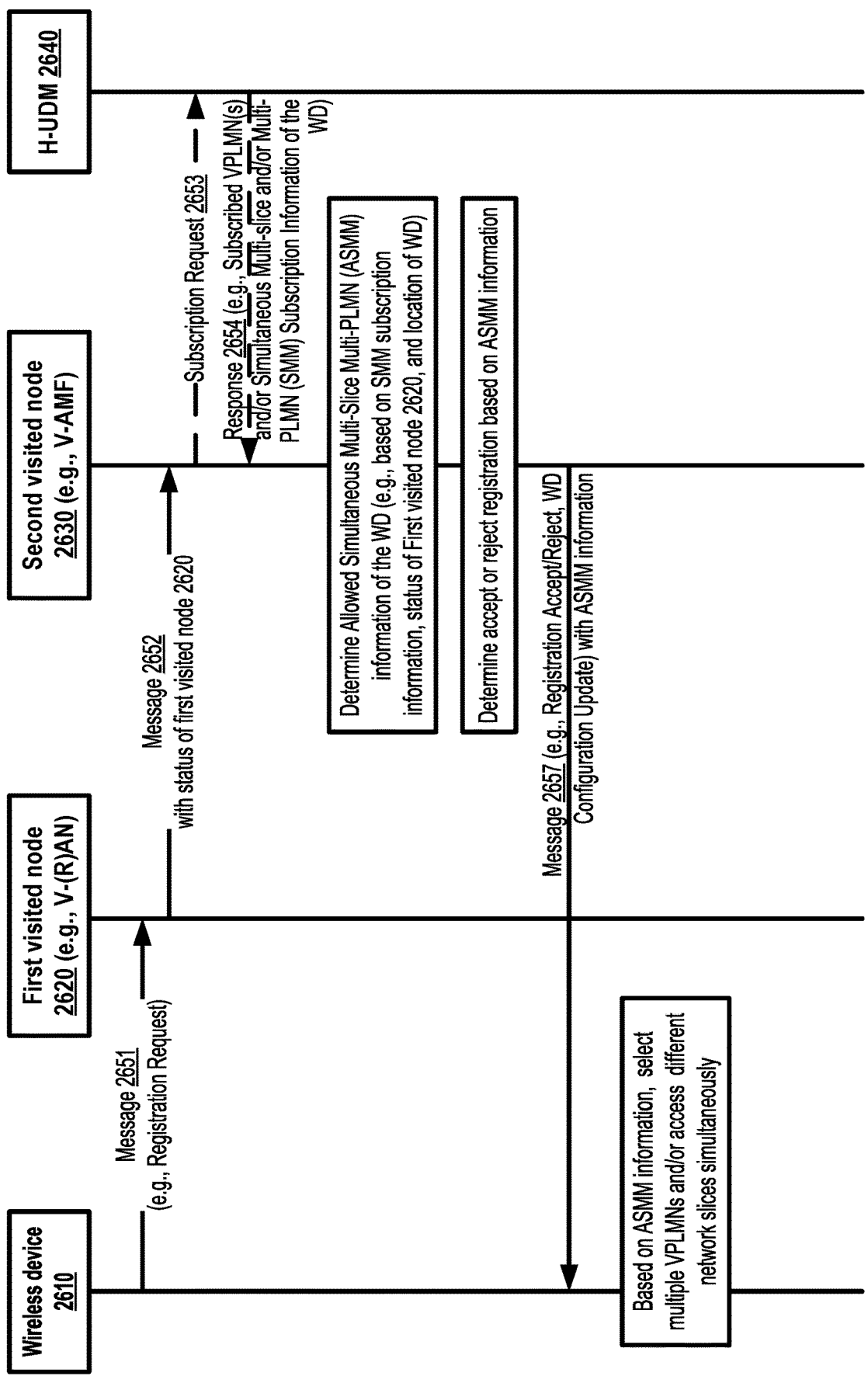
FIG. 26 shows an example registration procedure for visited node (e.g., VPLMN) access.

FIG. 26 show an example registration procedure for visited node access (e.g., VPLMN access). The wireless device 2610 (e.g., a UE) may establish multiple RRC connections (e.g., with a visited network, such as a first visited node 2620, a second visited node 2630), for example, if the wireless device 2610 is capable of multiple RRC connections (e.g., simultaneous Tx/Rx supports). Each of the RRC connections may be used for each of the VPLMNs (e.g., available VPLMNs associated with the visited network). The first visited node 2620 (e.g., the visited base station, V-(R)AN) may be connected to the second visited node 2630 (e.g., a V-AMF). The second visited node 2630 may comprise the same V-AMF shared by a plurality of VPLMNs (e.g., AMF 1621 shown in FIG. 16). The V-AMF may store/have all WD contexts of the wireless device 2610. Each WD context of the WD contexts may be for a different VPLMN of the plurality of VPLMNs. The V-AMF may connect to different SMFs for different VPLMNs (e.g., a first SMF is associated with a first VPLMN, a second SMF is associated with a second VPLMN, etc.).

The wireless device 2610 may send/transmit a message 2651 (e.g., a NAS request message, a registration request) to the second visited node 2630 (e.g., a V-AMF) via the first visited node 2620 (e.g., a V-(R)AN). The message 2651 may comprise at least one of: a WD identity, a device identifier of the wireless device 2610, WD location information, VPLMN 1 identifier, a S-NSSAI 1 associated with the VPLMN 1, and/or a multiple VPLMN multiple network slice indication. The message 2651 may comprise WD identities mapping information. The WD identities mapping information may comprise a plurality of WD identities mapped to a plurality of PLMNs and/or mapped to a same device identity. The multiple VPLMN multiple network slice indication may indicate a request for accessing multiple VPLMNs and multiple network slices simultaneously. The message 2651 may comprise at least one of: a registration type, SUCI or SUPI or 5G-GUTI, a last visited TAI (if available), security parameters, requested NSSAI, mapping of requested NSSAI, a core network capability (e.g., WD 100 5GC capability, UE 100 5GC capability), a PDU session status, PDU session(s) to be re-activated, a follow on request, a MICO mode preference, and/or the like.

The first visited node 2620 (e.g., the V-(R)AN) may send/transmit a message 2652 (e.g., an N2 message) to the second visited node 2630 (e.g., the V-AMF). The message 2652 may comprise the message 2651 (e.g., the NAS request message, the registration request). The message 2652 may comprise a status of the first visited node 2620. The status of the base station information may indicate an operating status (e.g., good, poor). The status of the first visited node 2620 may indicate a load condition of the first visited node 2620 (e.g., light load, medium load, heavy load). The status of the first visited node 2620 may indicate a resource condition of the first visited node 2620 (e.g., 30% resource is available or any other percentage of resource is available). The status of the first visited node 2620 may indicate an overload condition of the first visited node 2620 (e.g., lightly overloaded, 110% overloaded).

The NAS request message (e.g., comprised in the message 2652) may be a first NAS request message. The first NAS request message may be used by the wireless device 2610 to register to a first VPLMN. The wireless device 2610 may have already registered in a first VPLMN, and the wireless device 2610 may send/transmit a second NAS request message to the second visited node 2630 (e.g., the V-AMF). The second NAS request message may be used by the wireless device 2610 to register to a second VPLMN.

The first visited node 2620 (e.g., V-AMF) may send/transmit a message 2653 (e.g., a subscription request) to an H-UDM 2640 (e.g., (H-UDM)/OAM), for example, after or in response to the received message 2652. The subscription request message may comprise at least one of: WD location information, the WD identity and/or the device identifier of the wireless device 2610. The first visited node 2620 (e.g., the V-(R)AN) may receive a response 2654 (e.g., a response message, a subscription response), for example, from the H-UDM 2640. The response 2654 may comprise subscribed VPLMNs information and/or SMM subscription information for the wireless device 2610. The SMM subscription information is analogous to the SMM subscription information described above. The response 2654 may comprise WD identities mapping information.

The second visited node 2630 (e.g., the V-AMF) may determine VPLMNs that the wireless device 2610 is allowed to access, for example, after or in response to receiving the message 2654. The second visited node 2630 (e.g., V-AMF) and/or the first visited node 2620 (e.g., the V-(R)AN) may determine ASMM information, for example, after or in response to receiving the message 2654. The determining may be, for example, based on at least one of: the NAS message (e.g., the multiple VPLMN multiple network slice indication), the WD location information; the subscribed VPLMNs information and/or SMM subscription information; the WD identity, the device identifier of the wireless device 2610, and/or a status of the visited node(s) 2620 and/or 2630 (e.g., the V-(R)AN and/or the V-AMF). The status of the visited node(s) 2620 and/or 2630 may indicate an operating status (e.g., good, poor). The status of the visited node(s) 2620 and/or 2630 may indicate a load condition of the visited node(s) 2620 and/or 2630 (e.g., light load, medium load, heavy load). The status of the visited node(s) 2620 and/or 2630 may indicate a resource condition of the visited node(s) 2620 and/or 2630 (e.g., 30% resource is available or any other percentage of resource is available). The status of the visited node(s) 2620 and/or 2630 may indicate an overload condition of the visited node(s) 2620 and/or 2630 (e.g., lightly overloaded, 110% overloaded).

The visited node(s) 2620 and/or 2630 may determine the allowed VPLMNs information and/or the ASMM information, for example, based on the subscribed VPLMNs information, the SMM subscription information and/or the status of the visited node(s) 2620 and/or 2630 (e.g., medium load). The wireless device 2610 may be allowed to access VPLMN 1 for a network slice (e.g., for URLLC), VPLMN 2 for a network slice (e.g., for eMBB), and/or any type of network slice allowed for any of the allowed VPLMNs.

The visited node(s) 2620 and/or 2630 may determine the allowed VPLMNs information and information indicating that network slices can be accessed simultaneously, for example, based on the subscribed VPLMNs information and/or SMM subscription information, and/or the status of the visited node(s) 2620 and/or 2630 (e.g., lightly overloaded). The wireless device 2610 may be allowed to access VPLMN 1 for a network slice (e.g., for URLLC) and VPLMN 2 for a network slice (e.g., for mMTC). A network slice of/with a first type (e.g., a slice/service type, such as eMBB) may not be allowed for the wireless device 2610 to access any of the VPLMNs.

The ASMM information may indicate that the wireless device 2610 is allowed to access multiple network slices on different PLMNs simultaneously. The list of allowed PLMNs and associated network slices may comprise at least one of: at least one allowed PLMN (e.g., VPLMN); a priority of the at least one allowed PLMN; and/or a network slice associated with the at least one allowed PLMN. The at least one allowed PLMN may indicate the wireless device 2610 is allowed to access the at least one allowed PLMN. The priority of the at least one allowed PLMN may be used by the wireless device 2610 to select one or more of the at least one allowed PLMN, for example, based on each of the priority of the at least one allowed PLMN. The wireless device 2610 may select a PLMN with a higher priority. The network slice associated with the at least one allowed PLMN may indicate the network slice(s) supported by the at least one allowed PLMN. The at least one allowed PLMN may comprise VPLMN 1, VPLMN 2 and VPLMN 3. The priority of the at least one allowed PLMN may indicate that the priority of VPLMN 1 is a first value (e.g., 1 (the highest)), the priority of VPLMN 2 is a second value (e.g., 2 (the second highest), and/or the priority of VPLMN 3 is a third value (e.g., 3 (lowest)). The network slice associated with the at least one allowed PLMN may comprise at least one of: a network slice of a first type (e.g., eMBB) and/or a network slice of a second type (e.g., URLLC) associated with the VPLMN 1; a network slice of a third type (e.g., mIoT) associated with VPLMN 2; and/or a network slice of a fourth type (e.g., V2X) associated with VPLMN 3.

The indication of simultaneous access to multiple network slices on different PLMNs of the allowed VPLMNs and the information indicating network slices can be accessed simultaneously (e.g., determined by the second visited node 2630) may be the same as the indication of simultaneous access to multiple network slices on different PLMNs of the subscribed VPLMNs and the information indicating network slices can be accessed simultaneously (e.g., provided by the H-UDM 2640 to the second visited node 2630). The indication of simultaneous access to multiple network slices on different PLMNs of the allowed VPLMNs and the information indicating network slices can be accessed simultaneously (e.g., determined by the second visited node 2630) may be different from the indication of simultaneous access to multiple network slices on different PLMNs of the subscribed VPLMNs and the information indicating network slices can be accessed simultaneously (e.g., provided by the H-UDM 2640 to the second visited node 2630).

The list of allowed PLMNs and associated network slices of the allowed VPLMNs and the information indicating network slices can be accessed simultaneously (e.g., determined by the second visited node 2630) may be the same as the list of allowed PLMNs and associated network slices of the subscribed VPLMNs and the information indicating network slices can be accessed simultaneously (e.g., provided by the H-UDM 2640 to the second visited node 2630). The list of allowed PLMNs and associated network slices of the allowed VPLMNs and the information indicating network slices can be accessed simultaneously (e.g., determined by the second visited node 2630) may be different from the list of allowed PLMNs and associated network slices of the subscribed VPLMNs and the information indicating network slices can be accessed simultaneously (e.g., provided by the H-UDM 2640 to the second visited node 2630).

The visited node(s) 2620 and/or 2630 may determine to accept the registration request, for example, based on the determined allowed VPLMNs and/or the ASMM information. The visited node(s) 2620 and/or 2630 may determine to accept the registration request, for example, if the ASMM information comprises the network slice (e.g., S-NSSAI 1) of the registration request message.

The visited node(s) 2620 and/or 2630 may determine to reject the registration request, for example, based on the determined allowed VPLMNs and/or the ASMM information. The visited node(s) 2620 and/or 2630 may determine to reject the registration request, for example, if the allowed VPLMNs information and the ASMM information do not comprise the network slice (e.g., S-NSSAI 1) of the registration request message.

The visited node(s) 2620 and/or 2630 may send/transmit a message 2657 (e.g., a NAS message, a registration response, a WD configuration update) to the wireless device 2610. The message 2657 may comprise at least one of: the allowed VPLMNs information and the ASMM information, and/or a backoff timer per VPLMN per network slice. The backoff timer per VPLMN per network slice may indicate, for example, a time that the wireless device 2610 can register (or reattempt to register) to the network per VPLMN per network slice later. The message 2567 (e.g., the registration response message) may comprise a registration accept message. The message 2567 (e.g., the registration response message) may comprise a registration reject message. The message 2567 (e.g., the registration response message and/or the registration reject message) may comprise a cause value indicating the requested VPLMNs that may not be accessed simultaneously and/or indicating network slices that may not be accessed simultaneously. The cause value may indicate the requested VPLMNs, and the network slices may not be accessed simultaneously, for example, if the visited network (e.g., the first visited node 2620, the second visited node 2630) is overloaded. The cause value may indicate the visited network (e.g., the first visited node 2620, the second visited node 2630) may not support accessing the requested VPLMNs and network slices simultaneously.

The wireless device 2610 may determine whether or not to select one or more VPLMNs, for example, based on the message 2657 (e.g., the NAS message). The wireless device 2610 may determine whether or not to select one or more VPLMNs, for example, based on the allowed VPLMNs information and the ASMM information. The wireless device 2610 may determine whether to access one or more network slices via one or more VPLMNs simultaneously, for example, based on the allowed VPLMNs information and the ASMM information. The wireless device 2610 may start a timer, for example, based on the backoff timer (e.g., the backoff timer per VPLMN per network slice). The wireless device 2610 may start/initiate a new RRC connection per VPLMN per network slice, for example, after the timer is expired.

In at least some wireless communications, an HPLMN may determine that a wireless device may simultaneously access multiple VPLMNs without considering the status of the visited network (e.g., the visited PLMN, the V-(R)AN, the V-AMF, etc.). If the status of the visited network is not suitable and/or not capable of providing simultaneous access to multiple VPLMNs, it may cause the wireless device 2610 to fail to access the multiple VPLMNs simultaneously. The visited network may indicate a VPLMN capability of simultaneous multi-slice multi-PLMN support to the home network (e.g., an HPLMN, an H-UDM, etc.), for example, to reduce and/or avoid the failure of the simultaneous VPLMN access by the wireless device 2610. The home network may determine allowed VPLMNs and ASMM information and may send the allowed VPLMNs and ASMM information to the wireless device via the VPLMN. Network access failure and/or signaling overhead may be reduced and/or avoided, for example, based on the information (e.g., the indication of the VPLMN capability) and/or the home network's access decision.

Figure 27:
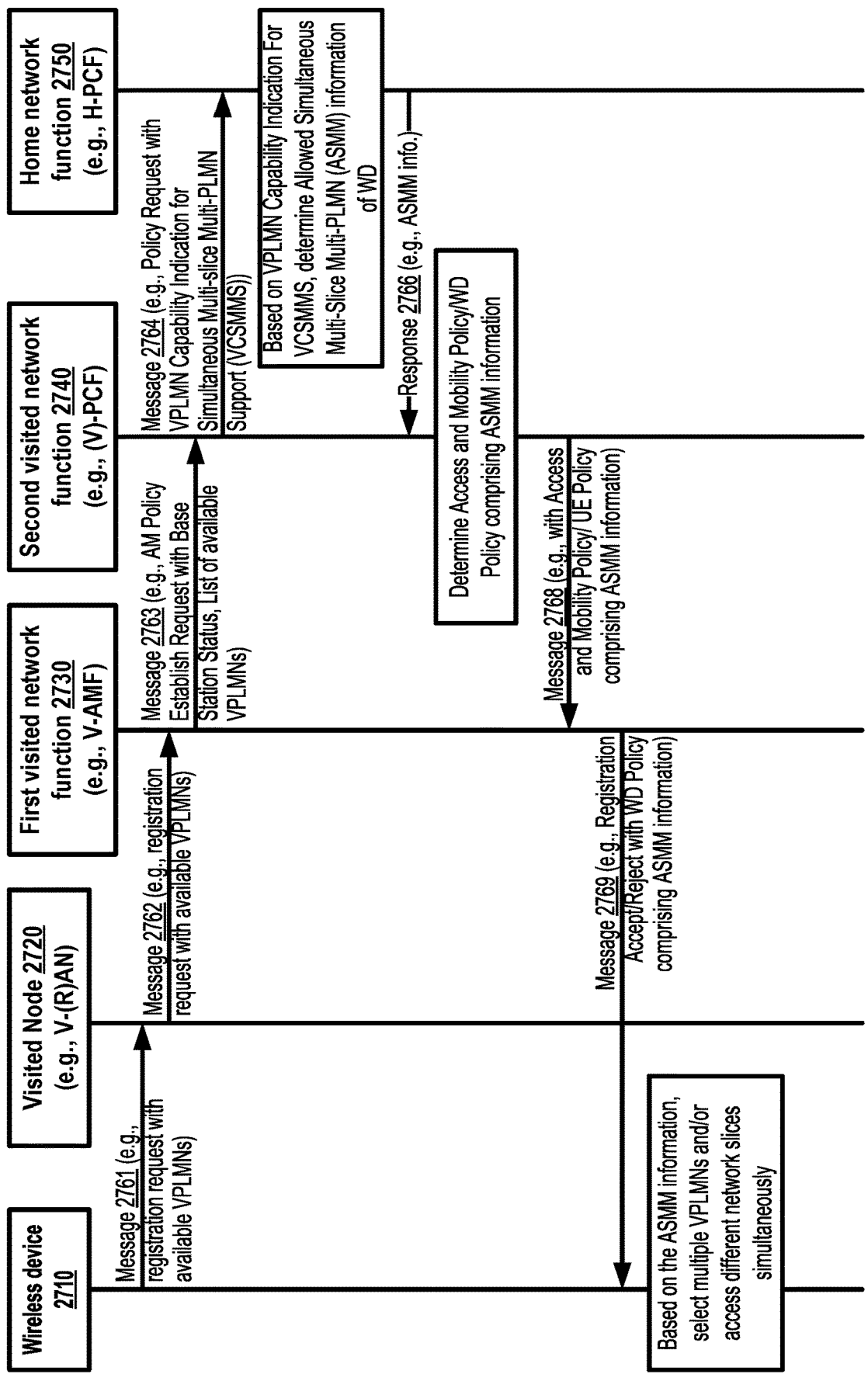
FIG. 27 shows an example visited node (e.g., VPLMN) selection procedure.

FIG. 27 shows an example visited node (e.g., VPLMN) selection procedure. A wireless device 2710 may perform communication with a visited network, for example, before selecting a plurality of VPLMNs for accessing a plurality of network slices. The wireless device 2710 may send/transmit a message 2761 (e.g., a registration request), which may comprise an indication of available PLMNs). The wireless device 2710 may send the message 2761 to a visited node 2720 (e.g., a V-(R)AN). The visited node 2720 may send/transmit a message 2762 (e.g., forward the message 2761, the registration request comprising the indication of the available PLMNs), for example, to a first visited network function 2730 (e.g., a V-AMF). The first visited network function 2730 may send/transmit a message 2763 (e.g., a request for establishing an access and mobility management (AM) policy, an AM policy establish request), for example, to a second visited network function 2740 (e.g., a V-PCF). The message 2763 may comprise a status of the visited node 2720 and/or a status of the first visited network function 2730. The message 2763 may comprise a list of available VPLMNs (e.g., available VPLMNs identified by the wireless device 2710). The second network function 2740 may send/transmit a message 2764 (e.g., a policy request). The second network function 2740 may send/transmit the message 2764 to a home network function 2750 (e.g., a home PCF (H-PCF)) of an HPLMN. The message 2764 may comprise an indication of VPLMN capability for simultaneous multi-slice multi-PLMN support (VCSMMS). The indication of VCSMMS may indicate whether the visited network (e.g., the visited node 2720, the first visited network function 2730, the second visited network function 2740, etc.) is capable (or incapable) of supporting simultaneous multi-slice multi-PLMN access for the wireless device 2710. The home network function 2750 (e.g., the H-PCF) may receive the message 2764 from the second visited network function 2740. The message 2764 may comprise a first parameter (e.g., the indication of VCSMMS) indicating VPLMN capability of simultaneous multi-slice multi-PLMN support. The messages 2761, 2762, and 2763 may be further processed (e.g., scrambling, descrambling, encrypting, decrypting, encoding, decoding, parsing, etc.) before sent/transmitted to the next node, function or any other network entity (e.g., the visited node 2720 may further process the received message 2761 before sending it to the first visited network function 2730).

The home network function 2750 may be a home PCF of an HPLMN for the wireless device 2710. The second visited network function 2740 may be a V-PCF of a VPLMN. The first parameter may comprise at least one of: a second parameter indicating at least one VPLMN that supports simultaneous access to the plurality of VPLMNs for the plurality of different network slices; at least one available VPLMN; a priority of the at least one available VPLMN; or at least one network slice associated with the at least one available VPLMN.

The second parameter may indicate at least one VPLMN supporting simultaneous access to the plurality of VPLMNs for the plurality of different network slices. The second parameter may indicate at least one of: V-(R)AN and/or V-AMF supporting simultaneous access to the plurality of VPLMNs for the plurality of different network slices. The at least one available VPLMN may indicate one or more available VPLMNs. The priority of the at least one available VPLMN may indicate a priority level of the at least one available VPLMN. The wireless device 2710 may select the VPLMN, for example, based on the priority level of the at least one available VPLMN. The at least one network slice associated with the at least one available VPLMN may indicate one or more network slices supported by the one or more VPLMNs.

The wireless device 2710 may register to a VPLMN, for example, in a roaming scenario. The wireless device 2710 may be a user device subscribed for a service of a network operator of an HPLMN. The wireless device 2710 may be located in a foreign country where one or more VPLMNs provide services based on a roaming agreement, for example, in the roaming scenario. The wireless device 2710 may send/transmit the message 2761 (e.g., a registration request message) to the first visited network function 2730 (e.g., to a V-AMF), for example, via the visited node 2720 (e.g., via a V-(R)AN). The registration request message may comprise at least one of: a WD identity, a device identifier of the wireless device 2710, WD location information, a VPLMN identifier, a S-NSSAI associated with the VPLMN, a list of available VPLMNs, and/or a multiple VPLMN multiple network slice indication. The registration request message may comprise WD identities mapping information. The WD identities mapping information may comprise a plurality of WD identities mapped to a plurality of PLMNs and/or mapped to a same device identity. The multiple VPLMN multiple network slice indication may indicate a request for accessing multiple VPLMNs and multiple network slices simultaneously. The registration request message may comprise at least one of: a registration type, SUCI or SUPI or 5G-GUTI, a last visited TAI (if available), security parameters, requested NSSAI, mapping of requested NSSAI, WD 100 5GC capability, a PDU session status, PDU session(s) to be re-activated, a follow on request, a MICO mode preference, and/or the like.

The visited node 2720 (e.g., the V-(R)AN) may send/transmit the message 2762 (e.g., an N2 message, the registration request message) to the first visited network function 2730 (e.g., the V-AMF). The N2 message may comprise the NAS request message. The N2 message may comprise a status of the visited node 2720. The status of the visited node 2720 may indicate an operating status (e.g., good, poor). The status of the visited node 2720 may indicate a load condition of the visited node 2720 (e.g., light load, medium load, heavy load). The status of the visited node 2720 may indicate a resource condition of the visited node 2720 (e.g., 30% resource is available or any other percentage of resource is available). The status of the visited node 2720 may indicate an overload condition of the visited node 2720 (e.g., lightly overloaded, 110% overloaded).

The first visited network function 2730 (e.g., the V-AMF) may send/transmit the message 2763 (e.g., the request for establishing an AM policy, 'AM policy establish request') to the second visited network function 2740 (e.g., the V-PCF), for example, after or in response to receiving the message 2762. The AM policy establish request message may comprise one or more parameters of the registration request message. The AM policy establish request may comprise at least one of: the WD identity, the device identifier of the wireless device 2710, the WD location information, the VPLMN identifier, the S-NSSAI associated with the VPLMN, the list of available VPLMNs, the multiple VPLMN multiple network slice indication, and/or the status of the visited node 2720 and/or the first visited network function 2730.

The AM policy establish request message may comprise at least one of: SUPI, an internal group (e.g., Internal Group of an AM policy establish request), a subscription notification indication and, if available, service area restrictions, a RAT/frequency selection priority (RFSP) index, subscribed WD-aggregated maximum bit rate (AMBR) (e.g., Subscribed UE-AMBR), the allowed NSSAI, generic public subscription identifier (GPSI) (which are retrieved from the UDM during the update location procedure), Access Type and RAT Type, PEI, WD time zone, and/or a serving network (PLMN ID, or PLMN ID and NID).

The second visited network function 2740 (e.g., the V-PCF) may determine the VPLMN capability of simultaneous multi-slice multi-PLMN support, for example, after or in response to receiving the message 2763. The second visited network function 2740 (e.g., the V-PCF) may determine the VPLMN capability of simultaneous multi-slice multi-PLMN support, for example, based on the AM policy establish request message. The second visited network function 2740 (e.g., the V-PCF) may determine the VPLMN capability of simultaneous multi-slice multi-PLMN support, for example, based on the list of available VPLMNs, the multiple VPLMN multiple network slice indication, and/or the status of the visited network (e.g., the visited node 2720, the first visited network function 2730, and/or the second visited network function 2740).

The second visited network function 2740 (e.g., the V-PCF) may determine the VPLMN capability of simultaneous multi-slice multi-PLMN support, for example, based on the list of available VPLMNs, the multiple VPLMN multiple network slice indication, and/or the status of the visited network (e.g., the visited node 2720, the first visited network function 2730, and/or the second visited network function 2740) (e.g., medium load). The wireless device 2710 may be allowed to access VPLMN 1 for a network slice of a first type (e.g., URLLC), VPLMN 2 for a network slice of a second type (e.g., eMBB), and/or any type of network slice allowed for any of the VPLMNs, for example, based on the VPLMN capability of simultaneous multi-slice multi-PLMN support.

The second visited network function 2740 (e.g., the V-PCF) may determine the VPLMN capability of simultaneous multi-slice multi-PLMN support, for example, based on the list of available VPLMNs, the multiple VPLMN multiple network slice indication, and/or the status of the visited network (e.g., the visited node 2720, the first visited network function 2730, and/or the second visited network function 2740) (e.g., lightly overloaded). The wireless device 2710 may be allowed to access VPLMN 1 for a network slice of a first type (e.g., URLLC) and VPLMN 2 for a network slice of a second type (e.g., mMTC). A network slice of a third type (e.g., eMBB may not be allowed for any of the VPLMNs.

The second visited network function 2740 (e.g., the V-PCF) may send/transmit a message 2764 (e.g., a policy request) to the home network function 2750 (e.g., the H-PCF). The policy request message may comprise one or more parameter of the AM policy establish request message. The policy request message may comprise at least one of: the VPLMN capability of simultaneous multi-slice multi-PLMN support (e.g., the VCSMMS described above), the WD identity, the device identifier of the wireless device 2710, the WD location information, the VPLMN identifier, the S-NSSAI associated with the VPLMN, the list of available VPLMNs, the multiple VPLMN multiple network slice indication, and/or the status of the visited network (e.g., the visited node 2720, the first visited network function 2730, and/or the second visited network function 2740).

The home network function 2750 (e.g., the H-PCF) may take one or more actions, for example, after or in response to receiving the message 2764. The home network function 2750 (e.g., the H-PCF) may have configured with WD subscription information. The home network function 2750 (e.g., the H-PCF) may query WD subscription information (e.g., from a UDM, such as a home UDM). The home network function 2750 (e.g., the H-PCF) may receive the WD subscription information (e.g., from the UDM). The WD subscription information may comprise information for the wireless device 2710 (e.g., subscribed VPLMNs information and information indicating network slices can be accessed simultaneously). The subscription information may comprise WD identities mapping information.

The subscribed VPLMNs and SMM subscription information may comprise at least one of: an indication of a simultaneous access to multiple network slices on different PLMNs; a list of allowed PLMNs and associated network slices; and/or a list of forbidden PLMN(s) and associated network slices. The subscribed VPLMNs and/or ASMM information may comprise WD identities mapping information. The SMM subscription information may be similar to the SMM subscription information described above.

The home network function 2750 (e.g., the H-PCF) may determine allowed VPLMNs and ASMM information, for example, based on the policy request message and/or WD subscription information. The ASMM information may be similar to the SMM subscription information described above. The home network function 2750 (e.g., the H-PCF) may determine allowed VPLMNs and ASMM information, for example, based on the subscribed VPLMNs and SMM subscription information, the VPLMN capability of simultaneous multi-slice multi-PLMN support, the UE identity, the device identifier of the UE, the UE location information, the VPLMN identifier, the S-NSSAI associated with the VPLMN, the list of available VPLMNs, the multiple VPLMN multiple network slice indication, and/or the status of the base station information. The allowed VPLMNs and ASMM information may comprise at least one of: an indication of a simultaneous access to multiple network slices on different PLMNs; and/or a list of allowed PLMNs and associated network slices.

The home network function 2750 (e.g., the H-PCF) may determine allowed VPLMNs and ASMM information, for example, based on the subscribed VPLMNs and ASMM information, the VPLMN capability of simultaneous multi-slice multi-PLMN support, the list of available VPLMNs, the multiple VPLMN multiple network slice indication, the WD identities mapping information, and/or the status of the visited network (e.g., the visited node 2720, the first visited network function 2730, and/or the second visited network function 2740) (e.g., medium load). The wireless device 2710 may be allowed to access VPLMN 1 for a network slice of a first type (e.g., URLLC), VPLMN 2 for a network slice of a second type (e.g., eMBB), and/or any type of network slice(s) allowed for any of the VPLMNs, for example, based on the allowed VPLMNs and ASMM information.

The home network function 2750 (e.g., the H-PCF) may determine the allowed VPLMNs and ASMM information, for example, based on the subscribed VPLMNs and SMM subscription information, the VPLMN capability of simultaneous multi-slice multi-PLMN support, the list of available VPLMNs, the multiple VPLMN multiple network slice indication, the WD identities mapping information, and/or the status of the visited network (e.g., the visited node 2720, the first visited network function 2730, and/or the second visited network function 2740) (e.g., lightly overloaded). The wireless device 2710 may be allowed to access VPLMN 1 for a network slice of a first type (e.g., URLLC) and VPLMN 2 for a network slice of a second type (e.g., mMTC), for example, based on the allowed VPLMNs and ASMM information. A network slice of a third type (e.g., eMBB) may not be allowed for any of the VPLMNs.

The home network function 2750 (e.g., the H-PCF) may send/transmit a response 2766 (e.g., a response message, a policy response) to the second visited network function 2740 (e.g., the V-PCF). The policy response message may comprise the allowed VPLMNs and ASMM information and/or the WD identities mapping information.

The second visited network function 2740 (e.g., the V-PCF) may determine an access and mobility policy and/or a WD policy (e.g., a UE policy), for example, after or in response to receiving the response 2766. The second visited network function 2740 (e.g., the V-PCF) may determine an access and mobility policy and/or a WD policy, for example, based on the allowed VPLMNs and ASMM information. The access and mobility policy and/or WD policy may comprise the allowed VPLMNs and ASMM information and/or the WD identities mapping information. The second visited network function 2740 (e.g., the V-PCF) may send/transmit a message 2768 (e.g., the access and mobility policy and/or WD policy) to the wireless device 2710 via the visited network (e.g., via the V-AMF and V-(R)AN). The second visited network function 2740 (e.g., the V-PCF) may send/transmit a message 2768 (e.g., the access and mobility policy and/or WD policy) to the first visited network function 2730. The first visited network function 2730 (e.g., the V-AMF) may send/transmit a message 2769 (e.g., a registration accept message, a registration rejection message). The message 2769 may comprise the access and mobility policy and/or WD policy, which may be transmitted from the first visited network function 2730 to the wireless device 2710 (e.g., via the visited node 2720).

The wireless device 2710 may determine whether or not to select one or more VPLMNs, for example, based on the access and mobility policy and/or WD policy, for example, after or in response to the message 2769 (e.g., comprising the access mobility policy and/or WD policy sent from the V-PCF). For example, the wireless device 2710 may determine whether or not to select one or more VPLMNs, for example, based on the allowed VPLMNs and/or ASMM information and/or the WD identities mapping information. The wireless device 2710 may determine whether to access one or more network slices via one or more VPLMNs simultaneously, for example, based on the access and mobility policy and/or WD policy. The wireless device 2710 may determine whether to access one or more network slices via one or more VPLMNs simultaneously, for example, based on the allowed VPLMNs and/or ASMM information and/or the WD identities mapping information.

Figure 28:
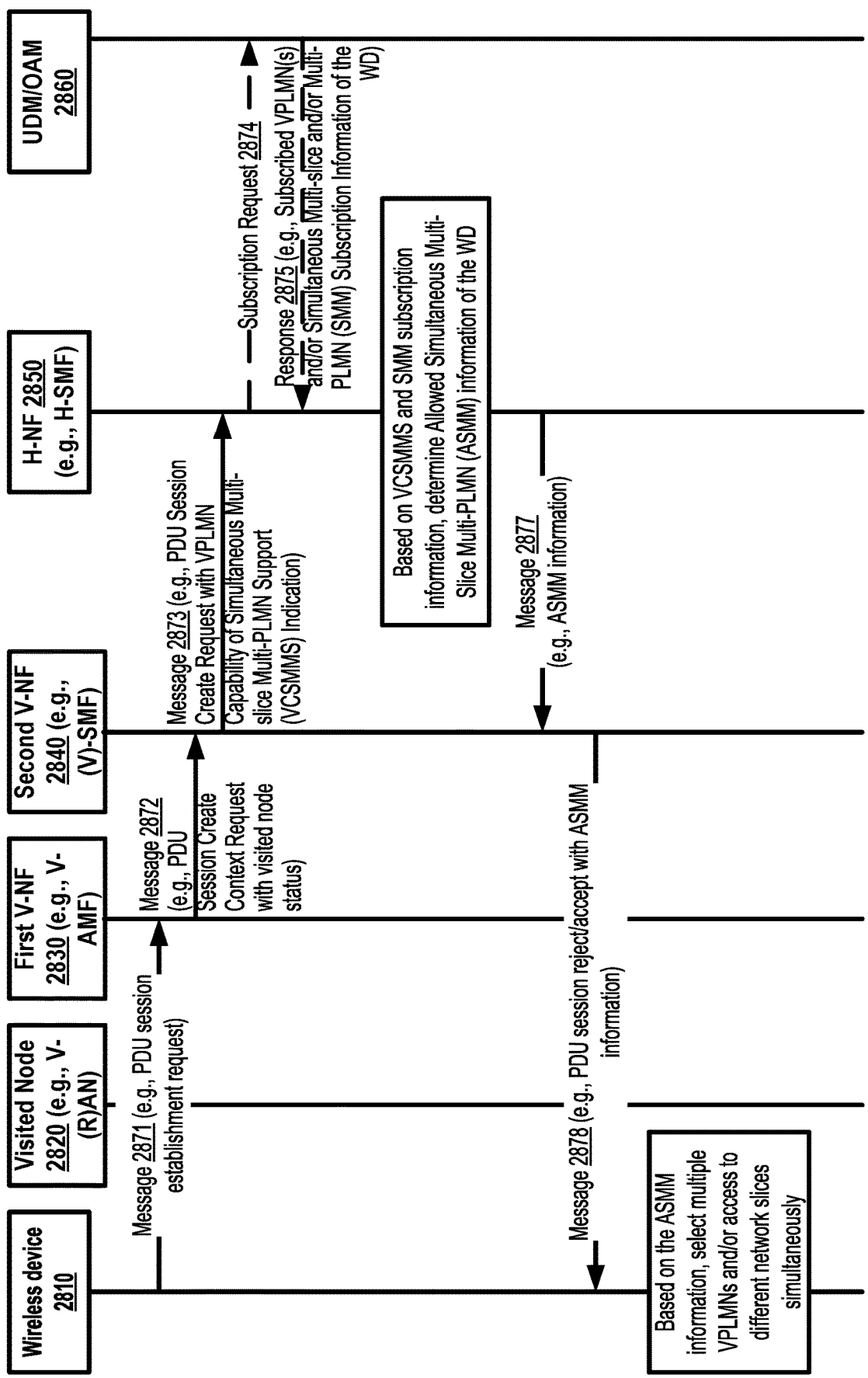
FIG. 28 shows an example packet data unit (PDU) session establishment procedure for visited node (e.g., VPLMN) access.

FIG. 28 shows an example PDU session establishment procedure for visited node access (e.g., VPLMN access). A wireless device 2810 may perform communication with a visited network, for example, before selecting a plurality of VPLMNs for accessing a plurality of network slices. The wireless device 2810 may send/transmit a message 2871 (e.g., a PDU session establishment request), which may comprise an indication of available PLMNs. The wireless device 2810 may send the message 2871 to a first visited network function (V-NF) 2830 (e.g., a V-AMF), for example, via a visited node 2820 (e.g., a V-(R)AN). The first V-NF 2830 may send/transmit a message 2872 (e.g., a PDU session establishment request, a PDU session create context request), for example, to a second V-NF 2840 (e.g., a visited SFM (V-SMF)). The message 2872 may comprise a visited node status (e.g., a status of the first V-NF 2830 and/or the visited node 2820). The second V-NF 2840 may send/transmit a message 2873 (e.g., a PDU session create request), for example, to a home network function (H-NF) 2850 (e.g., a home SMF (H-SMF)). The H-NF 2850 may receive the message 2873 from a visited network function (e.g., the second V-NF 2840). The message 2873 may comprise a first parameter indicating a VPLMN capability of simultaneous multi-slice multi-PLMN support. The message 2873 may comprise an indication of a VPLMN capability of simultaneous multi-slice multi-PLMN support (VCSMMS). The indication of VCSMMS may indicate whether the visited network (e.g., the visited node 2820, the first V-NF 2830, the second V-NF 2840, etc.) is capable (or incapable) of supporting simultaneous multi-slice multi-PLMN access for the wireless device 2810.

The first parameter may comprise at least one of: a second parameter indicating VPLMN supports simultaneously access to the plurality of VPLMNs for the plurality of different network slices; at least one available VPLMN; a priority of the at least one available VPLMN; or at least one network slice associated with the at least one available VPLMN.

The second parameter may indicate at least one VPLMN supporting simultaneous access to the plurality of VPLMNs for the plurality of different network slices. The second parameter may indicate at least one visited network (e.g., V-(R)AN and/or V-AMF) supporting simultaneous access to the plurality of VPLMNs for the plurality of different network slices. The at least one available VPLMN may indicate one or more available VPLMNs. The priority of the at least one available VPLMN may indicate a priority level of the at least one available VPLMN. The wireless device 2810 may select the VPLMN based on the priority level of the at least one available VPLMN. The at least one network slice associated with the at least one available VPLMN may indicate one or more network slices supported by the one or more VPLMNs.

The wireless device 2810 may register to a VPLMN, for example, in a roaming scenario. The wireless device 2810 may send/transmit the message 2871 (e.g., the PDU session establishment request message) to the first V-NF 2830 (e.g., a V-AMF) via the visited node 2820 (e.g., a V-(R)AN). The message 2871 (e.g., the PDU session establishment request message) may comprise at least one of: a wireless device (e.g., UE) identity, a device identifier of the wireless device 2810, wireless device location information, VPLMN identifier, a S-NSSAI associated with the VPLMN, a list of available VPLMNs, and/or a multiple VPLMN multiple network slice indication. the message 2871 (e.g., the PDU session establishment request message) may comprise wireless device identities mapping information. The wireless device identities mapping information may comprise a plurality of wireless device identities mapped to a plurality of PLMNs and/or mapped to a same device identity. The multiple VPLMN multiple network slice indication may indicate a request for accessing multiple VPLMNs and multiple network slices simultaneously. The PDU session establishment request message may comprise at least one of: a PDU session ID, a requested PDU session type, a requested session and service continuity (SSC) mode, a session management capability (e.g., 5G session management (5GSM) Capability), protocol configuration options (PCO), session management protocol data unit data network (SM PDU DN) Request Container, Number of Packet Filters, Header Compression Configuration, WD Integrity Protection Maximum Data Rate, Always-on PDU Session Requested, and/or the like.

The visited node 2820 (e.g., the V-(R)AN) may send/transmit a message (e.g., an N2 message) to the first V-NF 2830 (e.g., the V-AMF). The N2 message may comprise the PDU session establishment request message. The N2 message may comprise a status of the visited node 2820 and/or the first V-NF 2830. The status of the visited node 2820 and/or the first V-NF 2830 may indicate an operating status (e.g., good, poor). The status of the visited node 2820 and/or the first V-NF 2830 may indicate a load condition of the visited node 2820 and/or the first V-NF 2830 (e.g., light load, medium load, heavy load). The status of the visited node 2820 and/or the first V-NF 2830 may indicate a resource condition of visited node 2820 and/or the first V-NF 2830 (e.g., 30% resource is available or any other percentage of resource is available). The status of visited node 2820 and/or the first V-NF 2830 may indicate an overload condition of the visited node 2820 and/or the first V-NF 2830 (e.g., lightly overloaded, 110% overloaded).

The first V-NF 2830 (e.g., the V-AMF) may send/transmit the message 2872 (e.g., a PDU session create context request) to the second V-NF 2840 (e.g., the V-SMF), for example, after or in response to receiving the message 2871. The PDU session create context request message may comprise one or more parameters of the PDU session establishment request message. The PDU session create context request may comprise at least one of: the WD identity, the device identifier of the wireless device 2810, the WD location information, the VPLMN identifier, the S-NSSAI associated with the VPLMN, the list of available VPLMNs, the multiple VPLMN multiple network slice indication, and/or the status of the visited node 2820 and/or the first V-NF 2830.

The second V-NF 2840 (e.g., the V-SMF) may determine the VPLMN capability of simultaneous multi-slice multi-PLMN support, for example, after or in response to receiving the message 2872. The second V-NF 2840 (e.g., the V-SMF) may determine the VPLMN capability of simultaneous multi-slice multi-PLMN support, for example, based on the PDU session create request message. The second V-NF 2840 (e.g., the V-SMF) may determine the VPLMN capability of simultaneous multi-slice multi-PLMN support, for example, based on the list of available VPLMNs, the multiple VPLMN multiple network slice indication, and/or the status of the visited node 2820 and/or the first V-NF 2830.

The second V-NF 2840 (e.g., the V-SMF) may determine the VPLMN capability of simultaneous multi-slice multi-PLMN support, for example, based on the list of available VPLMNs, the multiple VPLMN multiple network slice indication, and/or the status of the visited node 2820 and/or the first V-NF 2830 (e.g., medium load). The wireless device 2810 may be allowed to access VPLMN 1 for a network slice of a first type (e.g., URLLC), VPLMN 2 for a network slice of a second type (e.g., eMBB), and/or any type of network slice(s) allowed for any of the VPLMNs, for example, based on the VPLMN capability of simultaneous multi-slice multi-PLMN support.

The second V-NF 2840 (e.g., the V-SMF) may determine the VPLMN capability of simultaneous multi-slice multi-PLMN support, for example, based on the list of available VPLMNs, the multiple VPLMN multiple network slice indication, and/or the status of the visited node 2820 and/or the first V-NF 2830 (e.g., lightly overloaded). The wireless device 2810 may be allowed to access VPLMN 1 for a network slice of a first type (e.g., URLLC) and VPLMN 2 for a network slice of a second type (e.g., mMTC). A network slice of a third type (e.g., eMBB) may not be allowed for any of the VPLMNs, for example, for the wireless device 2810.

The second V-NF 2840 (e.g., the V-SMF) may send/transmit a message 2873 (e.g., a PDU session create request) to the H-NF 2850 (e.g., the H-SMF). The PDU session create message may comprise one or more parameters of the PDU session create context request message. The policy request message may comprise at least one of: the VPLMN capability of simultaneous multi-slice multi-PLMN support, the WD identity, the device identifier of the wireless device 2810, the WD location information, the VPLMN identifier, the S-NSSAI associated with the VPLMN, the list of available VPLMNs, the multiple VPLMN multiple network slice indication, and/or the status of the visited network (e.g., the visited node 2820, the first V-NF 2830, and/or the second V-NF 2840).

The PDU session create request may comprise at least one of: SUPI, GPSI (if available), a V-SMF SM Context ID, DNN, S-NSSAI with the value defined by the HPLMN, a PDU Session ID, a V-SMF ID, V-CN-Tunnel-Info, a PDU Session Type, PCO, Number Of Packet Filters, User location information, an access type, a RAT Type, a PCF ID, Small Data Rate Control Status, SM PDU DN Request Container, DNN Selection Mode, Control Plane CIoT 5GS Optimisation Indication, Always-on PDU Session Requested, an AMF ID, a serving network, the QoS constraints from the VPLMN.

The H-NF 2850 (e.g., the H-SMF) may take one or more actions/operations, for example, after or in response to receiving the message 2873. The H-NF 2850 (e.g., the H-SMF) may have configured with WD subscription information (e.g., UE subscription information, the subscription information of the wireless device 2810). The H-NF 2850 (e.g., the H-SMF) may send/transmit a subscription request 2874 (e.g., the H-SMF may request WD subscription information by sending a query) to a UDM (e.g., a home UDM, a UDM/OAM 2860). The H-NF 2850 (e.g., the H-SMF) may receive a response 2875 (e.g., the WD subscription information) from the UDM. The WD subscription information may comprise subscribed VPLMNs information and/or SMM subscription information for the wireless device 2810. The subscription information may comprise WD identities mapping information.

The subscribed VPLMNs information and/or the SMM subscription information may comprise at least one of: a simultaneous access to multiple network slices on different PLMNs indication; a list of allowed PLMNs and associated network slices; and/or a list of forbidden PLMN and associated network slices. The subscribed VPLMNs information and/or SMM subscription information may comprise WD identities mapping information. The subscribed VPLMNs information and/or SMM subscription information may be similar to the subscribed VPLMNs information and/or SMM subscription information described above (e.g., with respect to FIG. 20 and any other figures).

The H-NF 2850 (e.g., the H-SMF, H-PCF) may determine the allowed VPLMNs information and/or ASMM information, for example, based on the PDU session create request message and/or WD subscription information. The H-NF 2850 (e.g., the H-SMF) may determine the allowed VPLMNs information and/or the ASMM information, for example, based on the subscribed VPLMNs and/or the SMM subscription information, the VPLMN capability of simultaneous multi-slice multi-PLMN support, the WD identity, the device identifier of the wireless device 2810, the WD location information, the VPLMN identifier, the S-NSSAI associated with the VPLMN, the list of available VPLMNs, the multiple VPLMN multiple network slice indication, the WD identities mapping information, and/or the status of the visited network. The allowed VPLMNs information and/or the ASMM information may comprise at least one of: an indication of a simultaneous access to multiple network slices on different PLMNs; and/or a list of allowed PLMNs and associated network slices. The allowed VPLMNs information and/or the ASMM information may be similar to the allowed VPLMNs information and/or the ASMM information described above (e.g., with respect to FIG. 23 or any other figures).

The H-NF 2850 (e.g., the H-SMF) may determine the allowed VPLMNs and/or the ASMM information, for example, based on the subscribed VPLMNs information and/or the SMM subscription information, the VPLMN capability of simultaneous multi-slice multi-PLMN support, the list of available VPLMNs, the multiple VPLMN multiple network slice indication, the WD identities mapping information, and/or the status of the visited network (e.g., medium load). The wireless device 2810 may be allowed to access VPLMN 1 for a network slice of a first type (e.g., URLLC), VPLMN 2 for a network slice of a second type (e.g., eMBB), and/or any type of network slice allowed for any of the allowed VPLMNs.

The H-NF 2850 (e.g., the H-SMF) may determine the allowed VPLMNs and/or the ASMM information, for example, based on the subscribed VPLMNs and/or ASMM information, the VPLMN capability of simultaneous multi-slice multi-PLMN support, the list of available VPLMNs, the multiple VPLMN multiple network slice indication, the WD identities mapping information, and/or the status of the visited network (e.g., lightly overloaded). The wireless device 2810 may be allowed to access VPLMN 1 for a network slice of a first type (e.g., URLLC) and VPLMN 2 for a network slice of a second type (e.g., mMTC). A network slice of a third type (e.g., eMBB) may not be allowed for any of the VPLMNs for access by the wireless device 2810.

The H-NF 2850 (e.g., the H-SMF) may send/transmit a message 2877 (e.g., a response message, a PDU session create response) to the second V-NF 2840 (e.g., the V-SMF). The message 2877 may comprise the allowed VPLMNs and/or the ASMM information. The message 2877 may comprise the WD identities mapping information.

The second V-NF 2840 (e.g., the V-SMF) may send/transmit a message 2878 (e.g., a PDU session create context response message) to the wireless device 2810 via the first V-NF 2830 (e.g., the V-AMF). The message 2878 may comprise the allowed VPLMNs and/or the ASMM information. The message 2878 may comprise the WD identities mapping information. The first V-NF 2830 (e.g., the V-AMF) may send/transmit the message 2878 (e.g., a PDU session establishment response message or a PDU session establishment reject message (a PDU session establishment response/reject message)) to the wireless device (e.g., via the visited node 2820). The PDU session establishment response/reject message may comprise the allowed VPLMNs and/or the ASMM information. The PDU session establishment response/reject message may comprise the WD identities mapping information.

The wireless device 2810 may determine whether or not to select one or more VPLMNs, for example, after or in response to receiving the message 3878. The wireless device 2810 may determine whether or not to select one or more VPLMNs, for example, based on the allowed VPLMNs information, the ASMM information, and/or the WD identities mapping information. The wireless device 2810 may determine whether to access one or more network slices via one or more VPLMNs simultaneously, for example, based on the allowed VPLMNs, the ASMM information and/or the WD identities mapping information.

A wireless device (e.g., the wireless device 101, 151, 301, 401, 501, 601A, 601B, 601C, 701, 801, 1002, 1102, 1202, 1310, 1510, 1610, 1710, 1810, 1910, 2010, 2310, 2410, 2510, 2610, 2710, and/or 2810 described above) may receive a first message (e.g., from a base station 152A, 152B, 302, 402, 403, 502 602, 602A, 602B, 602C, 702, 802, 1004, 1104, 1204, 1320, 1520, 1620, 1720, 1920, 2020, 2320, 2420, 2520, 2620, 2720, and/or 2820, a relay, or any other device). The first message may comprise a parameter indicating whether the base station supports simultaneous access to a plurality of different network slices via a plurality of visited public land mobile networks (VPLMNs). The wireless device may determine to select the plurality of VPLMNs, for example, based on the parameter indicating support for simultaneous access. The wireless device may access at least one network slice of the plurality of different network slices via the selected plurality of VPLMNs, for example, based on the determining.

The plurality of VPLMNs may comprise a first VPLMN corresponding to a first slice and a second PLMN corresponding to a second slice. The accessing may comprise accessing the first network slice via the base station and/or simultaneously accessing the second network slice via the base station. The parameter may further indicate whether an AMF associated with the base station supports the simultaneous access. The determining may be further based on the parameter indicating the simultaneous support by the base station and the AMF. The base station may be shared by the plurality of VPLMNs. The first message may be a master information block (MIB) message, a system information block (SIB) message, or a Random Access (RA) preamble assignment message. The parameter may indicate at least one visited base station of a VPLMN supports simultaneously access to the plurality of VPLMNs for the plurality of different network slices. The parameter may indicate at least one visited access and mobility management function (AMF) of a VPLMN supports simultaneously access to the plurality of VPLMNs for the plurality of different network slices. Each of the plurality of VPLMN may support at least one network slice of the plurality of different network slices. Each of the plurality of different network slices may comprise at least one slice/service type (SST). The SST may comprise at least one of: eMBB; URLLC; MIoT; and/or V2X.

The wireless device may receive from home PLMN via a visited network function, configuration information for the wireless device. The configuration information may comprise at least one of: subscribed VPLMNs and/or ASMM information; and/or WD identities mapping information. The visited network function may comprise at least one of: a base station; an AMF; an SMF; and/or a PCF. The subscribed VPLMNs and/or ASMM information may comprise at least one of: simultaneous access to multiple network slices on different PLMNs indication; a list of allowed PLMNs and associated network slices; and/or a list of forbidden PLMN and associated network slices. The simultaneous access to multiple network slices on different PLMNs indication may indicate that the wireless device is allowed or not to access multiple network slices on different PLMNs simultaneously. The list of allowed PLMNs and associated network slices may comprise at least one of: at least one allowed PLMN; a priority of the at least one allowed PLMN; and/or a network slice associated with the at least one allowed PLMN. The list of forbidden PLMNs and associated network slices may comprise at least one of: at least one forbidden PLMN; and/or a network slice associated with the at least one forbidden PLMN. The subscribed VPLMNs and/or ASMM information may comprise WD identities mapping information. The WD identities mapping information may comprise a plurality of WD identities mapping to same device identifier. The wireless device may send a second message to the base station. The second message may comprise wd identities mapping information.

A home network function may receive a first message from the wireless device. The first message may comprise: a list of available visited public land mobile network (VPLMN); and/or WD location information. The home network function may receive from a unified data management (UDM), subscribed VPLMNs and/or ASMM information for the wireless device. The home network function may determine allowed VPLMNs and/or ASMM information based on at least one of: the list of available VPLMNs; WD location information; and/or the subscribed VPLMNs and/or ASMM information. The home network function may send the allowed VPLMNs and/or ASMM information to the wireless device. The home network function may comprise at least one of: a home PCF; a home SMF; and/or a home AMF.

A visited base station (e.g., the base station 152A, 152B, 302, 402, 403, 502 602, 602A, 602B, 602C, 702, 802, 1004, 1104, 1204, 1320, 1520, 1620, 1720, 1920, 2020, 2320, 2420, 2520, 2620, 2720) may receive from a wireless device (e.g., the wireless device 101, 151, 301, 401, 501, 601A, 601B, 601C, 701, 801, 1002, 1102, 1202, 1310, 1510, 1610, 1710, 1810, 1910, 2010, 2310, 2410, 2510, 2610, 2710, and/or 2810 described above), an RRC message of an RRC connection. The RRC message may comprise a network slice for a visited public land mobile network (VPLMN). The visited base station may receive from a home network function, subscribed VPLMNs and/or ASMM information for the wireless device. The visited base station may determine allowed VPLMNs and/or ASMM information based on at least one of: the subscribed VPLMNs and/or ASMM information; and/or status of the visited base station. The visited base station may send an RRC release message to the wireless device. The RRC release message may comprise the allowed VPLMNs and/or ASMM information.

The RRC message may comprise a RRCSetupComplete message. The RRC message may comprise a RRCResumeComplete message. The home network function may comprise at least one of: a unified data management (UDM); and/or an operations, administration, and maintenance function (OAM). The visited base station may send to the home network function, a subscription request message requesting subscription of the wireless device. The visited base station may release the RRC connection, for example, based on the allowed VPLMNs and/or ASMM information. The determining may be based on location of the wireless device.

A wireless device (e.g., the wireless device 101, 151, 301, 401, 501, 601A, 601B, 601C, 701, 801, 1002, 1102, 1202, 1310, 1510, 1610, 1710, 1810, 1910, 2010, 2310, 2410, 2510, 2610, 2710, and/or 2810 described above) may receive an RRC message (e.g., from a base station 152A, 152B, 302, 402, 403, 502 602, 602A, 602B, 602C, 702, 802, 1004, 1104, 1204, 1320, 1520, 1620, 1720, 1920, 2020, 2320, 2420, 2520, 2620, 2720, a relay, or any other device). The RRC message may comprise allowed VPLMNs and/or ASMM information. The wireless device may determine whether or not to select a plurality of VPLMNs, for example, based on the allowed VPLMNs and/or ASMM information. The wireless device may access at least one network slice of the plurality of different network slices for the selected plurality of VPLMNs, for example, based on the determining. The RRC message may comprise a backoff timer per VPLMN per network slice. The RRC message may comprise a RRCRelease message.

A visited access and mobility management function (V-AMF described above) may receive a registration request from a wireless device (e.g., the wireless device 101, 151, 301, 401, 501, 601A, 601B, 601C, 701, 801, 1002, 1102, 1202, 1310, 1510, 1610, 1710, 1810, 1910, 2010, 2310, 2410, 2510, 2610, 2710, and/or 2810 described above). The registration request message may comprise: a network slice for a VPLMN; and/or status of a visited base station (e.g., the base station 152A, 152B, 302, 402, 403, 502 602, 602A, 602B, 602C, 702, 802, 1004, 1104, 1204, 1320, 1520, 1620, 1720, 1920, 2020, 2320, 2420, 2520, 2620, 2720). The V-AMF may receive from a home network function, subscribed VPLMNs and/or ASMM information for the wireless device. The V-AMF may determine allowed VPLMNs and/or ASMM information, based on at least one of: the subscribed VPLMNs and/or ASMM information; and/or the status of the visited base station. The V-AMF may send a registration response to the wireless device. The registration response message may comprise the allowed VPLMNs and/or ASMM information. The home network function may comprise at least one of: a unified data management (UDM); and/or an operations, administration, and maintenance function (OAM). The V-AMF may send to the home network function, a subscription request message requesting subscription of the wireless device. The V-AMF may determine to accept or reject the registration request, for example, based on the allowed VPLMNs and/or ASMM information. The registration response message may comprise a registration accept message. The registration response message may comprise a registration reject message.

A wireless device (e.g., the wireless device 101, 151, 301, 401, 501, 601A, 601B, 601C, 701, 801, 1002, 1102, 1202, 1310, 1510, 1610, 1710, 1810, 1910, 2010, 2310, 2410, 2510, 2610, 2710, and/or 2810 described above) may receive a registration response message from a visited access and mobility management function (V-AMF). The registration response message may comprise allowed VPLMNs and/or ASMM information. The wireless device may determine whether or not to select a plurality of VPLMNs, for example, based on allowed VPLMNs and/or ASMM information. The wireless device may access at least one network slice of the plurality of different network slices for the selected plurality of VPLMNs, for example, based on the determining.

A home network function (e.g., home network function(s) described above) may receive a first message from a visited network function. The first message may comprise a first parameter indicating VPLMN capability of simultaneous multi-slice multi-PLMN support. The home network function may determine allowed VPLMNs and/or ASMM information, for example, based on the VPLMN capability of simultaneous multi-slice multi-PLMN support. The home network function may send the allowed VPLMNs and/or ASMM information to the visited network function. The home network function may be a home policy and charging control function. The home network function may be a home session management function. The visited network function may be a visited policy and charging control function. The visited network function may be a visited session management function. The VPLMN capability of simultaneous multi-slice multi-PLMN support may comprise at least one of: a second parameter indicating VPLMN supports simultaneously access to the plurality of VPLMNs for the plurality of different network slices; at least one available VPLMN; a priority of the at least one available VPLMN; and/or at least one network slice associated with the at least one available VPLMN.

A wireless device (e.g., the wireless device(s) described herein) may perform a method comprising multiple operations. The wireless device may receive (e.g., from a device associated with a visited network entity, from a visited network, etc.) an indication that the visited network entity supports, for the wireless device, simultaneous access to a plurality of visited networks (e.g., a plurality of visited public land mobile networks (VPLMNs)). The wireless device may select, based on the indication, at least one visited network of the plurality of visited networks. The wireless device may send a request to access the selected at least one visited network. The wireless device may receive (e.g., m the device associated with the visited network entity, from the visited network, another visited network, or another entity) a second indication that the visited network entity does not support, for the wireless device, simultaneous access to the plurality of visited networks. The wireless device may send, based on the second indication, a request to access a first visited network of the plurality of visited networks. The receiving the indication that the visited network entity supports, for the wireless device, simultaneous access to the plurality of visited networks may be after the sending the request to access the first visited network. The request to access the selected at least one visited network may comprise a request to access at least two visited networks of the plurality of visited networks. The wireless device may be authorized by a home network to simultaneously access the plurality of visited networks. The indication may indicate at least one of: a capability of the visited network entity for the wireless device; or a status of the visited network entity. The visited network entity may comprise at least one of: a visited base station communicating with the wireless device; a visited access network (V-AN); a visited radio access network (V-RAN); a visited access and mobility management function (V-AMF) associated with the visited base station; a visited policy and charging function (V-PCF) associated with the V-AMF; or a visited session management function (V-SMF) associated with the V-AMF. The wireless device may access a first visited network of the selected at least one visited network for a first network slice associated with the first visited network. The wireless device may access, during a time period in which the wireless device has access to the first visited network, a second visited network of the selected at least one visited network for a second network slice associated with the second visited network. The indication may indicate that the visited network entity supports, for the wireless device, simultaneous access to the plurality of visited networks for a plurality of network slices. The wireless device may receive a second indication that the visited network entity does not support, for the wireless device, simultaneous access to the plurality of visited networks. The wireless device may release, based on the second indication that the visited network entity does not support, for the wireless device, simultaneous access to the plurality of visited networks, access to at least one visited network of the plurality of visited networks. The plurality of visited networks may share at least one of: a visited base station; or a visited access and mobility management function (V-AMF). The indication may be (or may be comprised in) a master information block (MIB) message, a system information block (SIB) message, or a random access preamble assignment message. The at least one visited network may comprise at least one of: a visited public land mobile network (VPLMN); a visited mobile network; or a visited network associated with a network operator. The wireless device may receive (e.g., from a home network via the device associated with the visited network entity, from a home PLMN via the visited network or another entity, etc.) configuration information indicating at least one of: subscribed visited networks associated with the wireless device; network slices (e.g., subscribed network slices) allowed for simultaneous access for the wireless device; or mapping information between a device identifier and a plurality of identities of the wireless device (e.g., WD identities mapping information). The mapping information may comprise a plurality of identities of the wireless device mapped to a same device identifier of the wireless device. The wireless device may send (e.g., to the device associated with the visited network entity, to the visited network, etc.) a message comprising the mapping information. The wireless device may send (e.g., to the device associated with the visited network entity, to the visited network, etc.) at least one message indicating at least one of: at least one available visited network; at least one network slice associated with at least one available visited network; at least one type of a network slice; a location of the wireless device; or at least one identity associated with the wireless device. The wireless device may receive (e.g., from a second device associated with the visited network entity, from a first base station, etc.) a second indication that the visited network entity does not support, for the wireless device, simultaneous access to the plurality of visited networks. The wireless device may send, to the second device associated with the visited network entity (or to a second visited network) and based on the second indication that the visited network entity does not support, for the wireless device, simultaneous access to the plurality of visited networks, a second request to access a visited network of the plurality of visited networks. The request to access the selected at least one visited network may comprise a request to access at least two visited networks of the plurality of visited networks. The wireless device may receive, from a device associated with a second visited network entity, a second indication that the second visited network entity does not support, for the wireless device, simultaneous access to the plurality of visited networks. The wireless device may select, based on the second indication and the indication that the visited network entity supports, for the wireless device, simultaneous access to the plurality of visited networks, a base station associated with the visited network entity. The wireless device may send, to the base station, at least one message to access at least two visited networks of the plurality of visited networks. The indication that the visited network entity supports, for the wireless device, simultaneous access may comprise an indication that the visited network entity supports, for the wireless device, simultaneous access to a first network slice via a first visited network of the plurality of visited networks and a second network slice via a second visited network of the plurality of visited networks. The wireless device may access, via the selected at least one visited network, at least one of: the first network slice, or the second network slice. The indication that the visited network entity supports, for the wireless device, simultaneous access may comprise at least one of: an indication that a visited base station supports the simultaneous access, or an indication that a V-AMF associated with the visited base station supports the simultaneous access. Each of the plurality of visited networks may support at least one network slice of a plurality of different network slices. Each network slice may be associated with a slice and/or service type (SST). The SST may comprise at least one of: eMBB, URLLC, MIoT, or V2X. The subscribed visited networks associated with the wireless device and/or the network slices (e.g., subscribed network slices) allowed for simultaneous access for the wireless device may comprise at least one of: a list of allowed visited networks and network slices associated with the allowed visited networks; or a list of forbidden visited networks and network slices associated with the forbidden visited networks. The indication that the visited network entity supports, for the wireless device, simultaneous access may comprise an indication that the visited network entity supports, for the wireless device, simultaneous access to a plurality of network slices of at least two visited networks. The list of allowed visited network sand network slices associated with the allowed visited networks may comprise/indicate at least one of: at least one allowed visited network; a priority of the at least one allowed visited network; or a network slice associated with the at least one allowed visited network. The list of forbidden visited networks and network slices associated with the forbidden visited networks may comprise/indicate at least one of: at least one forbidden visited network; or a network slice associated with the at least one forbidden visited network. The wireless device may also perform one or more additional operations (e.g., one or more operations described herein). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a device associated with a visited network entity (e.g., a base station, etc.) configured to send the indication. A computer-readable medium may store instructions that, when executed, cause performance of the described method, additional operations and/or include the additional elements.

A wireless device (e.g., the wireless device(s) described herein) may perform a method comprising multiple operations. The wireless device may receive, from a device associated with a visited network entity, a first indication that the visited network entity does not support, for the wireless device, simultaneous access to a plurality of visited networks. The wireless device may send, based on the first indication, a request to access a first visited network of the plurality of visited networks. The wireless device may receive a response that authorizes the wireless device to access the first visited network. The wireless device may, after accessing the first visited network, receive, from the device associated with the visited network entity, a second indication that the visited network entity supports, for the wireless device, simultaneous access to the plurality of visited networks. The wireless device may send, based on the second indication, a request to access at least two visited networks of the plurality of visited networks. The wireless device may access a first visited network of the at least two visited networks for a first network slice associated with the first visited network of the at least two visited networks. The wireless device may access, during a time period in which the wireless device has access to the first visited network of the at least two visited networks, a second visited network of the at least two visited networks for a second network slice associated with the second visited network of the at least two visited networks. The second indication may indicate that the visited network entity supports, for the wireless device, simultaneous access to the plurality of visited networks for a plurality of network slices. The plurality of visited networks may share at least one of: a visited base station; or a visited access and mobility management function (V-AMF). The wireless device may receive, from a home network via the device associated with the visited network entity, configuration information indicating at least one of: subscribed visited networks associated with the wireless device; network slices allowed for simultaneous access for the wireless device; or mapping information between a device identifier and a plurality of identities of the wireless device. The wireless device may send, to the device associated with the visited network entity, at least one message indicating at least one of: at least one available visited network; at least one network slice associated with at least one available visited network; at least one type of a network slice; a location of the wireless device; or at least one identity associated with the wireless device. The wireless device may also perform one or more additional operations (e.g., one or more operations described herein). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a device associated with a visited network entity (e.g., a base station, etc.) configured to send the first indication. A computer-readable medium may store instructions that, when executed, cause performance of the described method, additional operations and/or include the additional elements.

A wireless device (e.g., the wireless device(s) described herein) may perform a method comprising multiple operations. The wireless device may receive, from a device associated with a visited network entity, a first indication that the visited network entity supports, for the wireless device, simultaneous access to a plurality of visited networks. The wireless device may send, based on the first indication, a request to access at least two visited networks of the plurality of visited networks. The wireless device may, after sending the request, receive, from the device associated with the visited network entity, a second indication that the visited network entity does not support, for the wireless device, simultaneous access to the plurality of visited networks. The wireless device may release, based on the second indication, access to at least one visited network of the plurality of visited networks. The wireless device may access a first visited network of the at least two visited networks for a first network slice associated with the first visited network. The wireless device may access, during a time period in which the wireless device has access to the first visited network, a second visited network of the at least two visited networks for a second network slice associated with the second visited network. The first indication may indicate that the visited network entity supports, for the wireless device, simultaneous access to the plurality of visited networks for a plurality of network slices. The plurality of visited networks may share at least one of: a visited base station; or a visited access and mobility management function (V-AMF). The wireless device may receive, from a home network via the device associated with the visited network entity, configuration information indicating at least one of: subscribed visited networks associated with the wireless device; network slices allowed for simultaneous access for the wireless device; or mapping information between a device identifier and a plurality of identities of the wireless device. The wireless device may send, to the device associated with the visited network entity, at least one second message indicating at least one of: at least one available visited network; at least one network slice associated with at least one available visited network; at least one type of a network slice; a location of the wireless device; or at least one identity associated with the wireless device. The wireless device may also perform one or more additional operations (e.g., one or more operations described herein). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a device associated with a visited network entity (e.g., a base station, etc.) configured to send the first indication. A computer-readable medium may store instructions that, when executed, cause performance of the described method, additional operations and/or include the additional elements.

A wireless device (e.g., the wireless device(s) described herein) may perform a method comprising multiple operations. The wireless device may receive (e.g., a device associated with a visited network entity, from a visited network, etc.) an indication (e.g., a parameter) that the visited network entity supports, for the wireless device, simultaneous access to a plurality of visited networks (e.g., visited public land mobile networks (VPLMNs)). The wireless device may access, based on the indication, at least one network slice of a plurality of network slices via at least one of the plurality of visited networks. The wireless device may also perform one or more additional operations (e.g., one or more operations described herein). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a device associated with a visited network entity (e.g., a base station, etc.) configured to send the indication. A computer-readable medium may store instructions that, when executed, cause performance of the described method, additional operations and/or include the additional elements.

A wireless device (e.g., the wireless device(s) described herein) may perform a method comprising multiple operations. The wireless device may receive a message (e.g., an RRC message, an RRC release message) comprising information of the allowed visited networks; and information indicating network slices that are authorized for the wireless device for simultaneous access. The message may comprise a backoff timer per visited network per network slice. The wireless device may determine, based on the information of the allowed visited networks and the information indicating network slices that are authorized for the wireless device for simultaneous access, whether or not to select a plurality of visited networks for simultaneous access. The wireless device may access (e.g., based on the determination, based on the information of the allowed visited networks and the information indicating network slices that are authorized for the wireless device for simultaneous access, etc.) at least one network slice of a plurality of network slices via at least one selected visited network. The wireless device may also perform one or more additional operations (e.g., one or more operations described herein). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a device associated with a visited network entity (e.g., a base station, etc.) configured to send the message. A computer-readable medium may store instructions that, when executed, cause performance of the described method, additional operations and/or include the additional elements.

A device associated with a visited network entity (e.g., any entity of the visited network(s) described herein) may perform a method comprising multiple operations. The device associated with the visited network entity may send (e.g., to a wireless device) an indication (e.g., a parameter) that the visited network entity supports, for the wireless device, simultaneous access to a plurality of visited networks (e.g., visited public land mobile networks (VPLMNs)). The device associated with the visited network entity may receive, from the wireless device and based on the indication, a request to access at least one network slice of a plurality of network slices via at least one of the plurality of visited networks. The device associated with the visited network entity may allow the wireless device to access, based on the request, the at least one network slice of the plurality of network slices via the at least one of the plurality of visited networks. The device associated with the visited network entity may also perform one or more additional operations (e.g., one or more operations described herein). The device associated with the visited network entity may comprise one or more processors; and memory storing instructions that, when executed by the one or more processors, cause the device associated with the visited network entity to perform the described method, additional operations and/or include the additional elements. A system may comprise the device, associated with the visited network entity, configured to perform the described method, additional operations and/or include the additional elements; and a wireless device configured to send the request. A computer-readable medium may store instructions that, when executed, cause performance of the described method, additional operations and/or include the additional elements.

A device associated with a visited network entity (e.g., any entity of the visited network(s) described herein) may perform a method comprising multiple operations. The device associated with the visited network entity may receive, from a wireless device, a message (e.g., an RRC message for an RRC connection, an RRC setup complete message, an RRC resume complete message, etc.). The message may indicate a network slice of a visited network (e.g., a VPLMN). The device associated with the visited network entity may receive (e.g., from a home PLMN or a home network function, such as a UDM and/or OAM) subscribed visited network information and information of network slices (e.g., subscribed network slices) that are allowed for simultaneous access by the wireless device. The device associated with the visited network entity may determine allowed visited networks and network slices that are authorized for the wireless device for simultaneous access, for example, based on at least one of: the subscribed visited network information; the information of network slices that are allowed for simultaneous access by the wireless device; or a status of the visited network entity. The determination may be based on a location of the wireless device. The device associated with the visited network entity may send, to the wireless device, a message (e.g., an RRC message, an RRC release message) comprising information of the allowed visited networks; and information indicating network slices that are authorized for the wireless device for simultaneous access. The device associated with the visited network entity may send (e.g., to the home PLMN or the home network function) a subscription request message requesting subscription information of the wireless device. The device associated with the visited network entity may release, based on the allowed visited networks and the network slices that are authorized for the wireless device for simultaneous access, an RRC connection. The device associated with the visited network entity may also perform one or more additional operations (e.g., one or more operations described herein). The device associated with the visited network entity may comprise one or more processors; and memory storing instructions that, when executed by the one or more processors, cause the device associated with the visited network entity to perform the described method, additional operations and/or include the additional elements. A system may comprise the device, associated with the visited network entity, configured to perform the described method, additional operations and/or include the additional elements; and a wireless device configured to send the message. A computer-readable medium may store instructions that, when executed, cause performance of the described method, additional operations and/or include the additional elements.

A device associated with a visited network entity (e.g., any entity of the visited network(s) described herein) may perform a method comprising multiple operations. The device associated with the visited network entity may receive (e.g., from a visited base station or a wireless device) a message (e.g., a registration request message) comprising/ indicating a network slice of a visited network (e.g., a VPLMN). The message may comprise/indicate a status of a visited network entity (e.g., a visited base station). The device associated with the visited network entity may receive (e.g., from a home network, a home PLMN, a home network function, such as a UDM and/or an OAM, etc.) subscribed visited network information and information of network slices (e.g., subscribed network slices) that are allowed for simultaneous access by the wireless device. The device associated with the visited network entity may determine allowed visited networks and network slices that are authorized (e.g., by the visited network entity) for the wireless device for simultaneous access, for example, based on at least one of: the subscribed visited network information; or the information of network slices that are allowed for simultaneous access by the wireless device. The device associated with the visited network entity may send (e.g., to the wireless device) a message (e.g., a registration response message, such as a registration accept message, a registration reject message, etc.) comprising/indicating at least one of: the information of the allowed visited networks; or information of network slices that are authorized (e.g., by the visited network entity) for the wireless device for simultaneous access. The device associated with the visited network entity may send (e.g., to a home network, a home PLMN, a home network function, such as a UDM and/or an OAM, etc.) a subscription request message requesting subscription information of the wireless device. The device associated with the visited network entity may determine, based on the allowed visited networks and/or the network slices that are authorized (e.g., by the visited network entity) for the wireless device for simultaneous access, whether to accept or reject the registration request sent from the wireless device. The device associated with the visited network entity may also perform one or more additional operations (e.g., one or more operations described herein). The device associated with the visited network entity may comprise one or more processors; and memory storing instructions that, when executed by the one or more processors, cause the device associated with the visited network entity to perform the described method, additional operations and/or include the additional elements. A system may comprise the device, associated with the visited network entity, configured to perform the described method, additional operations and/or include the additional elements; and a wireless device configured to send the message. A computer-readable medium may store instructions that, when executed, cause performance of the described method, additional operations and/or include the additional elements.

A home network (e.g., any entity of the home network(s) described herein) may perform a method comprising multiple operations. The home network may receive (e.g., from a visited network, a device, a device associated with a visited network entity, a wireless device, etc.) a message. The message may comprise a parameter indicating a capability of supporting simultaneous access to a plurality of visited networks (e.g., a visited network capability of the visited network entity). The home network may determine, based on the capability, subscribed visited network information and/or information of network slices (e.g., subscribed network slices) that are allowed for simultaneous access by the wireless device. The home network may send (e.g., to the visited network, the visited network entity, the device associated with the visited network entity, the wireless device, etc.) the subscribed visited network information and/or the information of network slices that are allowed for simultaneous access by the wireless device. The home network may comprise at least one of: a home policy and charging control function, or a home session management function. The visited network entity may comprise at least one of: a visited policy and charging control function, or a visited session management function. The capability of supporting simultaneous access to a plurality of visited networks (e.g., a visited network capability of the visited network entity) may comprise at least one of: a parameter indicating at least one visited network supports simultaneous access to the plurality of visited networks for a plurality of network slices; at least one available visited network; a priority of the at least one available visited network; or at least one network slice associated with the at least one available visited network. The home network may also perform one or more additional operations (e.g., one or more operations described herein). The home network may comprise one or more processors; and memory storing instructions that, when executed by the one or more processors, cause the home network to perform the described method, additional operations and/or include the additional elements. A system may comprise the home network configured to perform the described method, additional operations and/or include the additional elements; and a device/network configured to send the message. A computer-readable medium may store instructions that, when executed, cause performance of the described method, additional operations and/or include the additional elements.

A home network (e.g., any entity of the home network(s) described herein) may perform a method comprising multiple operations. The home network may receive (e.g., from a visited network, a device, a device associated with a visited network entity, a wireless device, etc.) a message. The message may comprise at least one of: a list of available visited networks (e.g., VPLMNs); or location information of the wireless device. The home network may receive (e.g., from a UDM), subscribed visited network information and/or information of network slices (e.g., subscribed network slices) that are allowed for simultaneous access by the wireless device. The home network (and/or a visited network) may determine allowed visited network information and/or information of network slices (e.g., network slices authorized for simultaneous access) that are allowed for simultaneous access by the wireless device, for example, based on at least one of: the list of available visited networks; the location information of the wireless device; or the subscribed visited network information and/or the information of subscribed network slices for simultaneous access by the wireless device. The home network may send (e.g., to the wireless device via a visited network) the allowed visited network information and/or the information of network slices that are allowed for simultaneous access by the wireless device. The home network may also perform one or more additional operations (e.g., one or more operations described herein). The home network may comprise one or more processors; and memory storing instructions that, when executed by the one or more processors, cause the home network to perform the described method, additional operations and/or include the additional elements. A system may comprise the home network configured to perform the described method, additional operations and/or include the additional elements; and a device/network configured to send the message. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device from a device associated with a visited network entity of a visited network, an indication of whether the visited network entity supports, for the wireless device, simultaneous access to a plurality of visited networks, wherein the wireless device is enabled by the visited network for simultaneous access to the plurality of visited networks;
selecting, based on the indication, at least one visited network of the plurality of visited networks; and
sending a request to access the selected at least one visited network.

2. The method of claim 1, further comprising:
receiving, by the wireless device from the device associated with the visited network entity, a second indication that the visited network entity does not support, for the wireless device, simultaneous access to the plurality of visited networks; and
sending, based on the second indication, a request to access a first visited network of the plurality of visited networks,
wherein the receiving the indication of whether the visited network entity supports, for the wireless device, simultaneous access to the plurality of visited networks is after the sending the request to access the first visited network, and
wherein the request to access the selected at least one visited network comprises a request to access at least two visited networks of the plurality of visited networks.

3. The method of claim 1, wherein the wireless device is authorized by a home network to simultaneously access the plurality of visited networks, and
wherein the indication indicates at least one of:
a capability of the visited network entity for the wireless device; or
a status of the visited network entity.

4. The method of claim 1, wherein the visited network entity comprises at least one of:
a visited base station communicating with the wireless device;
a visited access network (V-AN);
a visited radio access network (V-RAN);
a visited access and mobility management function (V-AMF) associated with the visited base station;
a visited policy and charging function (V-PCF) associated with the V-AMF; or
a visited session management function (V-SMF) associated with the V-AMF.

5. The method of claim 1, further comprising:
accessing a first visited network of the selected at least one visited network for a first network slice associated with the first visited network; and
accessing, during a time period in which the wireless device has access to the first visited network, a second visited network of the selected at least one visited network for a second network slice associated with the second visited network,
wherein the indication indicates that the visited network entity supports, for the wireless device, simultaneous access to the plurality of visited networks for a plurality of network slices.

6. The method of claim 1, further comprising:
receiving a second indication that the visited network entity does not support, for the wireless device, simultaneous access to the plurality of visited networks; and
releasing, based on the second indication that the visited network entity does not support, for the wireless device, simultaneous access to the plurality of visited networks, access to at least one visited network of the plurality of visited networks.

7. The method of claim 1, wherein the plurality of visited networks shares at least one of:
a visited base station; or
a visited access and mobility management function (V-AMF).

8. The method of claim 1, wherein the indication is:
a master information block (MIB) message;
a system information block (SIB) message; or
a random access preamble assignment message; and
wherein the at least one visited network comprises at least one of:
a visited public land mobile network (VPLMN);
a visited mobile network; or
a visited network associated with a network operator.

9. The method of claim 1, further comprising receiving, by the wireless device from a home network via the device associated with the visited network entity, configuration information indicating at least one of:
subscribed visited networks associated with the wireless device;
network slices allowed for simultaneous access for the wireless device; or
mapping information between a device identifier and a plurality of identities of the wireless device.

10. The method of claim 1, further comprising: sending, by the wireless device to the device associated with the visited network entity, at least one message indicating at least one of:
at least one available visited network;
at least one network slice associated with at least one available visited network;
at least one type of a network slice;
a location of the wireless device; or
at least one identity associated with the wireless device.

11. A method comprising:
receiving, by a wireless device from a device associated with a visited network entity, a first indication that the visited network entity does not support, for the wireless device, simultaneous access to a plurality of visited networks;
sending, based on the first indication, a request to access a first visited network of the plurality of visited networks;
receiving a response that authorizes the wireless device to access the first visited network;
after accessing the first visited network, receiving, by the wireless device from the device associated with the visited network entity, a second indication that the visited network entity supports, for the wireless device, simultaneous access to the plurality of visited networks; and
sending, based on the second indication, a request to access at least two visited networks of the plurality of visited networks.

12. The method of claim 11, further comprising:
accessing a first visited network of the at least two visited networks for a first network slice associated with the first visited network of the at least two visited networks; and
accessing, during a time period in which the wireless device has access to the first visited network of the at least two visited networks, a second visited network of the at least two visited networks for a second network slice associated with the second visited network of the at least two visited networks, wherein the second indication indicates that the visited network entity supports, for the wireless device, simultaneous access to the plurality of visited networks for a plurality of network slices.

13. The method of claim 11, wherein the plurality of visited networks shares at least one of:
   a visited base station; or
   a visited access and mobility management function (V-AMF).

14. The method of claim 11, further comprising receiving, by the wireless device from a home network via the device associated with the visited network entity, configuration information indicating at least one of:
   subscribed visited networks associated with the wireless device;
   network slices allowed for simultaneous access for the wireless device; or
   mapping information between a device identifier and a plurality of identities of the wireless device.

15. The method of claim 11, further comprising: sending, by the wireless device to the device associated with the visited network entity, at least one message indicating at least one of:
   at least one available visited network;
   at least one network slice associated with at least one available visited network;
   at least one type of a network slice;
   a location of the wireless device; or
   at least one identity associated with the wireless device.

16. A method comprising:
   receiving, by a wireless device from a device associated with a visited network entity, a first indication that the visited network entity supports, for the wireless device, simultaneous access to a plurality of visited networks;
   sending, based on the first indication, a request to access at least two visited networks of the plurality of visited networks;
   after sending the request, receiving, by the wireless device from the device associated with the visited network entity, a second indication that the visited network entity does not support, for the wireless device, simultaneous access to the plurality of visited networks; and
   releasing, based on the second indication, access to at least one visited network of the plurality of visited networks.

17. The method of claim 16, further comprising:
   accessing a first visited network of the at least two visited networks for a first network slice associated with the first visited network; and
   accessing, during a time period in which the wireless device has access to the first visited network, a second visited network of the at least two visited networks for a second network slice associated with the second visited network,
   wherein the first indication indicates that the visited network entity supports, for the wireless device, simultaneous access to the plurality of visited networks for a plurality of network slices.

18. The method of claim 16, wherein the plurality of visited networks shares at least one of:
   a visited base station; or
   a visited access and mobility management function (V-AMF).

19. The method of claim 16, further comprising receiving, by the wireless device from a home network via the device associated with the visited network entity, configuration information indicating at least one of:
   subscribed visited networks associated with the wireless device;
   network slices allowed for simultaneous access for the wireless device; or
   mapping information between a device identifier and a plurality of identities of the wireless device.

20. The method of claim 16, further comprising: sending, by the wireless device to the device associated with the visited network entity, at least one second message indicating at least one of:
   at least one available visited network;
   at least one network slice associated with at least one available visited network;
   at least one type of a network slice;
   a location of the wireless device; or
   at least one identity associated with the wireless device.

* * * * *